(12) United States Patent  
Leavitt et al.

(10) Patent No.: US 7,895,530 B2  
(45) Date of Patent: Feb. 22, 2011

(54) USER DEFINABLE INTERFACE SYSTEM, METHOD, SUPPORT TOOLS, AND COMPUTER PROGRAM PRODUCT

(75) Inventors: Joseph Miller Leavitt, Florence, AL (US); Darrell D. Diem, Madison, AL (US); David A. Kidd, Huntsville, AL (US)

(73) Assignee: Change Tools, Inc., Huntsville, AL (US)

( * ) Notice: Subject to any disclaimer, the term of this patent is extended or adjusted under 35 U.S.C. 154(b) by 974 days.

(21) Appl. No.: 10/931,128

(22) Filed: Aug. 30, 2004

(65) Prior Publication Data

US 2007/0234223 A1 Oct. 4, 2007

Related U.S. Application Data

(63) Continuation-in-part of application No. 09/986,765, filed on Nov. 9, 2001, now Pat. No. 6,918,091.

(60) Provisional application No. 60/247,643, filed on Nov. 9, 2000, provisional application No. 60/325,179, filed on Sep. 28, 2001, provisional application No. 60/498,656, filed on Aug. 29, 2003.

(51) Int. Cl.
*G06F 3/048* (2006.01)
*G06F 3/00* (2006.01)
*G06F 3/14* (2006.01)

(52) U.S. Cl. .................. 715/810; 715/763; 715/765; 715/769; 715/744; 715/747; 715/841; 715/864

(58) Field of Classification Search .................. 715/763, 715/765, 769, 762, 810, 835, 733, 735, 744, 715/747, 740, 841, 864, 968, 826
See application file for complete search history.

(56) References Cited

U.S. PATENT DOCUMENTS

| | | | |
|---|---|---|---|
| 4,772,882 A | 9/1988 | Mical |
| 4,896,291 A | 1/1990 | Gest et al. |
| 5,081,592 A | 1/1992 | Jenq |
| 5,345,550 A | 9/1994 | Bloomfield |
| 5,490,245 A | 2/1996 | Wugofski |
| 5,513,310 A | 4/1996 | Megard et al. |
| 5,572,648 A | 11/1996 | Bibayan |
| 5,581,670 A | 12/1996 | Bier et al. |
| 5,589,856 A | 12/1996 | Stein et al. |

(Continued)

OTHER PUBLICATIONS

Agreement regarding Bullseye Interface System, dated Feb. 28, 1995, 4 pages.

*Primary Examiner*—Tadeese Hailu  
*Assistant Examiner*—Nicholas S Ulrich  
(74) *Attorney, Agent, or Firm*—Lanier Ford Shaver & Payne, P.C.; Ann I. Bennen

(57) ABSTRACT

In a cursor-based computing environment generating a display, a user-definable interface is configured by a user and activated when needed by a user, wherein the user-definable interface comprises a plurality of buttons. Functions of the buttons are selectable by the user according to his preferences. These preferences may be derived from applications or by functions selected exclusively by the user. An application (ZTool) is also described, this application allowing configuration of a display in accordance with predetermined parameters. These parameters may be related to data base access functions or other types of data access, including logistical support.

17 Claims, 44 Drawing Sheets

U.S. PATENT DOCUMENTS

| | | | |
|---|---|---|---|
| 5,596,699 A | | 1/1997 | Driskell |
| 5,600,780 A * | | 2/1997 | Hiraga et al. ............... 715/762 |
| 5,602,997 A | | 2/1997 | Carpenter et al. |
| 5,644,737 A | | 7/1997 | Tuniman et al. |
| 5,664,133 A | | 9/1997 | Malamud et al. |
| 5,675,752 A * | | 10/1997 | Scott et al. ................... 715/866 |
| 5,675,753 A * | | 10/1997 | Hansen et al. ............... 715/744 |
| 5,678,015 A | | 10/1997 | Goh |
| 5,689,667 A | | 11/1997 | Kurtenbach |
| 5,689,668 A | | 11/1997 | Beaudet et al. |
| 5,701,424 A | | 12/1997 | Atkinson |
| 5,706,448 A | | 1/1998 | Blades |
| 5,706,456 A | | 1/1998 | Dupper et al. |
| 5,721,853 A | | 2/1998 | Smith |
| 5,737,557 A | | 4/1998 | Sullivan |
| 5,737,560 A | | 4/1998 | Yohanan |
| 5,745,116 A | | 4/1998 | Pisutha-Arnond |
| 5,745,717 A | | 4/1998 | Vayda et al. |
| 5,748,891 A | | 5/1998 | Fleming et al. |
| 5,754,173 A | | 5/1998 | Hiura et al. |
| 5,754,174 A | | 5/1998 | Carpenter et al. |
| 5,760,768 A * | | 6/1998 | Gram ......................... 715/747 |
| 5,790,820 A | | 8/1998 | Vayda et al. |
| 5,798,760 A | | 8/1998 | Vayda et al. |
| 5,805,167 A | | 9/1998 | Van Cruyningen |
| 5,812,805 A | | 9/1998 | Kitayama et al. |
| 5,818,445 A | | 10/1998 | Sanderson et al. |
| 5,825,357 A | | 10/1998 | Barnes, Jr. et al. |
| 5,828,360 A | | 10/1998 | Anderson et al. |
| 5,828,376 A | | 10/1998 | Solimene et al. |
| 5,838,321 A | | 11/1998 | Wolf |
| 5,845,299 A * | | 12/1998 | Arora et al. ................. 715/513 |
| 5,852,440 A | | 12/1998 | Grossman et al. |
| 5,874,954 A | | 2/1999 | Kilmer et al. |
| 5,874,966 A | | 2/1999 | Polimeni et al. |
| 5,914,714 A | | 6/1999 | Brown |
| 5,926,178 A | | 7/1999 | Kurtenbach |
| 5,933,141 A | | 8/1999 | Smith |
| 5,936,614 A | | 8/1999 | An et al. |
| 5,940,076 A | | 8/1999 | Sommers et al. |
| 5,943,039 A | | 8/1999 | Anderson et al. |
| 5,943,678 A | | 8/1999 | Hocker et al. |
| 5,973,666 A | | 10/1999 | Challener et al. |
| 6,002,402 A | | 12/1999 | Schacher |
| 6,002,708 A | | 12/1999 | Fleming et al. |
| 6,005,578 A | | 12/1999 | Cole |
| 6,009,355 A | | 12/1999 | Obradovich et al. |
| 6,028,600 A | | 2/2000 | Rosin et al. |
| 6,037,937 A | | 3/2000 | Beaton et al. |
| 6,078,322 A * | | 6/2000 | Simonoff et al. ............ 715/744 |
| 6,104,399 A | | 8/2000 | Volkel |
| 6,111,614 A | | 8/2000 | Mugura et al. |
| 6,118,427 A | | 9/2000 | Buxton et al. |
| 6,121,965 A | | 9/2000 | Kenney et al. |
| 6,133,915 A | | 10/2000 | Arcuri et al. |
| 6,167,255 A | | 12/2000 | Kennedy et al. |
| 6,188,399 B1 | | 2/2001 | Voas et al. |
| 6,199,099 B1 * | | 3/2001 | Gershman et al. ........... 709/203 |
| 6,201,539 B1 | | 3/2001 | Miller et al. |
| 6,208,341 B1 | | 3/2001 | Van Ee et al. |
| 6,215,488 B1 | | 4/2001 | Bloem et al. |
| 6,256,030 B1 | | 7/2001 | Berry et al. |
| 6,304,746 B1 | | 10/2001 | Fascenda et al. |
| 6,330,007 B1 * | | 12/2001 | Isreal et al. ................... 715/762 |
| 6,337,469 B1 | | 1/2002 | Chung |
| 6,341,270 B1 | | 1/2002 | Esposito et al. |
| 6,369,837 B1 | | 4/2002 | Schirmer |
| 6,385,268 B1 | | 5/2002 | Fleming et al. |
| 6,400,754 B2 | | 6/2002 | Fleming et al. |
| 6,414,700 B1 | | 7/2002 | Kurtenbach et al. |
| 6,421,068 B1 * | | 7/2002 | Ingrassia et al. ............. 715/762 |
| 6,448,987 B1 | | 9/2002 | Easty et al. |
| 6,466,937 B1 | | 10/2002 | Fascenda |
| 6,483,523 B1 * | | 11/2002 | Feng ........................... 715/745 |
| 6,509,908 B1 | | 1/2003 | Croy et al. |
| 6,509,913 B2 * | | 1/2003 | Martin et al. ................. 715/762 |
| 6,535,885 B1 | | 3/2003 | Nardone et al. |
| 6,546,374 B1 | | 4/2003 | Esposito et al. |
| 6,549,219 B2 | | 4/2003 | Selker |
| 6,556,222 B1 | | 4/2003 | Narayanaswami |
| 6,593,945 B1 | | 7/2003 | Nason et al. |
| 6,618,063 B1 | | 9/2003 | Kurtenbach |
| 6,618,943 B2 | | 9/2003 | Ashe et al. |
| 6,621,532 B1 | | 9/2003 | Mandt |
| 6,664,981 B2 | | 12/2003 | Ashe et al. |
| 6,674,453 B1 * | | 1/2004 | Schilit et al. ................. 715/810 |
| 6,686,938 B1 | | 2/2004 | Jobs et al. |
| 6,714,219 B2 * | | 3/2004 | Lindhorst et al. ............. 715/769 |
| 6,717,597 B2 | | 4/2004 | Letzelter et al. |
| 6,724,402 B1 | | 4/2004 | Baquero |
| 6,731,316 B2 * | | 5/2004 | Herigstad et al. ............. 715/864 |
| 6,806,890 B2 * | | 10/2004 | Audleman et al. ............ 715/762 |
| 6,816,079 B1 | | 11/2004 | Kuenzner et al. |
| 6,876,368 B2 * | | 4/2005 | Dove et al. ................... 715/762 |
| 6,918,091 B2 | | 7/2005 | Leavitt et al. |
| 6,928,617 B2 * | | 8/2005 | Druyan et al. ............... 715/760 |
| 6,928,433 B2 | | 9/2005 | Goodman et al. |
| 6,941,521 B2 * | | 9/2005 | Lin et al. ..................... 715/762 |
| 6,990,654 B2 * | | 1/2006 | Carroll, Jr. ................... 717/109 |
| 7,010,294 B1 * | | 3/2006 | Pyotsia et al. ................ 455/420 |
| 7,010,758 B2 * | | 3/2006 | Bate ............................ 715/841 |
| 7,036,084 B2 * | | 4/2006 | Miwa et al. ................... 715/763 |
| 7,093,198 B1 * | | 8/2006 | Paatero et al. ................ 715/746 |
| 7,149,983 B1 * | | 12/2006 | Robertson et al. ............ 715/810 |
| 7,155,681 B2 * | | 12/2006 | Mansour et al. .............. 715/762 |
| 7,225,408 B2 * | | 5/2007 | O'Rourke ..................... 715/743 |
| 7,243,307 B2 * | | 7/2007 | Gao et al. ..................... 715/744 |
| 7,246,329 B1 * | | 7/2007 | Miura et al. .................. 715/810 |
| 7,372,450 B2 | | 5/2008 | Twerdahl et al. |
| 7,512,906 B1 * | | 3/2009 | Baier et al. ................... 715/866 |
| 2001/0004260 A1 | | 6/2001 | Bauer et al. |
| 2001/0010513 A1 | | 8/2001 | Rosenberg et al. |
| 2001/0045965 A1 | | 11/2001 | Orbanes et al. |
| 2002/0052916 A1 * | | 5/2002 | Kloba et al. .................. 709/203 |
| 2002/0089541 A1 | | 7/2002 | Orbanes et al. |
| 2002/0122061 A1 * | | 9/2002 | Martin et al. ................. 345/762 |
| 2002/0122072 A1 | | 9/2002 | Selker |
| 2002/0152244 A1 * | | 10/2002 | Dean et al. ................... 707/530 |
| 2002/0186254 A1 | | 12/2002 | Monbaron |
| 2003/0032418 A1 * | | 2/2003 | Suzuki et al. ................. 455/419 |
| 2003/0112275 A1 * | | 6/2003 | Proulx et al. ................. 345/762 |
| 2003/0122779 A1 | | 7/2003 | Martin et al. |
| 2003/0164818 A1 | | 9/2003 | Miller-Smith |
| 2004/0111518 A1 * | | 6/2004 | Schuyler ..................... 709/228 |
| 2004/0221243 A1 | | 11/2004 | Twerdahl et al. |
| 2004/0230915 A1 * | | 11/2004 | Diering et al. ............... 715/810 |
| 2004/0237048 A1 | | 11/2004 | Tojo et al. |
| 2005/0120076 A1 * | | 6/2005 | Kamata et al. ............... 709/203 |
| 2005/0278647 A1 | | 12/2005 | Leavitt et al. |
| 2006/0085763 A1 | | 4/2006 | Leavitt et al. |

* cited by examiner

```xml
<?xml version="1.0" ?>
<CT>
<R>http://www.changetools.com/web/</R>
<P>Order</P>
<SBS>
<SB1>order2.asp</SB1>
<SB2 />
<SB3 />
<SB4 />
<SB5 />
<SB6 />
<SB7 />
<SB8>appstart.asp</SB8>
<SBB>gtestnew.asp</SBB>
<SBR>order2.asp</SBR>
<SBU />
<SBD />
</SBS>
<I ix="0" nm="img1" l="120" t="5" h="19" w="109" v="Y">http://www.changetools.com/web/logo_grainger.gif</I>
<B ix="0" nm="btn2" l="10" t="180" h="20" w="70" v="Y">1. Submit</B>
<L ix="0" nm="lbl1" l="10" t="52" h="20" w="60" >Item#</L>
<L ix="0" nm="lbl2" l="10" t="77" h="20" w="60" >Desc.</L>
<L ix="0" nm="lbl3" l="10" t="102" h="20" w="60" >CustID</L>
<L ix="0" nm="lbl4" l="10" t="127" h="20" w="60" >Ship</L>
<L ix="0" nm="lbl5" l="10" t="152" h="20" w="60" >Price</L>
<T ix="0" nm="ItemNum" l="80" t="52" h="20" w="130" v="N" >4M235</T>
<T ix="0" nm="Desc" l="80" t="77" h="20" w="130" v="Y" >Pump Motor</T>
<T ix="0" nm="CustID" l="80" t="102" h="20" w="130" v="Y" >C1234</T>
<T ix="0" nm="ShipDate" l="80" t="127" h="20" w="130" v="Y" >Today</T>
<T ix="0" nm="Price" l="80" t="152" h="20" w="130" v="Y" >$44.99</T>
</CT>
```

FIG. 36

R = Application Root ie: http://www.changetools.com/zenuapp/
P = Page name
(note:) S = script (submit to) this tag has been replaced with "SBB"
SBS = Standard button set
SB? = Standard button
SBB = Standard button Back
SBU = Standard button Up
SBD = Standard button Down
SBR = Standard button Right
B = button
C = ComboList
T = Text Box
L = Label
LB = ListBox
CK = CheckBox
O = OptionBox
I = Image
N = Non-Visible (used to pass values that do not need to be displayed)
ix = Primary key for database record
ti = Tab Index
nm = control name
l = left
t = top
h = height
w = width
m = IsMenu (used to identify a ListBox as a menu whereby it will pass the selected value without it having to be selected before the toolbar button is pressed)
iv = ItemValue (this is a string to go with the listitem to store the value to be passed to the next page
v = ViewOnly (Data will not be sent back to the server) Y or N
li = ComboBox or Listbox entry (listitem)
ct = ComboBox or Listbox item count

FIG. 41

```xml
<?xml version="1.0" ?>
<CT>
        <R>http://www.changetools.com/zenuapp/</R>
        <P>This is the Page Name</P>
        <S>dosomething.asp</S>
        <SBS>
                <SB1>order.asp</SB1>
                <SB2>showimage.asp </SB2>
                <SB3>details.asp </SB3>
                <SB4></SB4>
                <SB5></SB5>
                <SB6></SB6>
                <SB7></SB7>
                <SB8></SB8>
                <SBB></SBB>
                <SBU></SBU>
                <SBD></SBD>
        </SBS>
        <N nm="ProdID">CF2345-F</N>
        <B ix="0" nm="Button1" l="10" t="10" h="173" w="160">Search</B>
        <C ix="0" nm="Cbo1" l="10" t="10" h="173" w="160">My Choice</C>
        <T ix="0" nm="Text1" l="10" t="10" h="173" w="160">My Text</T>
        <L ix="0" nm="Label1" l="10" t="10" h="173" w="160">This is a label:</L>
        <LB ix="0" nm="LstBox1" l="10" t="10" h="173" w="160" ct="2">The choice
                <li>1. Option Number 1</li>
                <li>2. Option Number 2</li>
        </LB>
        <I ix="0" nm="Image1" l="10" t="10" h="173" w="160">
        <![CDATA[
        This would be the encoded data for the image.   ]]>
        </I>
        <LB ix="0" nm="IBox1" l="10" t="20" h="173" w="160" ct="6">
        IBox
                <li>1. Option number 1</li>
                <li>2. Option Number 2</li>
                <li>3. Option Number 3</li>
                <li>4. Option Number 4</li>
                <li>5. Option Number 5</li>
                <li>6. Option Number 6</li>
        </LB>
</CT>
```

FIG. 42

USER DEFINABLE INTERFACE SYSTEM, METHOD, SUPPORT TOOLS, AND COMPUTER PROGRAM PRODUCT

CROSS REFERENCE TO RELATED APPLICATIONS

The instant application is a continuation in part of application Ser. No. 09/986,765, filed Nov. 9, 2001, now Pat. No. 6,918,091, which claims the benefit of Provisional U.S. Patent Application Nos. 60/247,643, filed Nov. 9, 2000, and 60/325,179, filed Sep. 28, 2001, which are incorporated herein by reference in their entireties. The instant application also claims the benefit of provisional application No. 60/498,656, filed Aug. 29, 2003.

COPYRIGHT AND TRADEMARK NOTICES

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

ZENU™ is a trademark of Change Tools Inc. Unix is a registered trademark of The Open Group. Microsoft, Microsoft Windows, Window NT and/or other Microsoft products referenced herein are either trademarks or registered trademarks of Microsoft Corporation. Various terms and icons in the figures may be trademarks or registered trademarks of other companies.

FIELD OF THE INVENTION

The present invention relates generally to the field of user interfaces within a data processing system and more particularly, to a user definable interface overlay capable of manipulating multiple functions and windows in a graphical display.

BACKGROUND OF THE INVENTION

The manipulation of data in a data processing system is well known in the art and the large amounts of data that are available to the user of a modern state-of-the-art data processing system often become overwhelming in magnitude and complexity. Similarly, many consumer devices have interfaces requiring human interaction to control the device or a peripheral connected thereto. As a result of this increasing complexity, simplified interface methods and systems are needed between the user and the data processing system or device.

One example of a simplified system and method is the utilization of a graphic user interface ("GUI"). A GUI is an interface system by which a user interacts with system components, and/or system applications via a visible display having, for example, windows or view ports, icons, menus, pointing devices, etc. One of the many advantages of GUIs in the computer field is their ability to represent computer application programs, documents and data as graphical display elements or icons as opposed to text-based elements.

Menu driven software programs are a specific example of a GUI. Such software programs enable a user to choose from a list of items that can be accessed directly by pulling down different menus from the menu bar, rather than requiring the user to remember the name and syntax of a command. GUIs were developed so that novice users could more easily make a selection among available commands and, thus, operate computers. In the computer field, these menu driven software programs eventually lead to the development of a windowing environment in which the user may have multiple programs and files operable at one time with a selection among multiple commands. Each command appears in a window of the program data file being worked on. To effect selection within applications and switching between windows, a hand operated pointing device becomes a critical component of a computer system running windows based software applications. One example pointing device is a mouse.

Applications running in a windowed environment typically have a main menu bar with more specific commands being displayed in "pull down" menus stemming from specific portions of the main menu bar command headings. When the user wants to execute a command, the user must move the pointing device so that a cursor on the display points to the command on the desired menu heading. The command heading activates a pull down menu that displays a plurality of commands available for execution. In some instances, computer systems create hierarchies of menus (also referred to as "nesting") leading to submenus to avoid excessively large menus or inappropriate menu chains. A command from the pull down menu may then be selected for execution. In accordance with conventional methods, only one command is executed at any given time since the pull down menu is typically limited to a single column of possible choices or objects. Movement amongst the menu bar and the pull down menus requires a great deal of movement of the pointing device (and thereby the cursor) to manipulate multiple windows or applications and their related commands. This movement is called "cursor commute." This results in a time-consuming, less efficient and confusing user interface. Therefore, it is difficult for the young, the elderly, handicapped, or any novice user to traverse and coordinate the position of the pointing device and, thus, the cursor with which the execution is made.

One attempt to avoid a long horizontal list of menu options has resulted in "pop-up menus." These menus have the advantage of bringing the menu to the cursor, rather than having to move the cursor to the menu. When a trigger event occurs, for example depressing the right button (known in the art as "right clicking") on the pointing device (e.g., a mouse), a window is displayed next to the cursor position and the menu items to be related are listed. When the user chooses a menu item, the menu is removed and the action corresponding to the item is initiated. Pop-up menus, however, are limited to the number of commands they can contain and they often cover up part of the work area.

Pie menus enhance pop-up menus by allowing directional selection to choose menu items. A pie menu is similar to a pop-up menu, but the pie shaped menu items surround the cursor position in a circle. In their two-dimensional form, pie menus may be round menus. The menu items are positioned around a small inactive region in the center of the circle like slices of a pie, rather than in rows or columns as in conventional linear menus. In operation, the cursor is initially located in the center of the pie in a small inactive region. The active regions representing the menu items are therefore adjacent the cursor, but each in a different direction, and menu items are selected by clicking the mouse and then pointing in the direction of the menu item.

What is needed is an interface to provide users with a definable interface that minimizes cursor commute and does not clutter the work area.

The need for more flexible, user-friendly, and user definable interfaces is also driven by the fact that Wireless Wide Area Networks (WWAN) and Wireless Local Area Networks (WLAN) have created the opportunity for true mobile data access. Wireless geographic coverage for WLANs ranges from a few meters (Blue Tooth) up to hundreds of meters for Wireless Fidelity (WiFi) networks. Although wireless WANs such as GSM (Global System for Mobile Communications), GPRS (General Packet Radio Service), and CDMA (Code Division Multiple Access) match cell phone coverage, with data rates ranging from thousands of bits per second (Kbps) to millions of bits per second (Mbps), the wireless connections between server-based information and roaming devices can encounter some of the following problems:

Unreliable wireless connections
Unknown bandwidth availability
Coverage issues (roaming)
Wireless and device security
Limited device processing power
Limited device battery power
Limited device display capability
Limited user device interfaces and buttons
Differing device software (browsers)

Desktop computers connected via LANs move data into and out of databases as standard business processes. However, this access is usually tied to a wired network. Users who have no access to the wired network resort to paper copies of data or laptop computers for remote access. Services to deliver data via wireless networks have grown in popularity. In general, WiFi networks are the most widely used means to wirelessly "connect" laptops or desktop computers to corporate data. Some PDAs also support Blue Tooth and WiFi hardware. Although WiFi networks have been able to provide reasonable coverage and bandwidth, security issues are still being addressed.

Delivery of data via cell phone systems, CDMA, GSM, or GPRS networks (WANs) also involves many of the issues listed earlier. While data rates in the hundreds of Kbps range are promised, the reality often falls far short. Bandwidth limitations are still a real problem for wireless transmission of data. The instant invention directly addresses bandwidth, security, processing, and usability issues with the ZENU™ application interface and the use of ZML, a markup language of Applicant's own design, and that features data definitions to provide for efficient generation and control of Zenu™ screens from server-based tools and applications.

BRIEF SUMMARY OF THE INVENTION

The present invention relates to a user definable interface that minimizes cursor commute, and to an interface architecture and tools that support efficient generation of user interfaces and linkages to other devices, to applications hosted on other devices, or to applications hosted on the same device as the user definable interface. The tools also support implementation of Zenu™ interface techniques in a broader concept wherein user definable interface templates are hosted on servers and delivered in real-time via wired or wireless communications media to one or more hand-held or other local devices being operated by a user.

The present invention is to be implemented in a cursor-based computing environment having a display, or being capable of generating a display (e.g., as in a retinal display unit, or a video projection unit). According to the present invention a user definable interface (UDI) is displayed upon activation by a user, wherein the UDI has a plurality of buttons and is displayed in a relative position about or near a cursor position to reduce cursor commute. The present invention permits the end user with no particular programming skills or specialized computer knowledge to select a visual appearance and shape of the UDI, and the number of buttons. The present invention also permits the user to assign a command to each of the plurality of buttons by dragging and dropping from one or more applications of the apparatus.

The present invention further permits the user to form a first group of buttons and at least a second group of buttons. The user is permitted to assign a first icon representing a first specific one of the one or more applications to a first given button of the first group and assign commands, associated with the first specific one of the one or more applications to the second group of buttons. The present invention further permits the user to assign a second icon representing a second specific one of the one or more applications to a second given button of the first group and assign commands, associated with the second specific one of the one or more applications to the second group of buttons. The appearance of, and commands associated with, the second group of buttons change based on which button of the first group of buttons is selected.

The present invention further permits the user to activate the UDI by at least one of clicking a hotkey, clicking a mouse button, or turning on the apparatus.

In a data processing system having a user defined interface (UDI) of the instant invention, an alternative method of the present invention comprises the steps of managing the UDI in response to user commands, providing at least one template that defines position for a plurality of command regions corresponding to the UDI, and providing a theme that defines attributes and commands for the for a plurality of command regions.

The present invention is also characterized as a device including a computer apparatus comprising a user defined interface (UDI) having a plurality of command regions, a command processor that manages an interactive skin (IS) and a customizer. The IS includes a template that defines position information for the plurality of command regions corresponding to the UDI and at least one of default attributes and default commands for the plurality of command regions, and a theme that defines attributes if the template only defines default commands for the plurality of command regions, or commands if the template only defines default attributes for the plurality of command regions. The customizer permits user replacing or user extending of the default attributes or the default commands of one or more of the plurality of command regions. Typically the user is an end user of the apparatus, but the invention is not so limited. Also, Applicants' interface may be easily customized by an end user lacking sophisticated computer skills.

The customizer permits a user to: hide the UDI; hide a portion of the UDI; have the UDI display upon launch; launch the UDI from a system tray; and scale the size of the UDI. Moreover, the UDI can be displayed in a relative position about or near a cursor position. The customizer permits a user to define that relative position.

Another aspect of the present invention is directed to a user definable interface that enables each user to control interaction with any given software package or operating system through a customized set of interactive nestable commands and functions based upon user preference with the convenience of edit functionality.

Another aspect of the present invention relates to a user definable interface that allows selection of multiple actions with a single user interaction.

It is also another aspect of the present invention to provide a user definable interface that is invisible until prompted by the user and can be set to disappear again after a user selection.

Another aspect of the present invention is directed to a user definable interface that is executable during work on an active file.

Another aspect of the present invention relates to a device, method and computer program product that provide an efficient on-screen work environment tailored to the user's needs.

It is yet another aspect of the present invention to provide a translucent executable user definable interface on a display screen that enables a user to observe the work space beneath the user definable interface through a centrally positioned window in the user definable interface, and also, in some embodiments, through buttons that may be part of a user definable interface.

It is another aspect of the present invention to permit selection of commands or functions by "clicking" an icon from a plurality of icons that enclose or partially enclose a central window. Clicking on a button causes one or more additional interface buttons or icons to appear, launches an application, opens a file, or opens a container.

Another aspect of the present invention is directed to an Internet browser and application launching tool.

The user definable interface of the present invention provides a number of advantages over other interface overlays known in the art. For example, it allows users to easily customize commands according to the user's preference. In addition, it may be configured to eliminate screen clutter by being invisible until activated and disappearing once a selection is made. Further, the present invention provides the user with the ability to view the work area on a display screen while the user definable interface is activated.

The instant invention includes the ZENU™ application, a data access program, and the ZTool utility, a rapid development tool for portable devices, which enables streamlined navigation and access of live data across all platforms through WLANs. Combining embedded graphic objects, ZML (ZENU™ Markup Language) property management and time-saving ZML scripting tools, the architecture of the instant invention offers a robust and user-friendly solution to technical issues confronting wireless data access, as shown in Table 1.

TABLE 1

Wireless Data Problems and the ZENU ™ Application Solution

| Wireless Device Data Problems | The ZENU ™ Application Solution |
|---|---|
| Data out of sync | Data is real time without synchronization. |
| Deployment of new versions to users in the field | Changes become instantly available without loading new software on the device. |
| Unreliable wireless connections | Fewer bits means less processor time |
| Unknown actual bandwidth availability | Fewer bits means faster transmission |
| Wireless and device security | Encryption of packets, SSL, VPN |
| Limited device processing power | Server side does all the processing |
| Limited device battery power | Limited processing required by PDA |
| Limited user device interfaces and buttons | User-friendliness and intuitiveness of the ZENU ™ interface |
| Differing device software (micro-browsers) | Standard ZENU ™ with ZTool utility |
| Intermittent connectivity - Data is unavailable if wireless connection is unavailable | Option is available to cache data locally if a connection is not available |

These and additional features and advantages of the invention will be set forth in the detailed description that follows, and in part will be readily available to those skilled in the art from that description or recognized by practicing the invention as described herein.

It is to be understood that both the foregoing general description and the following detailed description are merely exemplary of the invention and are intended to provide an overview or framework for understanding the nature and character of the invention as it is claimed.

Other objects of the invention will become clear upon a reading of the following specification.

BRIEF DESCRIPTION OF DRAWINGS

The features and advantages of the present invention will become more apparent from the detailed description set forth below when taken in conjunction with the drawings/figures in which like reference numbers indicate identical or functionally similar elements. Additionally, the left-most digit of a reference number identifies the drawing in which the reference number first appears.

FIG. 36 is a representative example of ZML data generated by ZTool.

FIG. 41 is a definition of a data structure for ZML.

FIG. 42 is an example of ZML data that may generate a Zenu™ display.

DETAILED DESCRIPTION OF THE DRAWINGS

Figure 1:
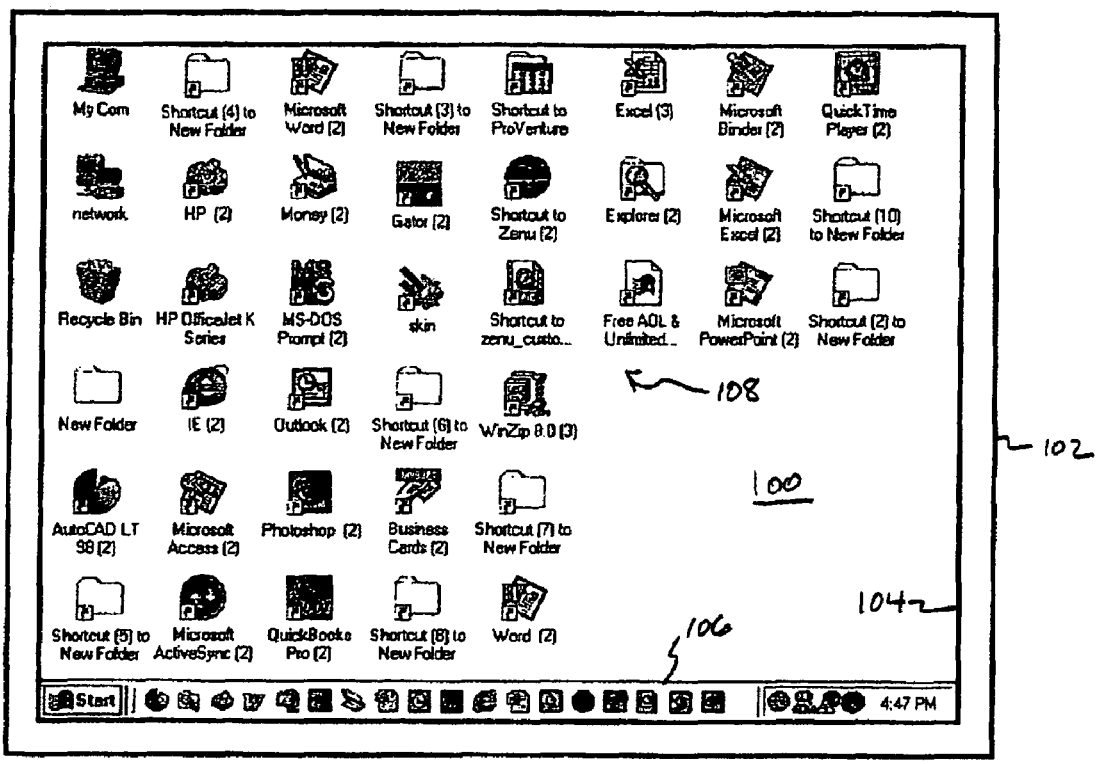
FIG. 1 is a screen grab depicting a cluttered desktop.

The preferred embodiment of the present invention will now be discussed in detail. While specific features, configurations and arrangements are discussed, it should be understood that this is done for illustration purposes only. A person skilled in the relevant art will recognize that other steps, configurations and arrangements may be used without departing from the spirit and scope of the invention. Indeed, for the sake of brevity, conventional electronics, software and/or computer architecture, and other functional aspects of the method/apparatus (and components of the individual operating components of the apparatus) may not be described in detail herein. Furthermore, for purposes of brevity, the invention is frequently described herein as pertaining to data processing devices, such as personal computer or laptop computers, or set-top boxes in a television computing environment. It should be appreciated, however, that many other devices having a user viewable display for interaction therewith, and/or control thereof could be readily modified to include the present invention, and thus the techniques described herein could be used in connection with other such devices. Moreover, it should be understood that the spatial descriptions (e.g., "next to", "above", "below", "up", "down", etc.) made herein are for purposes of illustration only.

The term "button" is used herein according to its customary meaning to refer to a graphical representation of an electrical push-button appearing as part of a graphical user interface, as would be apparent to a person skilled in the relevant art. Moving the pointer device over the graphical "button" and pressing (or "clicking") one of the physical buttons of the pointing device, for example, starts some software action such as closing a window or deleting a file. Alternatively, an interface may be configured so that allowing a cursor to dwell or pause over a button area for a user-controllable amount of time may initiate some command or action, such as changing a set of icons or choices presented on other buttons or controls, without requiring that a user press a button and make a choice.

The term "command" is used herein to refer to a software action taken when a button is activated. A command can launch an application, open a file, or perform some predefined function or set of functions.

The term "cursor" is used herein according to its customary meaning to refer to a movable symbol on a display device that shows where the user is working, whether typing in text, drawing lines, or moving something around. The cursor can be moved with the arrow keys or a pointing device. It usually appears in text programs as a blinking dash or rectangle, or an arrow. In graphics programs the cursor is often called a pointer, and can take many different shapes such as a brush, pencil, or hand, as would be apparent to a person skilled in the relevant art.

The term "display device" is used herein according to its customary meaning to refer to a device capable of displaying an image, such as a cathode ray tube (CRT) monitor, liquid crystal display (LCD), plasma display, or like device used to display text, graphics, images, etc., to a user, as would be apparent to a person skilled in the relevant art. "Display device," as used herein, may also refer to devices that create images in locations outside the device itself, and may include video projection equipment, such as projection monitors, devices capable of creating images or displays directly on a retina of an eye of a user, or equipment using lasers or other scanned light source to projector create an image or display, for example, on a side of a building, a screen, or other surface.

The term "pointing device" is used herein according to its customary meaning to refer to a mouse, track ball, touch pad, joy stick, voice activated control system, or the like device used to position a cursor on a display device, as would be apparent to a person skilled in the relevant art. A pointing device may include one or more buttons a user can press to initiate certain command or actions, which commands or actions may be determined by a location on a display of a cursor controlled by the pointing device. In some embodiments, as revealed further herein, a pointing device may include one or more small trackballs, particularly in a hand-held device, that can be controlled by a thumb or other digit of a user, and in some embodiments, such a trackball may also include a switch that may be controlled by a user depressing the trackball itself, similar to the manner in which a user may depress a button controlling a switch on a mouse. Such a trackball switch is available as a Trackball 360™ from ITT Industries, part of Cannon, Santa Ana, Calif.

The terms "user definable interface" and "Zenu™ UDI" are used interchangeably herein [or "hereinafter" since user definable interfaces are discussed in general terms earlier herein] to refer to the present invention as described below.

The term "window" or "windows" are used herein according to their customary meaning to refer to portions of the display device that are divided into areas, which function as a separate input/output device under the control of different application programs, as would be apparent to a person skilled in the relevant art. This gives the user the ability to see the output of several processes at once and to choose which one will receive input by selecting its window usually with a pointing device. WINO refers to Windows, Icons, Menus and Pointers (or maybe windows, icons, mouse, pull-down menus). The style of graphical user interface invented at Xerox PARC, later popularized by the Apple Macintosh and now available in other varieties such as the X Window System, OSF/Motif, NeWS RISC OS, and Microsoft® Windows, as would be apparent to a person skilled in the relevant art.

ZENU™ Application—A program designed to simplify the acquisition and display of applications and data on wireless devices and computers.

ZML Schema—Combination of ZML code and others, including JSP, Websphere, ASP.NET, read by the ZENU™ interface to create the ZENU™ page layout.

ZTool Utility—The server-side utility used to create the ZML schema.

I. Overview

FIG. 1 illustrates a conventional desktop 100 as presented on a display 102 in a window 104. The desktop 100 includes a taskbar 106, and a plurality of applications, folders, files, shortcuts, and the like (referred to generally as 108) cluttering the desktop. The desktop typically occupies the whole display, and attempts to represent the top of an office desk (i.e., a real desktop). On a conventional graphical user interface, the icons on the screen resemble objects that would be found on a real desktop, such as file folders, a clock, etc. Users like to locate applications, folders, files, shortcuts, and the like on the desktop for easy access. As is typical, access is no longer easy or convenient when the desktop becomes cluttered. Among the many advantages and uses of the present invention, it brings new order to the desktop.

Figure 2A:
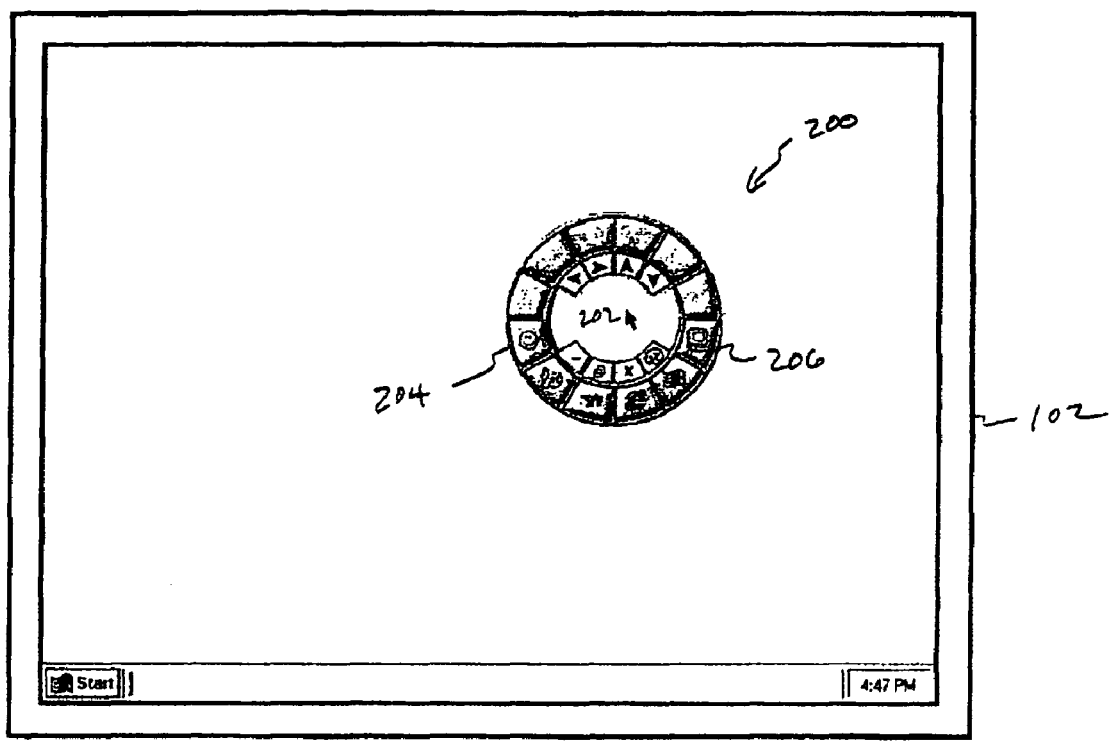
FIGS. 2A, 2B and 2C are screen grabs depicting a Zenu™ UDI, in accordance with the present invention.

FIG. 2A illustrates a Zenu™ 200, according to one embodiment of the present invention. In a cursor-based computing apparatus having a display 102, the Zenu™ 200 comprises a user definable interface (UDI) that is displayed upon activation by a user. The UDI has a plurality of buttons and is displayed in a relative position about the cursor position to substantially reduce cursor commute. The Zenu™ (UDI) 200 permits the user to select a visual appearance and shape of the UDI, as well as other characteristics, such as the number of buttons to be displayed and the commands associated with those buttons. Also, the Zenu™ 200 permits the user to assign commands to the buttons by dragging and dropping from one or more applications associated with (e.g., capable of running on, or otherwise coupled to) the apparatus.

In this embodiment, Zenu™ 200 can have multiple groups of buttons, according to a user's preferences. The multiple groups of buttons can have different functionality, or may have related functionality. For example, as illustrated in FIG. 2A, a first group of buttons on the lower half of the Zenu™ 200 (buttons 204, 206 and those located on the outer circumference there between) can each have a first class of functionality. The second group of buttons (such as the remaining buttons on the outer circumference on the top portion of Zenu™ 200) can have a second class of functionality, the second class of functionality having some association with the first class of functionality. For example, the first class of functionality can cause icons to appear on other buttons, and the second class of functionality can cause some action associated with another button to occur.

Figure 2B:
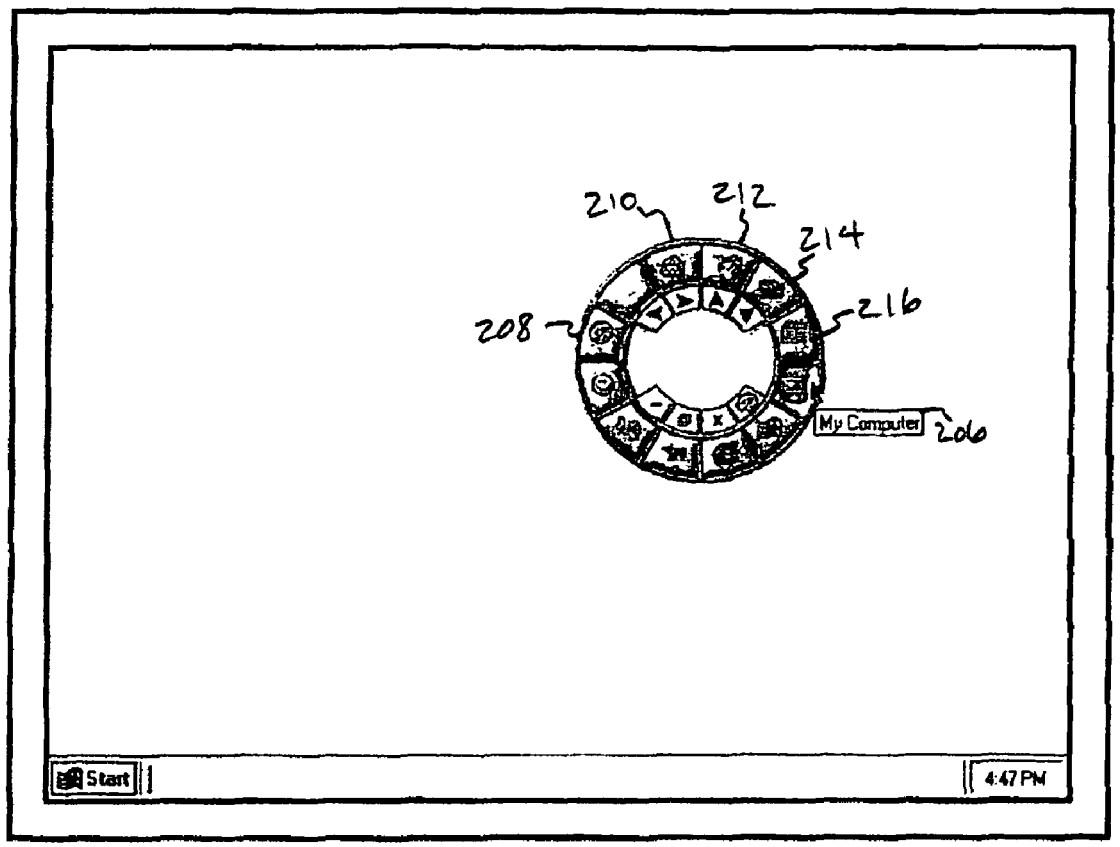

An example of the association between the first class of functionality of the first group of buttons and the second class of functionality of the second group of buttons is illustrated at FIG. 2B. By way of example, not limitation, reference is made to the "My computer" button 206. "My computer" button 206 is a button in the first group. When "My computer" button 206 is clicked or otherwise selected using a pointing device, software action causes icons to appear on the second group of buttons. In this example, buttons 208 through 216 of the second group of buttons display icons corresponding to options, commands, files, or the like, associated with "My computer" button 206 of the first group of buttons.

Figure 2C:
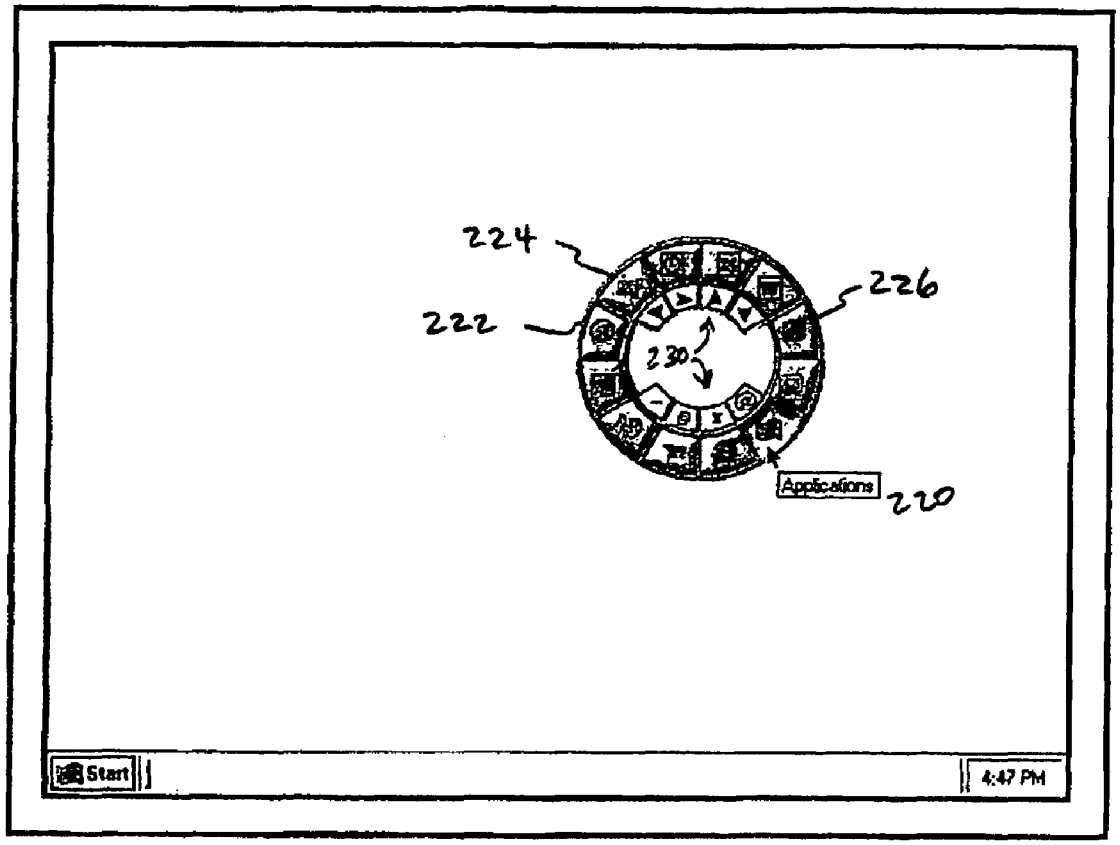

Similarly, as shown in FIG. 2C, when the user clicks or otherwise selects Internet browser button 220 of the first group of buttons, the second group of buttons will display features, commands, URLs, or the like, associated with the Internet browser button 220. Selecting the applications button 220 causes various icons corresponding to resident applications to be displayed on the second group of buttons, such as Zenu™ button 222, find button 224, Internet browser button 226, etc.

Zenu™ 200 can comprise additional groups of buttons as illustrated generally at 230. The commands associated with button groups 230 can comprise common cursor control operations as illustrated by the arrows at upper and lower groups 230, or the like.

Figure 3A:
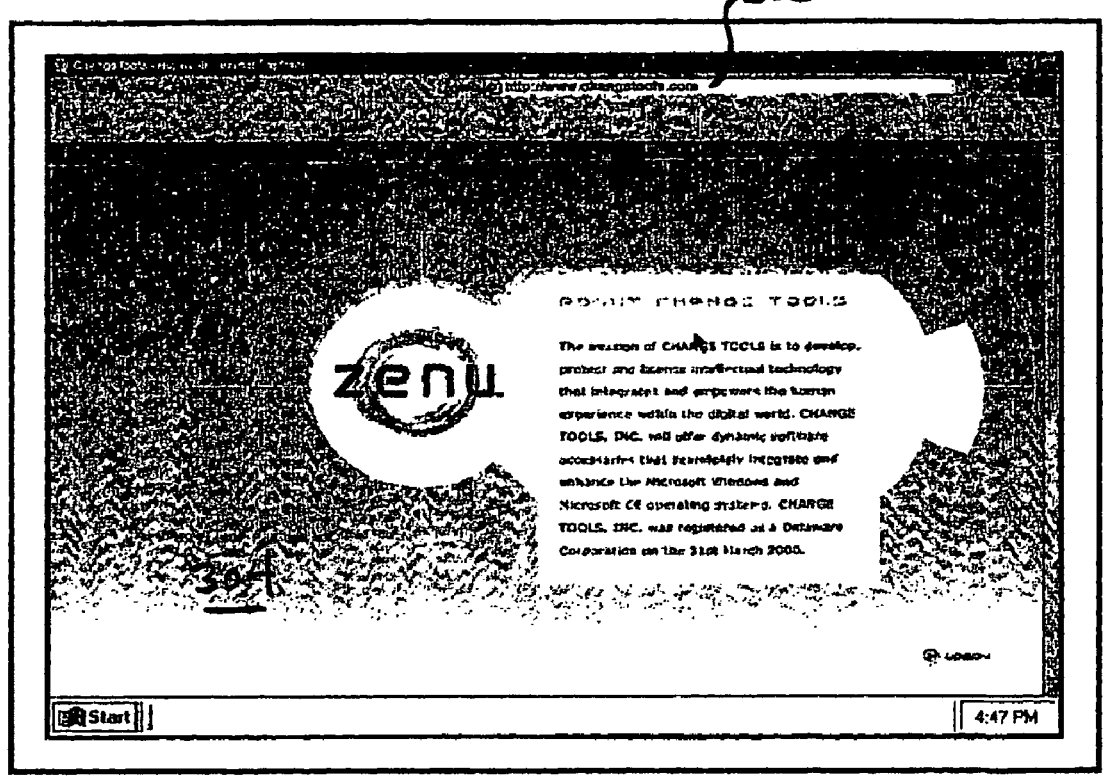
FIG. 3A illustrates a conventional toolbar accessing a web page.
Figure 3B:
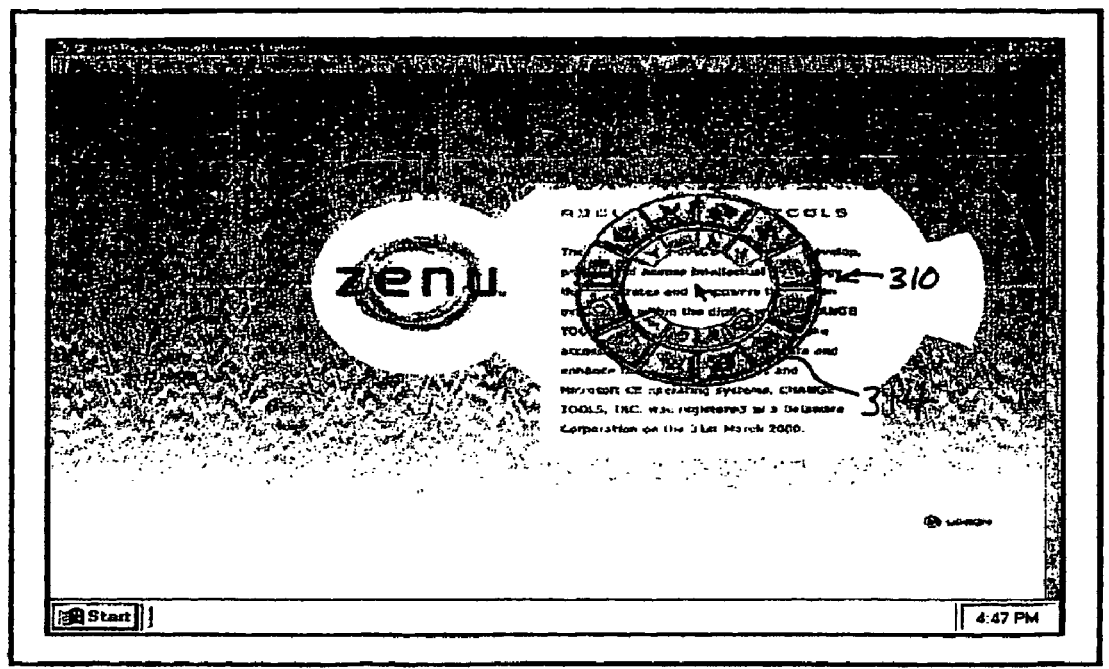
FIG. 3B illustrates a Zenu™ UDI accessing the web page of FIG. 3A, in accordance with the present invention.

FIG. 3A illustrates a conventional menu driven display, which in this case is a tool bar 302 of Microsoft® Internet Explorer. Illustrated in the main window is a web page 304 corresponding to the Internet address at 306. FIG. 3B illustrates Microsoft® Internet Explorer at the same web page after being launched by a previously invoked Zenu™ 310. The commands of tool bar 302 in FIG. 3A are illustrated in the upper button group of Zenu™ 310, as shown generally at 312.

Thus, according to the present invention, use of the Zenu™ 310 in this example simplifies the user's interaction with the Microsoft® Internet Explorer application by providing common Microsoft® Internet Explorer commands on the Zenu™ 310 for easy access by the user. Also, as will be described in detail below, the user can define the commands associated with the first group of buttons. For example, the web page displayed in FIG. 3B could be the home page associated with the Microsoft® Internet Explorer application. In this case, the user's selection of the icon 314 would bring up this web page. Further description of the functionality including the operation and definability of a Zenu™ UDI will be addressed in the next sections.

II. Functionality

A. Title Operation

1. What Can the Zenu™ UDI Do?

Figure 4:
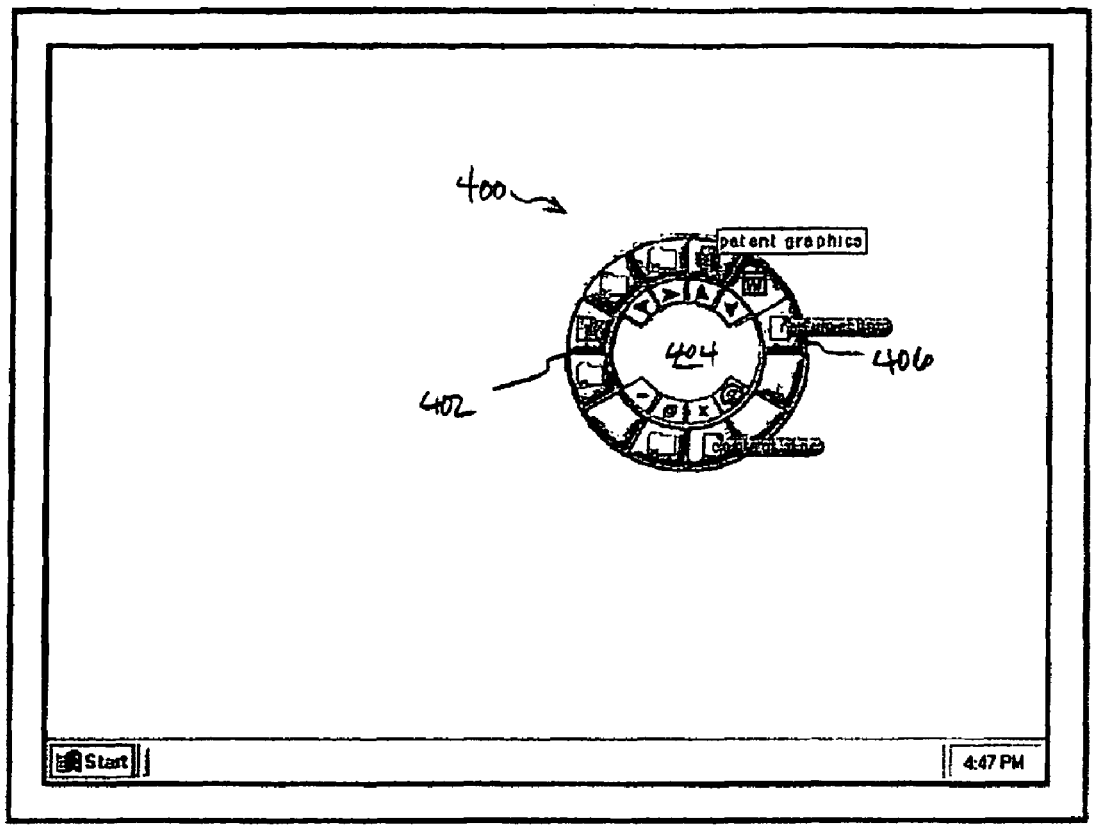
FIG. 4 illustrates a Zenu™ UDI corresponding to the present invention.
Figure 5:
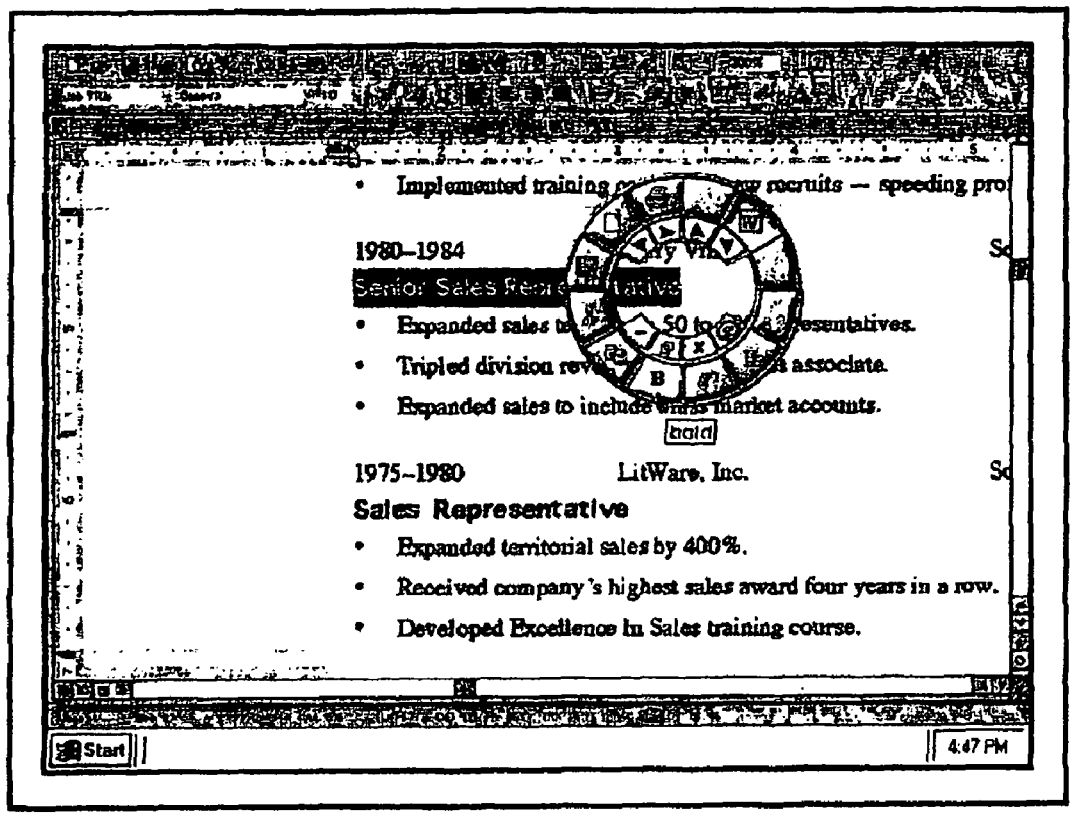
FIG. 5 illustrates the opening of a file with the Zenu™ UDI of FIG. 4, in accordance with the present invention.

FIG. 4 illustrates user definable interface (UDI or Zenu™) 400 used to launch applications, files, or web pages, or the like, according to an embodiment of the present invention. In this embodiment, Zenu™ 400 is in the form of a ring 402 having a group of buttons along its outer circumference and an open central section 404. Selected buttons have been associated with various software applications, files, folders, and the like. The illustration of such software applications, files and folders in the context of a personal computer or laptop is provided by way of example, not limitation. The present invention can be implemented with any apparatus having a display device for user interaction with the device. In this example, selection of the resume button 406 opens the file "resume.doc" and launches the associated software application (Microsoft® Word in this example), assuming that the application was not currently running. FIG. 5 shows the opened file and an associated application. Alternatively, the Zenu™ 400 can be modified by the user to launch various software applications. As would become apparent to a person skilled in the relevant art, the launching of software applications, opening of files, or accessing web sites are only examples of the type of launching that can be done from a Zenu™ UDI. The present invention should not be limited to such examples.

According to the present invention the Zenu™ UDI also functions as a controller. For example, after opening of the file 406, the appearance and command functionality of the buttons on ring 402 of Zenu™ 400 change, as illustrated in FIG. 5. Zenu™ 400's buttons now correspond to different commands than those of Zenu™ 400. Upon opening of the resume.doc file, the commands associated with Zenu™ UDI automatically switch to commands that correspond to various Microsoft® Word menu choices/actions. See, for example, "bold" action 502.

The Zenu™ UDI can have default commands associated with the various software applications, such as Microsoft® Word, or any other software application or control system capable of being controlled by a display device. Alternatively, the Zenu™ UDI can be modified by the user to launch various software applications. As would become apparent to a person skilled in the relevant art, the control of software applications, control systems or other apparatus coupled to a display device are only examples of the type of control functionality that can be performed by a Zenu™ UDI. The present invention should not be limited to such examples.

Figure 6:
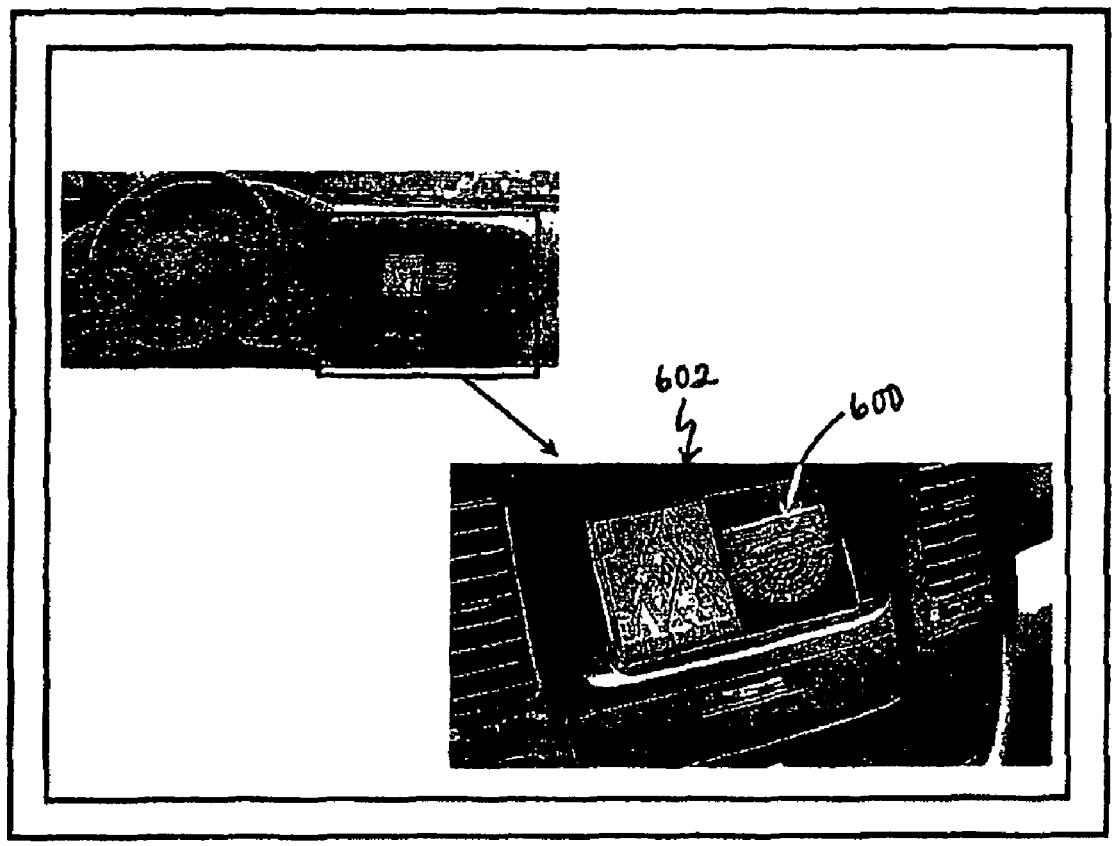
FIG. 6 illustrates an alternative control capability of a Zenu™ UDI, in accordance with the present invention.

Such alternative control capability of a Zenu™ UDI is illustrated in FIG. 6. In this figure, a Zenu™ 600 is visible on an automobile dashboard display device 602. The pointer device can be buttons integrated on the steering wheel, rotary dials and buttons on the dashboard, a touch screen on the display itself, a voice input system, and combinations thereof, as would become apparent to a person skilled in the relevant art.

A major advantage of such Zenu™ UDI integration is commonality. Once users become accustomed to the Zenu™ UDI's appearance, operation and definability, their efficiency in using new devices incorporating a Zenu™ UDI will dramatically improve. Many consumers complain that "I can't even program the clock on my VCR, yet alone my . . . ." This unwillingness and frustration of the general public to program consumer electronic devices, controllers, appliances, and the like can be redressed by integration of the Zenu™ UDI into a wide variety of devices. Thus, in other applications, the Zenu™ UDI can be integrated with hand-held controllers, such a remote controls for televisions, video equipment, home entertainment systems, cameras, household, including wireless telephones, copiers, as wells as commercial appliances and tools, and the like, as would become apparent to a person skilled in the relevant art.

Figure 7:
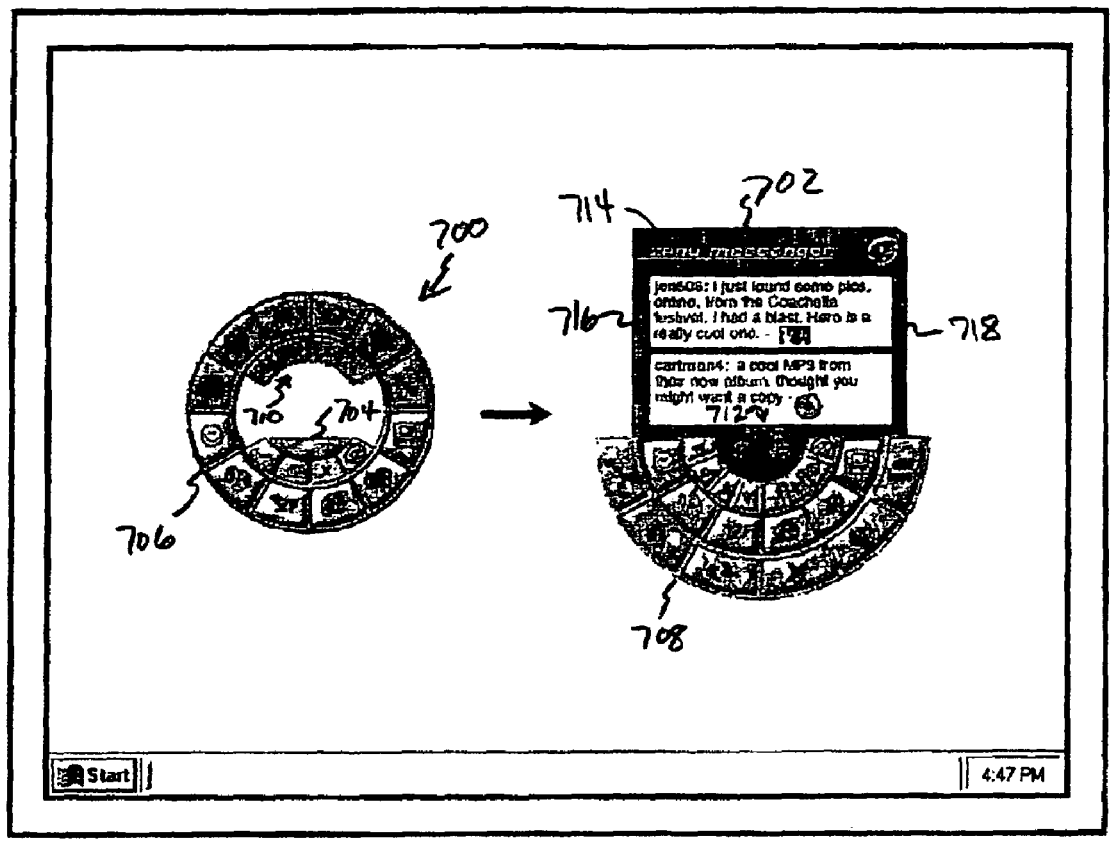
FIG. 7 illustrates a Zenu™ UDI configured with an instant messenger plug-in, in accordance with the present invention.

A further use of the Zenu™ UDI is as a container. FIG. 7 illustrated a Zenu™ 700 configured with an instant messaging plug-in. In this example, a container 702 is appended to the top of the Zenu™ 700 upon selection of the instant messaging plug-in button 704. This button 704 can be a button on the outer button ring 706 or elsewhere on the Zenu™ 700. Once the container 702 is displayed, the upper buttons of the Zenu™ 700 are automatically flipped to form an outer bottom hemisphere ring (hemi-ring) 708. Also, upper inner ring buttons (shown generally at 710) are re-located to the bottom inner ring automatically. Various controls for the container 702 can be located at region 712, or along top 714 or sides 716, 718 of the container 702.

Alternative types of Zenu™ UDI containers include, but are not limited to tickers, video clip viewing, image viewing, quick file viewing, or the like, as would become apparent to a person skilled in the relevant art.

2. What Can the Zenu™ UDI Look Like?

Figure 8A:
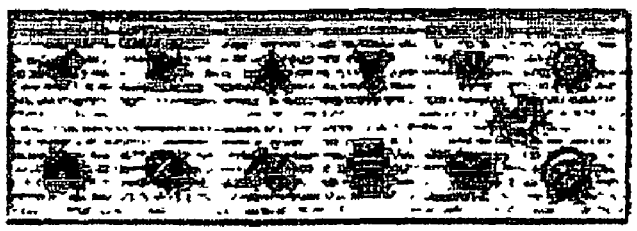
FIGS. 8A-F illustrate six exemplary Zenu™ UDIs, in accordance with the present invention.
Figure 8B:
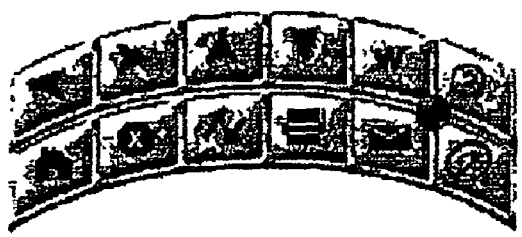
Figure 8C:
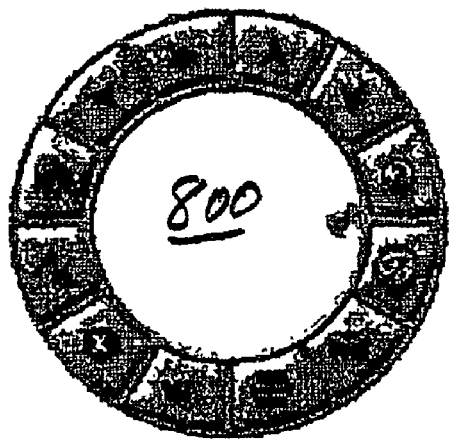

The user definable characteristics of a Zenu™ UDI are extensive. A main definable characteristic of a Zenu™ UDI is its shape. FIGS. 8A-F are illustrate six exemplary Zenu™ UDIs. These example are presented by way of example and not limitation. FIG. 8A illustrates a rectangular Zenu™ UDI comprising rows and columns of Zenu™ buttons. FIG. 8B illustrates a Zenu™ UDI similar to FIG. 8A, but the rows have an arch appearance. FIG. 8C illustrates a ring shaped Zenu™ UDI, with a central transparent window 800 and the same Zenu™ buttons of FIGS. 8A and 8B connected in a contiguous manner. Alternatively, a ring shaped Zenu™ UDI can have round buttons arranged in a noncontiguous manner, as illustrated in FIG. 8F.

Figure 8D:
Figure 8E:
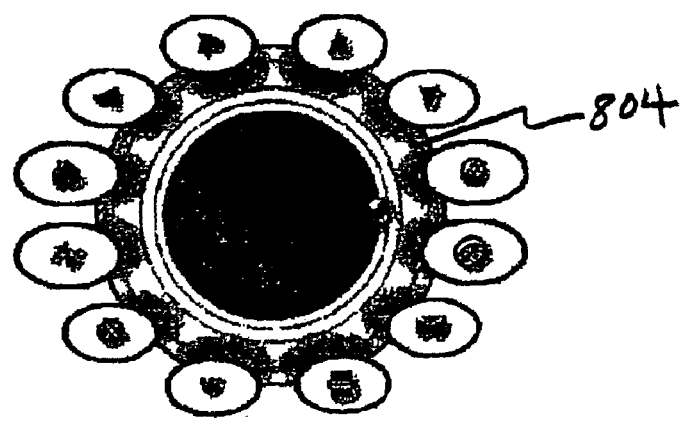
Figure 8F:
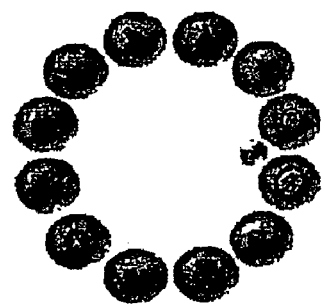

Two more stylized Zenu™ UDIs are shown in FIGS. 8D and E. In FIG. 8D, the Zenu™ UDI is in a rectangle, but in contrast to FIG. 8A, the Zenu™ buttons enclose a central rectangular area 802. Central rectangular area can comprise an advertisement, corporate brand, customizable text or images, or the like, or it can be transparent like area 800. Alternatively, the central section may comprise a Zenu™ container as described above in connection with FIG. 7. A further stylized Zenu™ UDI is shown in FIG. 8E. Here noncontiguous Zenu™ buttons surround a central circular portion similar to the enclosed area 802 of FIG. 8D. An inner border 804 is also included.

B. Definability

1. Defining Zenu™ UDI Look

Figure 9A:
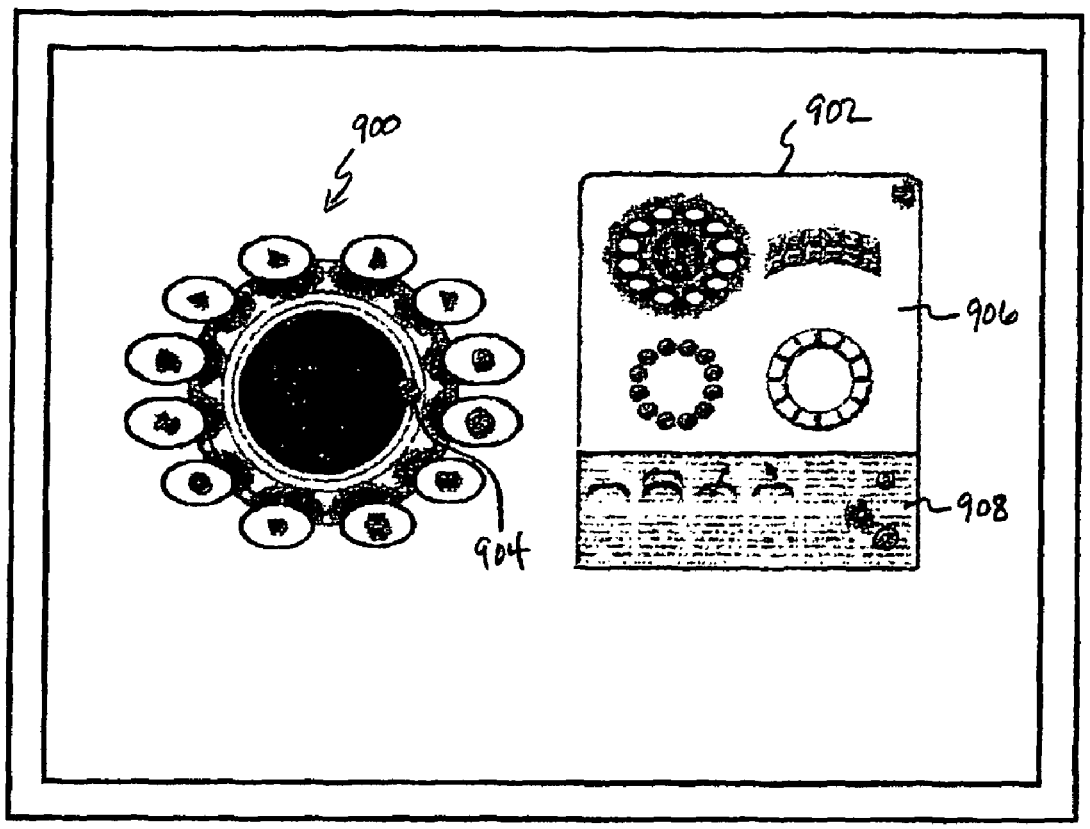
FIG. 9A illustrates a Zenu™ UDI and a interactive skin control panel, which is accessed by the user selecting Zenu™ UDI customization button, in accordance with the present invention.

Another aspect of the present invention is the ability of users to readily modify the appearance of the Zenu™ UDI. According to this aspect of the present invention, the user's ability to define the appearance of the Zenu™ UDI is hereafter referred to as providing an "interactive skin" for the Zenu™ UDI. FIG. 9A illustrates a Zenu™ 900 and a interactive skin control panel 902, which is accessed by the user selecting Zenu™ customization button 904. The interactive skin control panel 902 presents to the user a plurality of predetermined Zenu™ interactive skins (shown generally at 906), and a separate Zenu™ 908 for interacting with the interactive skin control panel 902. Interactive skin control panel 902 permits the user to select an interactive skin of the Zenu™ UDI according to various possibilities as described above in connection with FIGS. 8A-8F, for example.

The user's ability to define the appearance of the Zenu™ UDI using the interactive skin control panel 902 to select an interactive skins is not limited to selecting the shape and arrangement of buttons, as described above in connection with FIGS. 8A-F. Various Zenu™ interactive skin attributes can be modified, including, but not limited to color, shading, texture mapping, animation, scaling, and various other computer graphic affects, as would be apparent to a person skilled in relevant art.

Figure 9B:
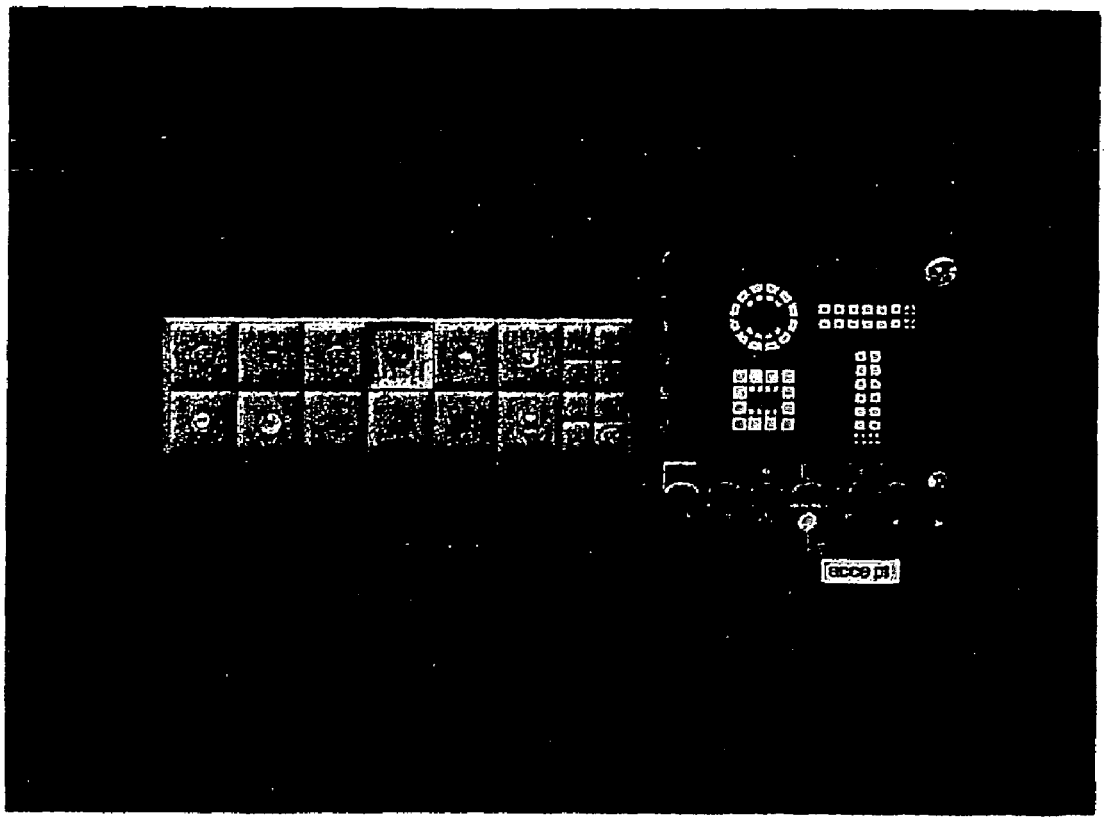
FIG. 9B illustrates an alternative to the Zenu™ UDI and a interactive skin control panel of FIG. 9A, in accordance with the present invention.
Figure 10A:
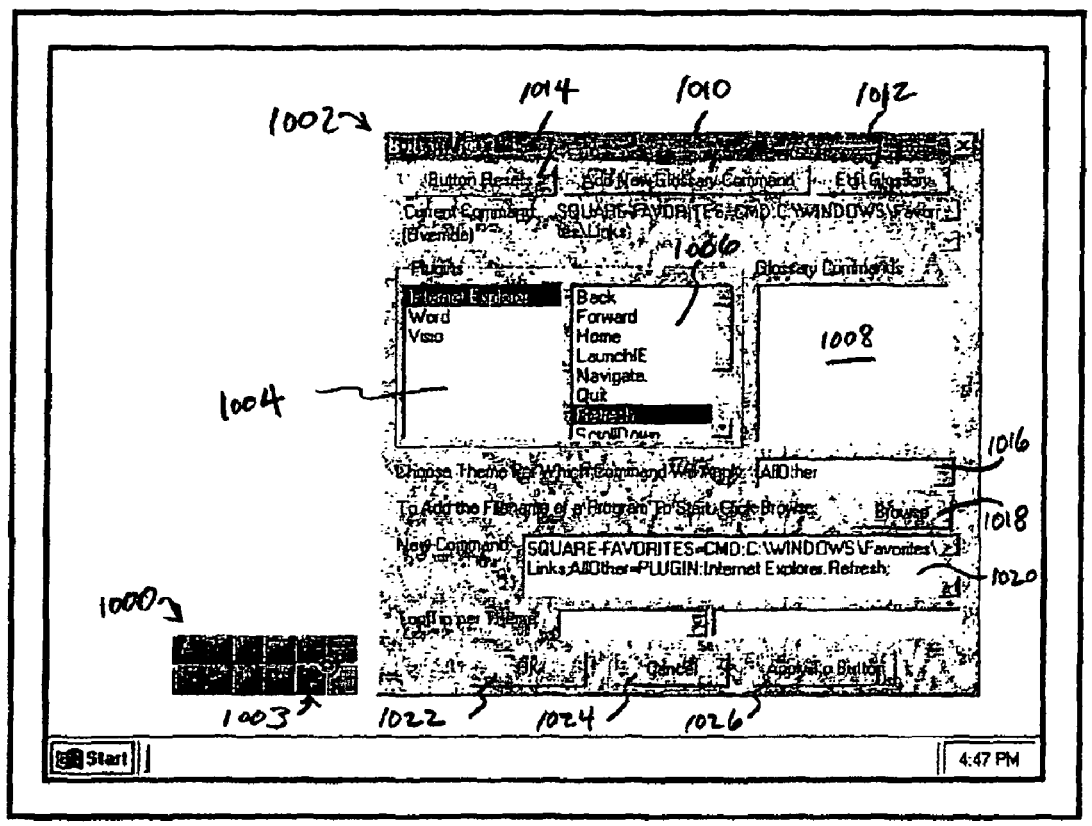
FIG. 10A illustrates a Zenu™ UDI and a functionality control panel, in accordance with the present invention.
Figure 10B:
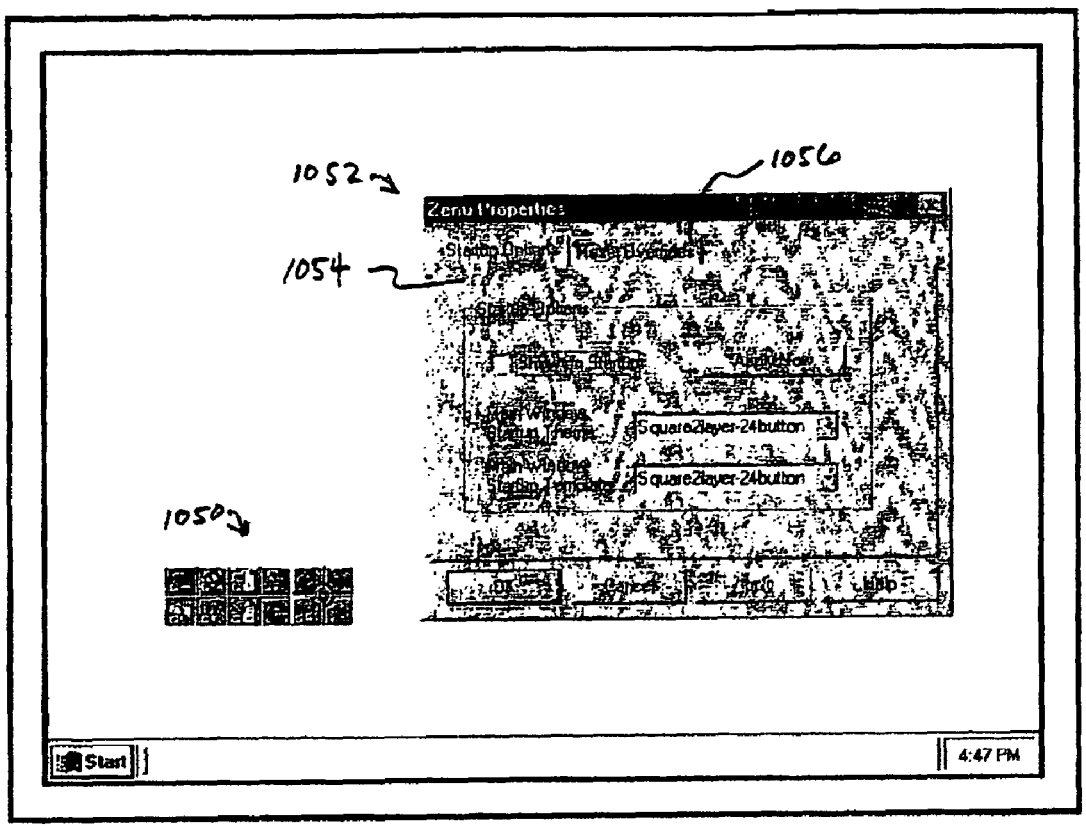
FIG. 10B illustrates a Zenu™ UDI and a properties control panel, which permits the user to define various "Startup Options", in accordance with the present invention.

The interactive skin control panel 902 illustrated in FIG. 9A is an example of a novice user control panel. FIG. 9B illustrates an alternative to the Zenu™ UDI and a interactive skin control panel of FIG. 9A, in accordance with the present invention. Examples of advanced user control panels are illustrated in FIGS. 10A and 10B.

2. Defining Zenu™ UDI Functionality

In addition to permitting the user to define an interactive skin for a Zenu™ UDI, according to another embodiment of the present invention, users can also define the functionality of the Zenu™ UDI. FIG. 10A illustrates a Zenu™ 1000 and a Zenu™ UDI functionality control panel 1002. The Zenu™ UDI functionality control panel 1002 is also accessible via the Zenu™ customization button 904. The Zenu™ functionality control panel 1002 represents an advanced user control panel.

Various software application commands can be assigned using the "plugins" 1004 and 1006. The currently available applications are listed in window 1004 and their associated commands are listed in window 1006. "Glossary Commands" are available to the user in a window 1008. New glossary commands can be added via a button 1010, and/or edited via a button 1012. Button resets are available via button 1014. Selection of an available theme, as described in detail below, can be applied via a pull-down menu 1016. Alternatively, a program to be started upon clicking the button being defined can be selected by a "Browse" button 1018. The new command string for the button being defined is displayed in a window 1020. Conventional control panel buttons "OK", "Cancel" and "Apply to Button" (1022, 1024 and 1026, respectively) are also provided.

In this figure, the Zenu™ functionality control panel 1002 illustrates the functionality of a exemplary button 1003 (as shown at the top of the Zenu™ functionality control panel 1002). Button 1003 is "Square," and its current command is associated with the Internet Explorer "Refresh" action.

Button 1003's command string is listed in window 1020. The Refresh icon (two opposing arrows) is shown on the Zenu™ 1000.

A "ToolTip per Theme" option permits the user to assign, via a pull-down menu, text that is to be displayed when the cursor floats over a button. The ToolTip text explains the command to be performed, such as "My Computer" when the cursor passes over button 206, as shown in FIG. 2B.

FIG. 10B illustrates a Zenu™ 1050 and Zenu™ properties control panel 1052, which permits the user to define various "Startup Options" 1054. Alternatively, the user can select to "Reset Overrides" by selecting tab 1056 (the Startup Options 1054 occults the Reset Overrides options in the figure).

3. Disabilities Act Compliance

In 1998, Congress amended the Rehabilitation Act to require Federal agencies to make their electronic and information technology accessible to people with disabilities. Inaccessible technology interferes with a disabled individual's ability to obtain and use information quickly and easily. Section 508 of the Rehabilitation Act of 1973, as amended (29 U.S.C. 794d), was enacted to eliminate barriers in information technology, to make available new opportunities for people with disabilities, and to encourage development of technologies that will help achieve these goals. The law applies to all Federal agencies when they develop, procure, maintain, or use electronic and information technology. Under Section 508, agencies must give disabled employees and members of the public access to information that is comparable to the access available to others.

According to another embodiment, the Zenu™ UDI of the present invention can be adopted for the following, non-exhaustive list of Technical Standards of Subpart B, Section 508: 1194.21 Software applications and operating systems; 1194.22 Web-based intranet and internet information and applications; 1194.23 Telecommunications products; 1194.24 Video and multimedia products; 1194.25 Self contained, closed products; and 1194.26 Desktop and portable computers. Those skill in the art will readily envision other similar applications for the Zenu™ UDI of the present invention.

III. Exemplary Architecture

A. Interactive Skin

Figure 11:
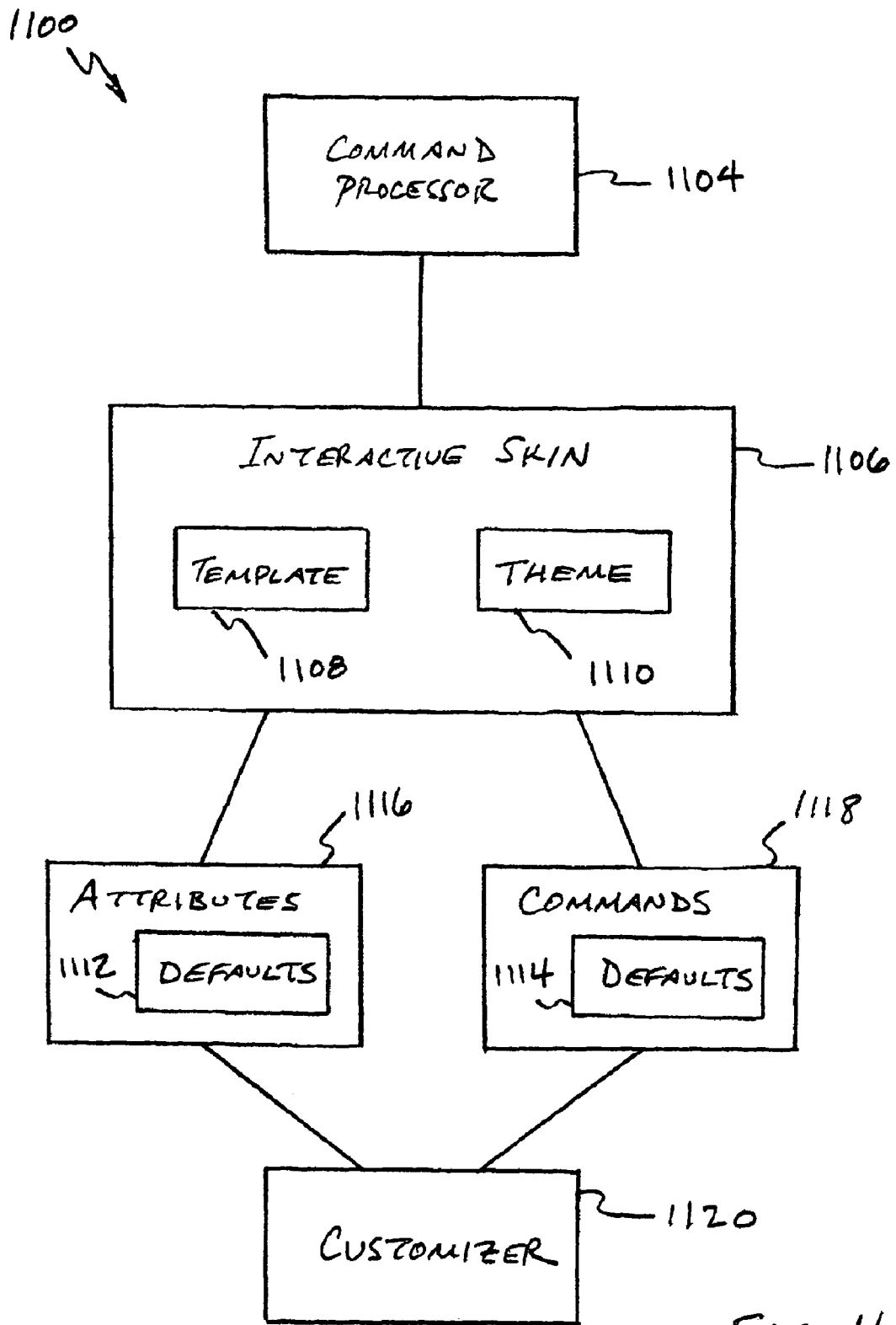
FIG. 11 depicts an exemplary architecture having a command processor that manages an interactive skin (IS), in accordance with the present invention.

This section describes an exemplary architecture for implementing a Zenu™ UDI having a plurality of command regions. Command regions correspond to the various Zenu™ buttons described above, for example. According to an embodiment of the present invention, FIG. 11 depicts an exemplary architecture 1100 having a command processor 1104 that manages an interactive skin (IS) 1106. IS 1106 comprises a template 1108 and a theme 1110. The template 1108 defines position information for the plurality of command regions corresponding to the UDI (not shown). Template 1108 also defines default attributes 1112 or default commands 1114 for the plurality of command regions. The theme 1110 defines (1) attributes 1116 if the template 1108 only defines default commands 1114 for the plurality of command regions, and/or (2) commands 1118 if the template 1108 only defines default attributes 1112 for the plurality of command regions. A customizer 1120 is provided to permit the user to replace or extend any of the default attributes 1112 or the default commands 1114 of any of the plurality of command regions.

B. Exemplary Architecture Syntax

This section describes the various syntactical expressions used to create the UDI interface and the functionality applied to certain click areas, whether they appear as buttons or just a portion of an image. These settings are stored in a Template file (.tpl), and a Theme file (.thm) located in the subdirectories "Template" and "Theme" respectively, for example. Settings can also be stored in a text initialization file (.ini).

Order of precedence dictates which settings are used. Settings that originate in the Template file can be replaced by settings in a Theme file, and the resulting settings can further be replaced by user/application-defined settings in the initialization (i.e., customization) file.

For the purpose of this document, action areas will be called "buttons" although they can appear as any bitmap that is specified in the resource file, thereby making it possible for a button to take most any shape or look that is possible using combinations of background bitmaps, and button bitmaps.

1. Settings

The currently available settings for UDI buttons or action/click areas are defined as follows in Table 2:

TABLE 2

| | |
|---|---|
| A | Indicates that this area is available to be morphed into a Quicklaunch or Internet Favorites button. |
| Transparent | Indicates whether there is a transparency color in the bitmap that is to be used for the button. |
| Bitmap | The Name of the Bitmap resource that is to be used for the button. |
| BtnType | The number of states that the bitmap has, for instance: normal, pressed, flyover, and disabled. |
| Tooltip | The tool tip to display when a user hovers the mouse cursor over the button. *Note, when in a template or theme file there is no need for a theme specific indication because that particular file is already theme specific. However, in the initialization file, tool tips must be associated with specific themes because the .ini file itself is not theme specific. |
| Tweak | Provides a means of adjusting button locations more accurately than a dialog resource allows. |
| AutoRepeat | Indicates whether a button repeats the "click" command if a user holds the left mouse down while clicking. An example might be a button that is used for scrolling. |
| Checkbutton | Indicates whether the button stays in the pressed position until another button on the window is pressed. |
| Icon | Specifies the name of the Icon (or bitmap) located in the resource file to be used with a button. |
| IconType | Indicates whether the name specified by "Icon" was a bitmap or Icon. |
| Template Theme | Indicates opening the specified window named. If the window specified by "Template" is found, this setting will make the window apply the theme specified. |

2. Settings Syntax

Acceptable Values Are Listed Below in Table 3:

TABLE 3

| | |
|---|---|
| A | "QL" for Quicklaunch or "BM" for Internet Favorites Book mark |
| Transparent | True or False |
| Bitmap | The name of the bitmap in the resource file. |

TABLE 3-continued

| | |
|---|---|
| BtnType | A number between 1 and 4 |
| Tooltip | Text |
| Tweak | X, Y with both values being an integer number |
| AutoRepeat | True or False |
| CheckButton | True or False |
| Icon | Name of an Icon or Bitmap located in resource file |
| IconType | "Bitmap" or "Icon" |
| Template | The text name of a Template. |
| Theme | The text name of a Theme to apply to the window. |

*There should not be any spaces in the text, except when a name has a space in it, for instance "Bitmap=Cat Eye;" where the bitmap is named "Cat Eye".

The follow is an examples string using proper syntax:

BtnType=3; Bitmap=TWO;Transparent=FALSE;Template=zenu;Theme=MyComputer;.

Where: BtnType indicates the button has 3 states—normal, pressed, and flyover. Bitmap specifies that there is a bitmap in the resource file with the name of "TWO" that is to be applied to this button. "Transparent=False;" states that there is no transparency color in the bitmap. The "Template=zenu; Theme=MyComputer;" indicates that when the button is clicked, the main window named "Zenu™" will change its theme to the "MyComputer" theme.

3. Button Command Syntax

Each command entered for a button to process upon clicking, must be separated with a semi-colon, for instance:

CMD:http://www.cuspis.com;c:\winnt\system32\calc.exe;.

The "CMD:" shown above is a keyword specifying that this command is not from a plugin. If the use wishes to process a plugin command, the "PLUGIN:" keyword would have to precede the command itself, for instance:

PLUGIN:word.bold;.

If the user wants to process commands from both plugins and non-plugin commands, the keyword "CMD:" or "PLUGIN:" must precede the command in the text. In addition to the "CMD:", the user can also specify a double-click action by using the keyword "CMDDBL:".

For Instance:

CMDDBL:"Template=zenu;Theme=Quicklaunch; Icon=QUICKLAUNCH;IconType=Icon; Tooltip=Quicklaunch"; .

Another example is as follows:

CMD:http://www.cuspis.com;c:\winnt\system32\calc.exe;PLUGIN:word.bold;.

In response to the text of this second example, the program will open (if not open already) the web browser, and navigate to http://www.cuspis.com, next it will open the calculator program (if the path to the file is correct), and if MS word is open, will process the plugin command word.bold.

4. Theme Specific Commands

A user can specify commands that are only activated while using a specific theme. For instance, if the user wanted a button to open the calculator program when using a theme called "Math", but wanted this button to open http://www.amazon.com any other time, the user could write the following command:

AllOther=CMD:http://www.amazon.com;
Math=CMD:C:\winnt\system32\calc.exe;.

In the above sample command, if the theme called "Math" was the current theme, the calculator program will open, otherwise for all other themes, this button will open the browser to amazon.com.

The following is yet another sample command:

Math=CMD:c:\winnt\system32\calc.exe;Favorites=http://www.msn.com;.

By using of a theme called "Retro", and the user then click the button with the command above, the Zenu™ UDI will not use either command. Instead, the Zenu™ UDI will look for the default command for the button in the template resource file.

5. Click and Drag

Users can click and drag shortcuts from the Windows desktop or Windows Explorer to a Zenu™ button of the present invention. This will cause the button to have the same action as the shortcut. If a file that is not a shortcut is dragged from Windows Explorer to a Zenu™ button, the Zenu™ UDI will make the button a shortcut pointing to the file that was dragged. For instance, if the user drags a Microsoft® Word or notepad document onto a Zenu™ button, clicking that Zenu™ button will now open the document that was dragged onto the button. This overrides the default action of the button defined in the template or theme file as well as user-defined commands.

6. Hot Key

A "Hot Key" can be assigned by the user to show/hide the Zenu™ UDI. For example, a specific, default set of key strokes, say Alt+F10, can be used. The user can readily change the default Hot Key, by right clicking anywhere on the UDI, and accessing "customize" and then the "Hot Key" feature. Next, all the user needs to do is press the desired key combination for the Hit Key, and it will be recorded in the text box of the Hot Key window. When the user is finished selecting the desired Hot Key, the user simply clicks "OK". This will change the Hot Key, and store it so that the next time Zenu™ UDI is executed, it will use the same Hot Key combination to show/hide.

D. Sizing of the Zenu™ UDI

The Zenu™ customizer of the present invention also permits the user to change the size of the Zenu™ UDI (i.e., the space occupied on the screen by the Zenu™ UDI). Sizing can be an integral component of the tool, permitting the user to scale (stretch or shrink) the Zenu™ UDI to match the desired size. Sizing could be arbitrary, as in permitting the user click on an edge or "handle" and changed the size of the Zenu™ UDI. In a preferred embodiment, however, the user would be presented with a finite number of size option, say three sizes: smaller, normal, and larger. This allows exact scaling of the Zenu™ UDI to eliminate distortion and to maintain its aspect ratio. In another embodiment, up to ten different sizes are available including "full screen", which becomes an attractive option when the Zenu™ UDI acts as the container for chat, video, browsing, mail, and the like.

The template and the theme can be designed to include knowledge of the multiple sizes available. Alternatively, all that is required is the "Normal" set of templates and theme components. As the user selects to change the size, the template/theme combination is scanned for prior-knowledge of possible sizes. The customizer can presents user with the additional choice(s). Once a new size is chosen, imagery designed specifically for the different size is used. In the event that an image is not provided or available at the different size, the normal image is scaled to match the destination, as would become apparent to a person skilled in the art of developing window-based applications. Sizing of the Zenu™ UDI provides greater flexibility when implemented with the templates and themes. The system that allows the designers to choose whether they desired to re-use a simple graphic at multiple resolutions, or to duplicate an image for different resolutions increasing or decreasing the amount of detail included in the image. This is similar to conventional icon on the desktop; an icon (.ico) can contain up to four different images, two each in black and white and color at 16×16 and 32×32 pixels.

E. Exemplary Architecture Operation

FIGS. 12 through 19 are flow diagrams illustrating the operation of an exemplary Zenu™ UDI system and method according to an embodiment of the present invention. For ease of explaining this example, the Zenu™ UDI comprises an application executing on a personal computer in a Microsoft® Windows environment. The Zenu™ UDI from a file resident in the computer system, such as in a fixed drive or other memory medium.

Figure 12:
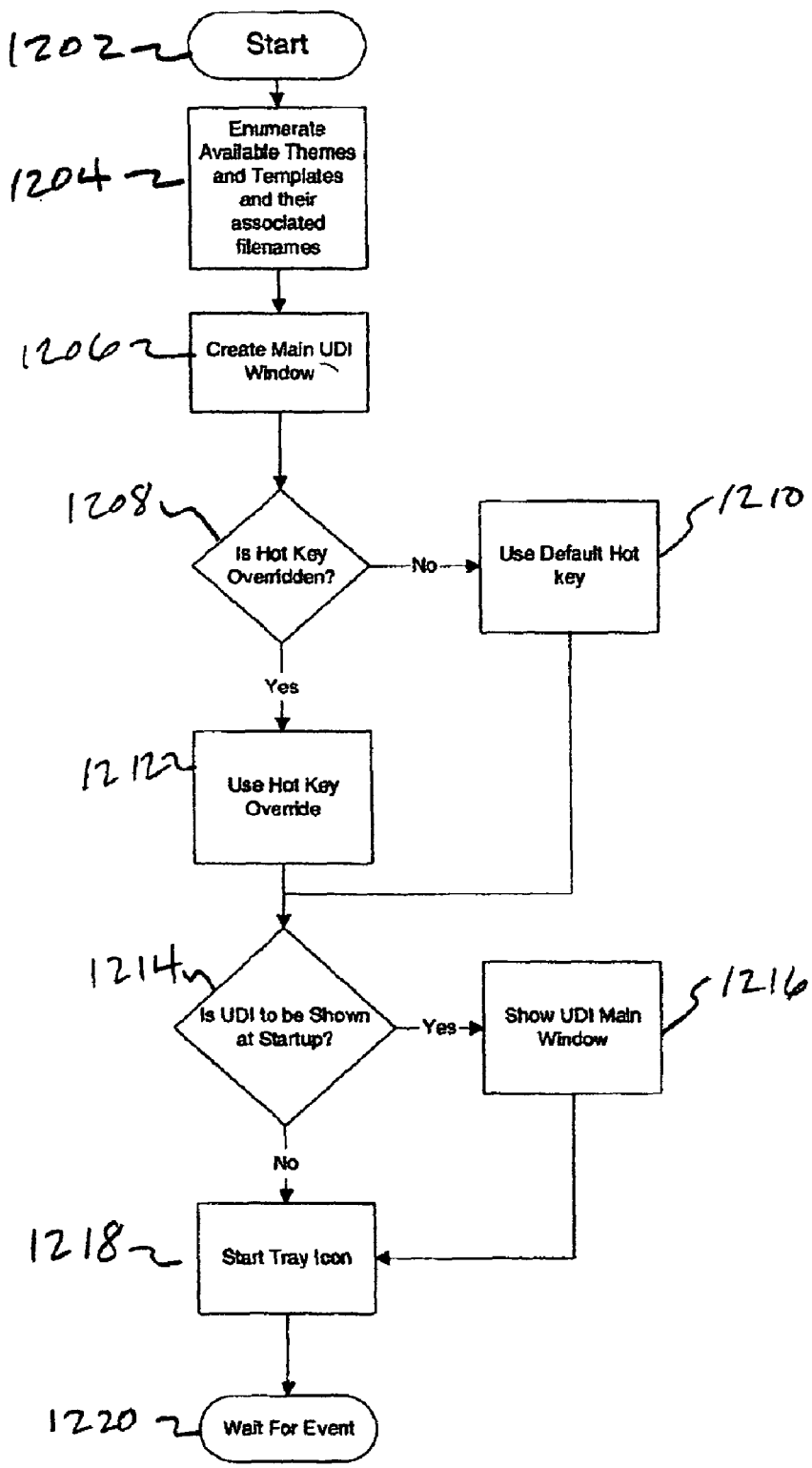
FIGS. 12 through 19 are flow diagrams illustrating the operation of an exemplary Zenu™ UDI system and method according to an embodiment of the present invention.

Turning to FIG. 12, a step 1202 represents launching of the Zenu™ UDI. Thus, once launched in this manner, the Zenu™ UDI is loaded in the computer's random access memory (RAM) and either appears as an icon in the Window's system tray, or is displayed for the first time. At a step 1204 available themes and templates are enumerated according to their associated file names so as to create a main UDI window, as shown at a step 1206. As part of the launching process, a decision is made at a step 1208 as to whether a default Hot Key has been overridden. If not, a default Hot Key is assumed as shown at a Step 1210. If the default Hot Key was overridden, the system will use the Hot Key override as shown at a step 1212. Next, at a decision step 1214, it is determined whether the UDI is to be shown at startup. If YES, the UDI is displayed, as shown generally at a step 1216. Otherwise, the UDI is started and placed in the Window's system tray as an icon, as shown at a step 1218. The system then waits for an event, shown generally at a step 1220.

Figure 13:
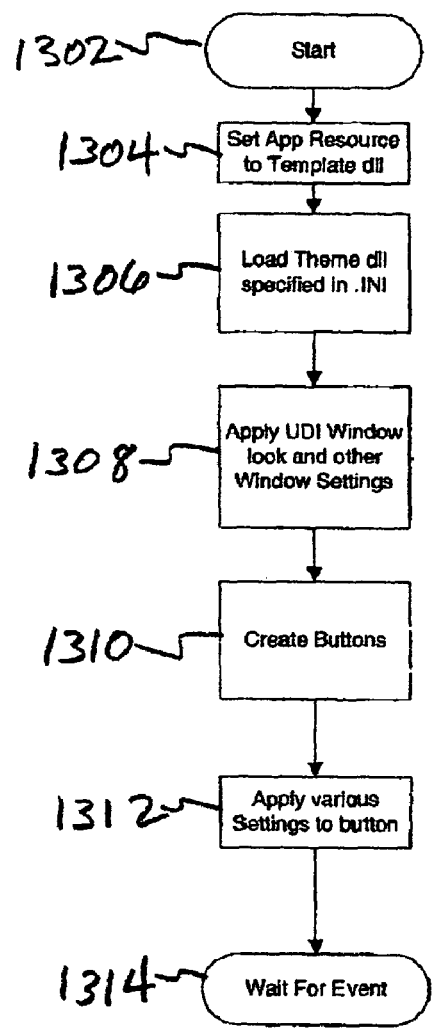

FIG. 13 is a flow diagram representing further details of step 1206 (create main UDI window) of FIG. 12. FIG. 13 illustrates how the Zenu™ UDI obtains its appearance and what it does in order to render such appearance using system windows from Microsoft® Windows. Creating basic windows for the UDI begins at a start step 1302. Then a set of application resources are passed to a Template .dll, as a step 1304. The Template .dll comprises the resources within the UDI that gives the Zenu™ UDI its shape and controls position of the buttons. At a next step 1306, a Theme .dll is loaded, as specified in an .ini file, or the like. The load Theme .dll stores all of the individual overrides of the Template in terms of its default appearance. At a next step, 1308, the relevant "UDI window look" is applied, together with other window settings. The details of step 1308 are described below in connection with FIG. 14. Next, at a step 1310, the buttons of the Zenu™ UDI are created as basic window definitions. The details of button creation are described below in connection with FIG. 15. Various settings of the buttons are then applied at a step 1312. The details of the button settings are described below in connection with FIG. 16. At a next step, 1314, the Zenu™ UDI waits for an event to occur. At this stage two events can occur; a button can be clicked, or a drop file unbutton event can occur. A "button click" is described below in connection with FIGS. 17 and 18. A "drop file unbutton event" is described below in connection with FIG. 19.

Figure 14:
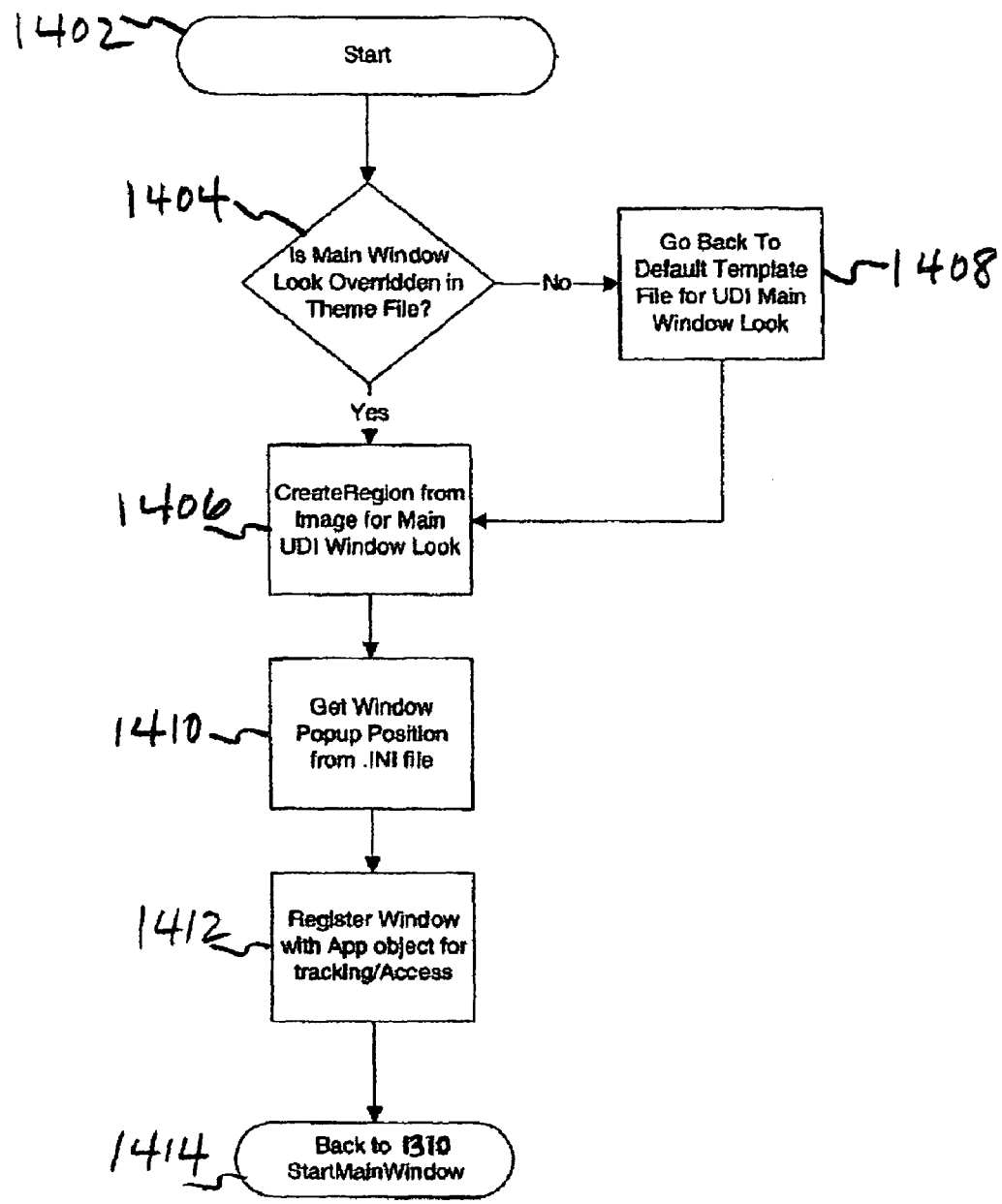

FIG. 14 describes the details of a plain UDI window look and other window settings as introduced at step 1308. This process starts at a step 1402. Based on the availability of the template and theme information, a decision is made (step 1404) to determine if the "main window look" is overridden in the theme file. If YES (i.e., the theme is going to be used), a region is created according to a "main UDI window look" in the theme, as shown at a step 1406. Otherwise, information from the default template will be used to create the region, as shown at step 1408. Next, at a step 1410, the window pop-up position information is retrieved from the .ini file. In other words, the position where the Zenu™ UDI was last displayed is obtained, or a cursor relative position is determined. At a step 1412 the window is then registered as an application object with a operating system for tracking and access purposes. Thus, the operation is performed and the flow FIG. of 14 represents a "shell" of the window for the Zenu™ UDI. Next, at a step 1414, the process flows to step 1310, which is further described in connection with FIG. 15.

Figure 15:
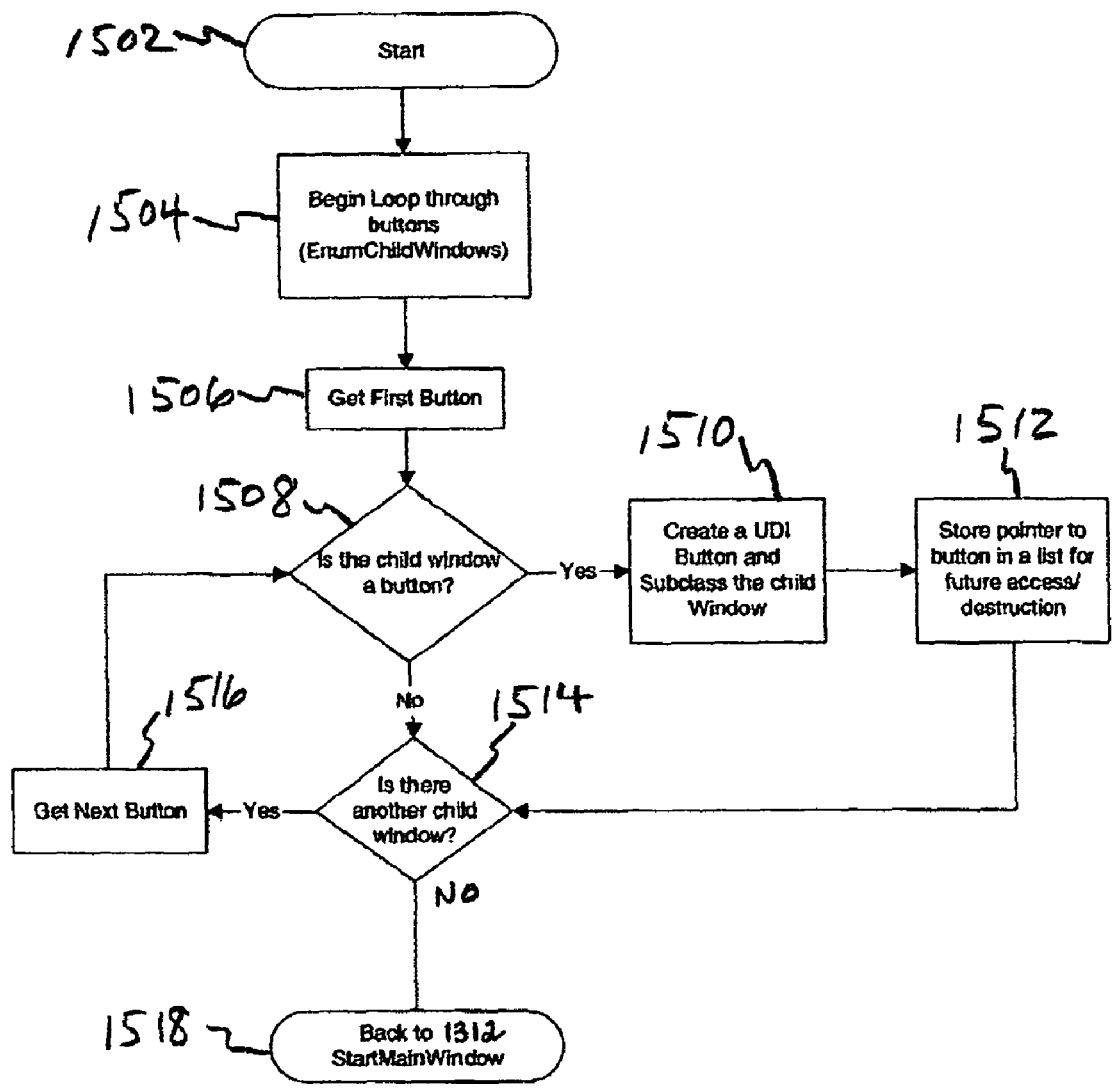

FIG. 15 illustrates the flow in connection with "creating buttons" as introduced at step 1310. The flow begins at a start step 1502. Steps 1504 through 1518 access the template to determine the designated number of buttons that make up the Zenu™ UDI. For example, the Zenu™ UDI of FIG. 8A comprises 12 buttons; two rows of 6 buttons each. In essence, this figure represents the creation of a small window corresponding to each button and links them together to create a Zenu™ shell. Every time a new Zenu™ UDI session is initialized, i.e., the Zenu™ UDI is launched, small windows called "child windows" corresponding to each button of the Zenu™ UDI must be created to form the UDI, as shown at a step 1504. A first button is processed as shown at a step 1506. At a step 1508, it is then determined whether the child window is a button. If YES, a UDI button is created and it is assigned a subclass as a child window, at a step 1510. Next, a pointer to the button is stored in a list for future access, as shown at a step 1512. If an additional child window is to be processed, as determined at a step 1514, the next button is retrieved, as shown at a step 1516. The process then flows back to step 1508, otherwise the flow proceeds to step 1312 as shown by step 1518. Step 1312 applies various settings to each button just created, the details of which are described in connection with FIG. 16.

Figure 16:
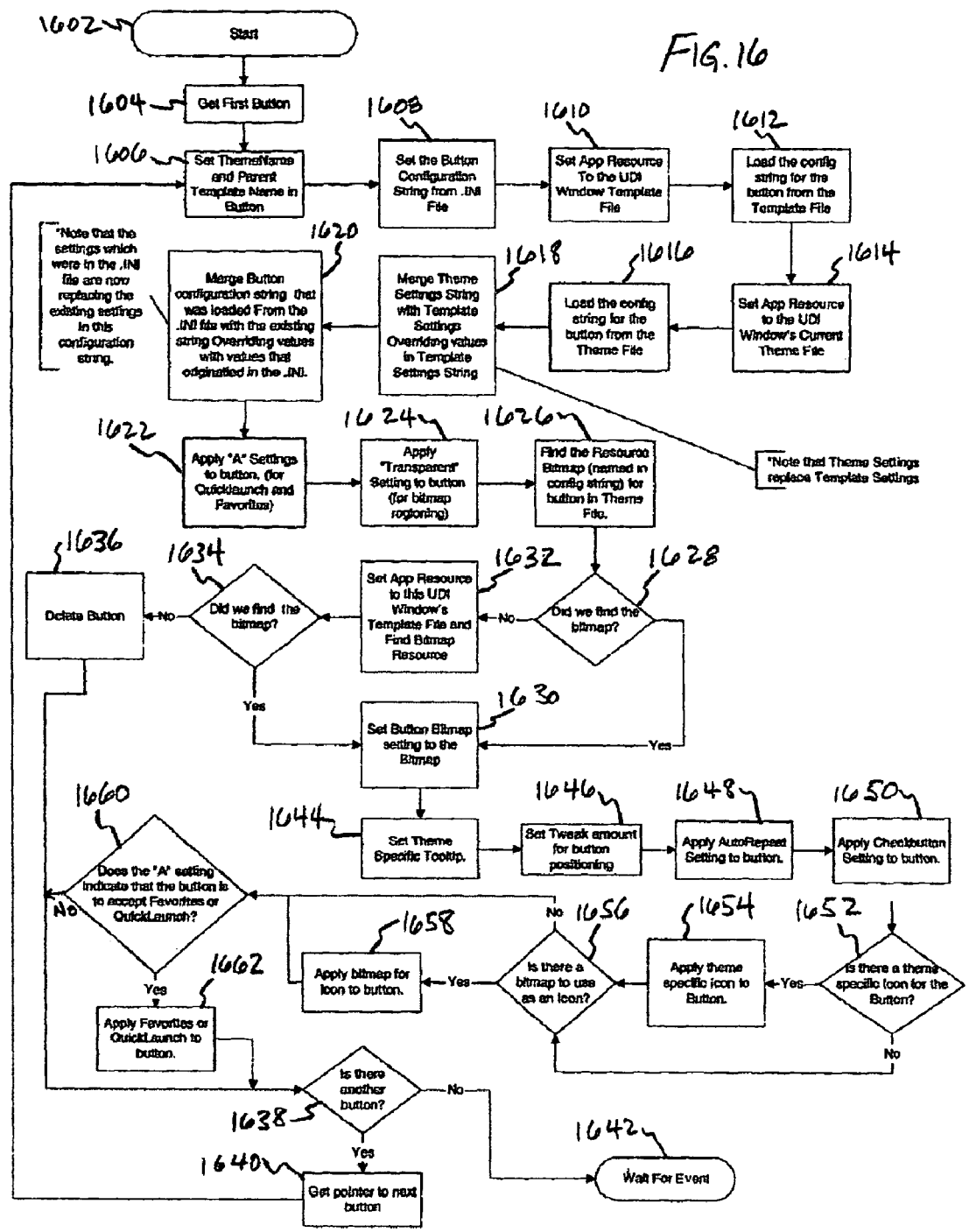

FIG. 16 further illustrated the process of step 1312 for applying various settings to the buttons created in FIG. 15. Thus, the steps illustrated in FIG. 16 are performed for each button for which a region was defined in FIG. 15. The flow starts at a step 1602 and proceeds to get a first button for processing at step 1604. At a step 1606 a theme name and parent template name are set for the button. Next, at a step 1608, the button configuration string from the .ini file is set. Next, at a step 1610, an application resource is set to the UDI template file. At a step 1612, the configuration string from the button for the template file is loaded. At a step 1614, the application resource is set to the UDI windows current theme file. At step 1616, the configuration string from the button is loaded from the theme file. At a step 1618, the theme settings string is merged with the template settings thereby overriding the values in the template setting string (i.e., theme settings are replaced by template settings).

At a step 1620, the button configuration that was loaded from the .ini file is merged with the existing string, thereby overriding values with values that originated in the .ini file. In other words, the settings that are in the .ini file are used to replace the existing settings in the configuration string. At steps 1622 through 1662, the available settings for UDI buttons (buttons are sometimes referred to as action, or click areas) that are defined in Table 2 are applied to the button. Thus, at step 1622 the "setting" is applied to the button to thereby associate Microsoft® Window Quicklaunch or Favorites with the Zenu™ UDI for easy access by the user.

At a step 1624 a transparent setting can be applied to the button. Transparency allows buttons, and the like, to be visible while at the same time allowing the underlying image to be partially visible. Various known transparency techniques can be employed, as would become apparent to a person skilled in the computer graphics art. At step 1622 a resource bitmap is located, if so specified in the configuration string for the button in the theme file. If a bitmap is located, as determined at step 1628, then the button bitmap is set to the located bitmap, at a step 1630. Otherwise, the application resource is set to the UDI windows template file and the associated bitmap resource is searched for, as shown at step 1632. If a template file bitmap resource is located, as determined at a step 1634, flow proceeds to 1630. Otherwise, the button is deleted as shown at a step 1636. If the button is deleted, further buttons can be processed, as determined at a step 1638. If so, a pointer to the next button is located, at a step 1640, and flow proceeds to step 1606.

After a bitmap is determined at either of step 1628 or step 1634, it is applied at step 1630. Next, a theme specific tool tip is set at a step 1644. Then, at step 1646, a "tweak" amount is set for button positioning. At a step 1548 an "auto repeat" feature is applied to the button if so desired. At step 1650, a "check button" setting is applied to the button if so desired.

Next, at a step 1652, it is determined whether a theme specific icon is specified for the button. If so, the theme specific icon is applied to the button, at step 1654. Otherwise, flow proceeds to a step 1656 to determine whether there is a bitmap to use as an icon. If so, the icon bitmap is applied to the button at a step 1658. Otherwise, flow proceeds to a step 1660.

At step 1660 it is determined whether the "A" setting indicates that the button is to accept Quicklaunch or Favorites features. If YES, the appropriate attributes are applied to the button at a step 1662. If not, flow proceeds to step 1638 so as to process any further buttons. Once all buttons are processed, flow continues back to step 1314 as shown at a step 1642.

These collections of styles that can be applied to a button (attributes, properties, or the like, e.g., a bitmap, a font, tool tip, flyover characteristic) have a particular precedence. Such characteristics are defined in the configuration file. If no such characteristics are found in the configuration file, the theme is searched. If such a characteristic is found in the theme it is applied. If no such characteristic is found in the theme, or it wasn't in the configuration file, the template is searched. If no such characteristic is located in the template, any predetermined default is applied. Thus, softer defaults as well as overrides at the template level, theme level, and user configuration level are available according to this embodiment of the present invention. The flow of FIG. 16 follows this iteration to determine what attributes to apply to the buttons. For example, the "set tweak amount" for positioning at step 1646 searches the configuration file and the theme to determine whether an modification has been made to the position of the button. In the case in which Zenu™ buttons are nested, in other words, clicking a button opens another level of buttons, each level of buttons has different parent templates, and a theme associated with each level. Thus, the position of buttons of a particular level is determined by their template and their appearance is determined by the theme of that level.

Turning again to the "waiting for an event" step 1314, two events can occur: a "button click", which is described in connection with FIGS. 17 and 18, or "a dropped file unbutton file event", which is described at FIG. 19.

Figure 17:
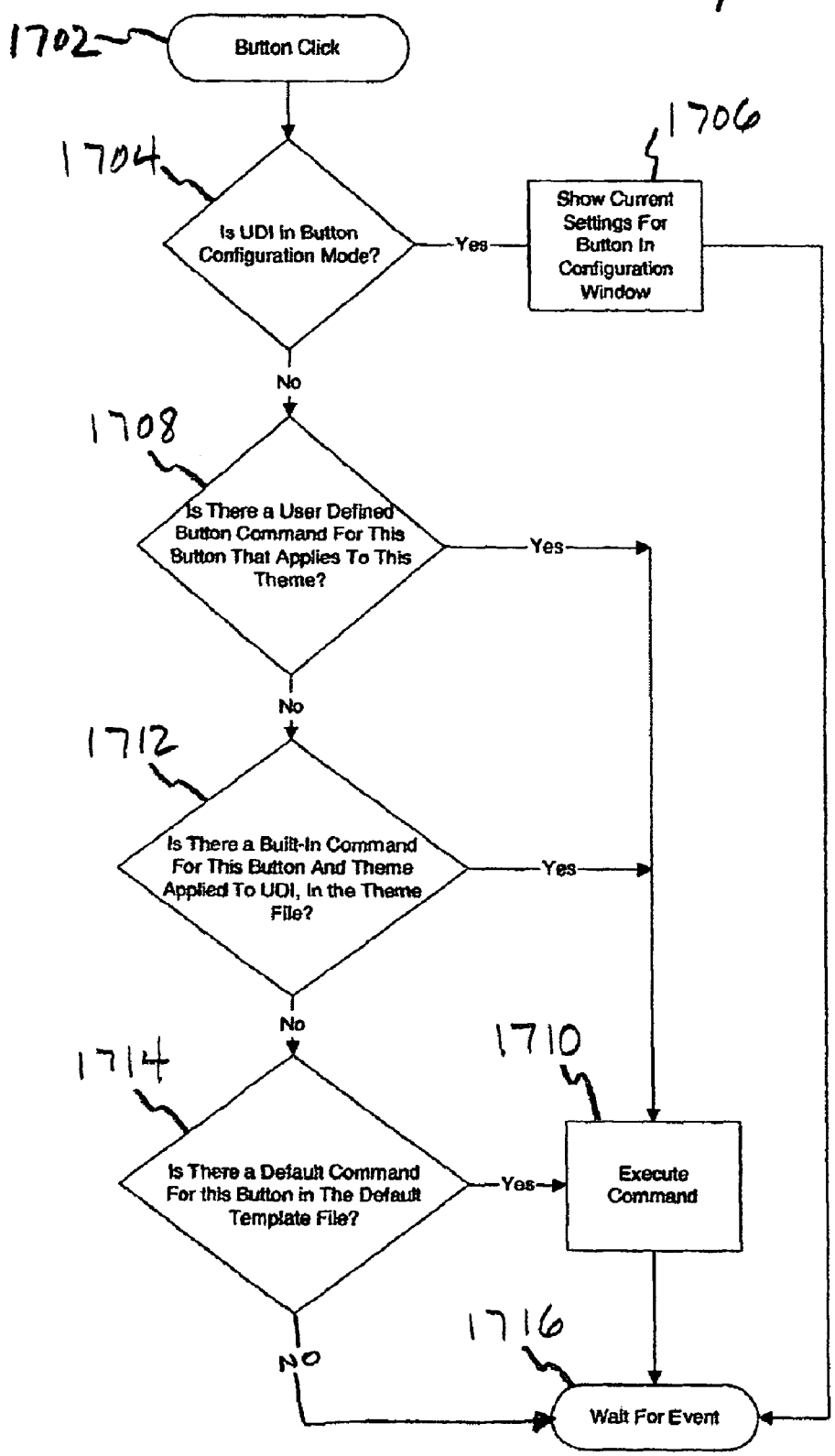
Figure 18:
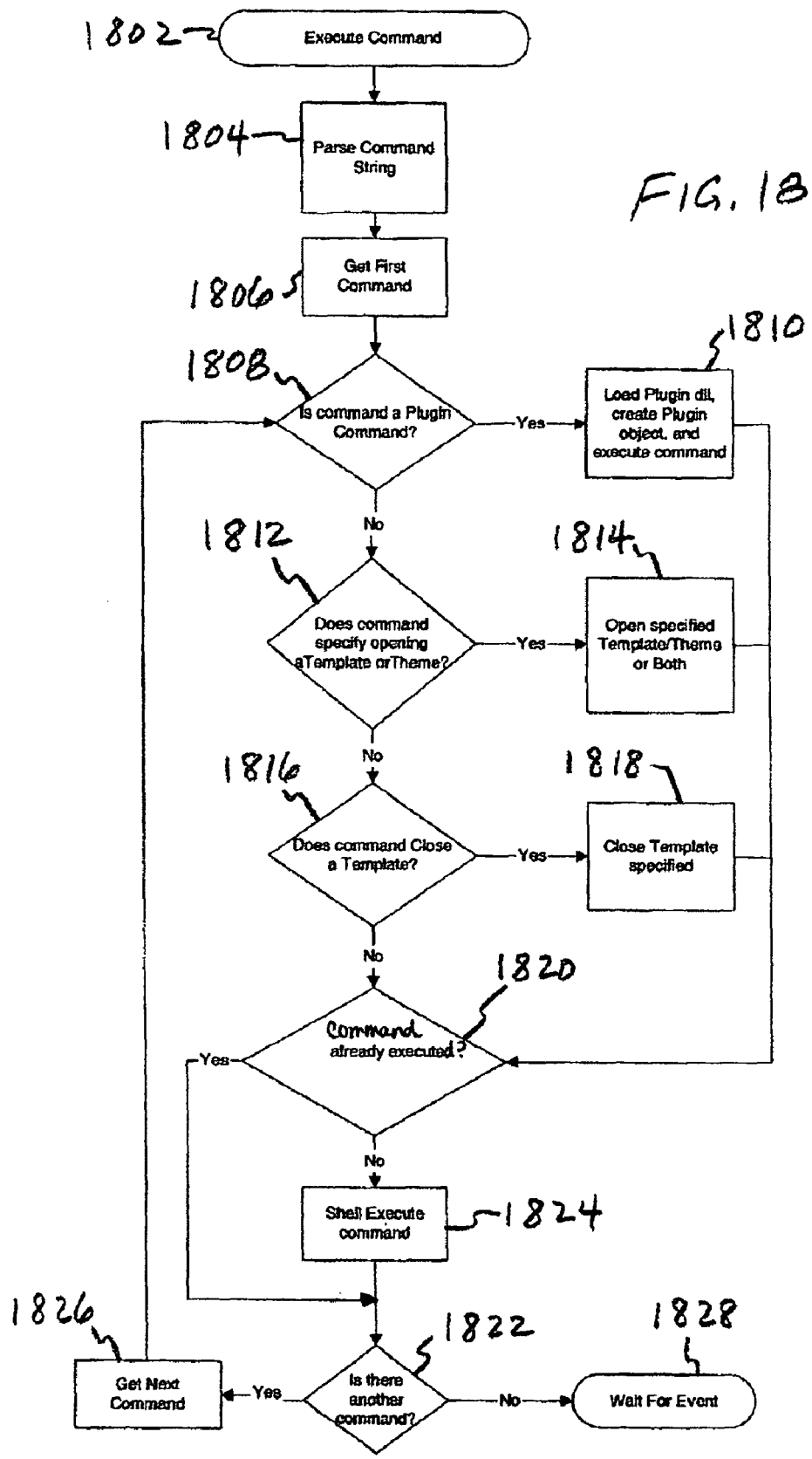

FIGS. 17 and 18 describe the process that occurs when a button is clicked. This process begins at a step 1702, and proceeds to determine whether the UDI is in button configuration mode, at a step 1704. If so, the current settings for the button are displayed in the configuration window at a step 1706. The process then enters the "wait for event" mode, at a step 1716 (which is equivalent to the wait for event step 1314). If not in the configuration mode, flow proceeds to a step 1708, which determines if there is a user defined button command for the button that applies to this theme. If so, the command is executed at a step 1710, then flow proceeds to step 1716. If no button command is defined, flow proceeds to step 1712 to determine if there is a built-in command for the button with the theme applied to the UDI as specified in the theme file. If YES, that command is then executed at step 1710. If not, flow proceeds to step 1714 to determine if a default command for the button is found in the default template file. If so, the default command is executed at step 1710. Otherwise, flow proceeds to step 1716 to wait for another event.

FIG. 18 illustrates the process for executing a command formed at step 1710. The execute command process begins at a step 1802. The command string is parsed at a step 1804. The syntax of the command string as described above in connection with Tables 2 and 3. Next, the first command is evaluated at a step 1806. If the command is a plug-in, as determined at a step 1808, the plug-in .dll is loaded to create a plug-in object and a command is executed at a step 1810. If the command is not a plug-in, it is determined whether the command specifies opening a template or theme, at a step 1812. If so, the theme, template, or both are opened, at a step 1814. Next, it is determined whether the command was to close a template, at a step 1816. If so, the closed template specified is performed, at a step 1818. As a result of steps 1810, 1814 and step 1818, or if the result of step 1816 is NO, it is next determined whether a command has been executed, at a step 1820. If YES, it is then determined whether there is another command in the string to process, at a step 1822. If so, the next command is obtained, at a step 1826, and flow proceeds to evaluate the command, at step 1808. If the result of the query in step 1820 is NO, a shell execute command is performed, at a step 1824. Control then proceeds after step 1824 to step 1822. If no other commands are to be executed in the string flow proceeds to step 1828 to wait for an event, which is the equivalent of "wait for event" step 1314.

Figure 19:
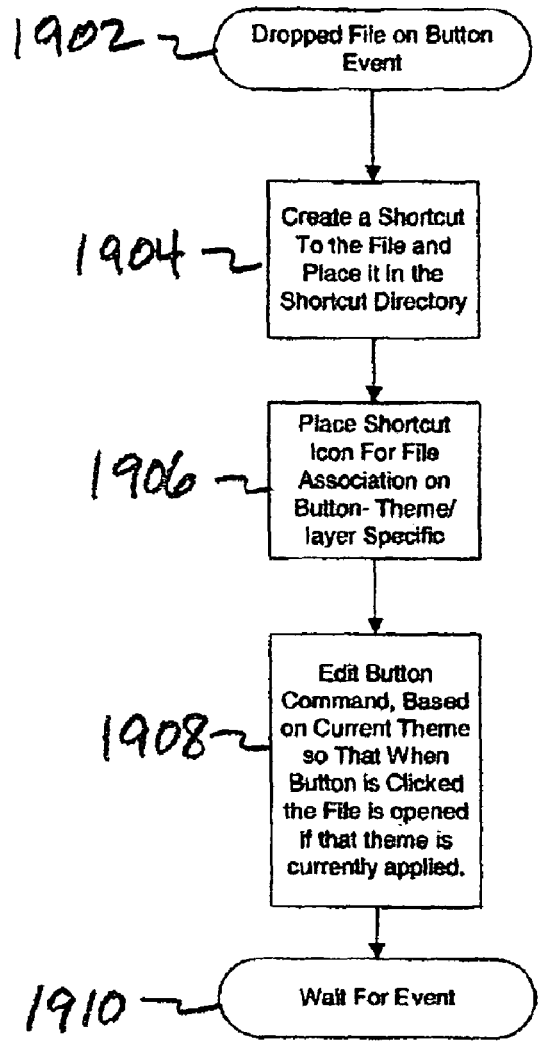

FIG. 19 illustrates the process for handling a "dropped file on button event." Flow begins at a step 1902. Next, a short-cut is created to the file that is dropped on the button, and that short-cut is placed in a Zenu™ short-cut directory, at a step 1904. Next, a short-cut icon for the file association is placed on the button and is modified according to the theme/layer specific characteristics, at a step 1906. Finally, the button command is edited based on the current theme, so that when the button is clicked the file is opened if that theme is currently applied, at a step 1908. The wait for event step is entered again at a step 1910.

IV. Example Computer System and Computer Program Product Implementations

Figure 20:
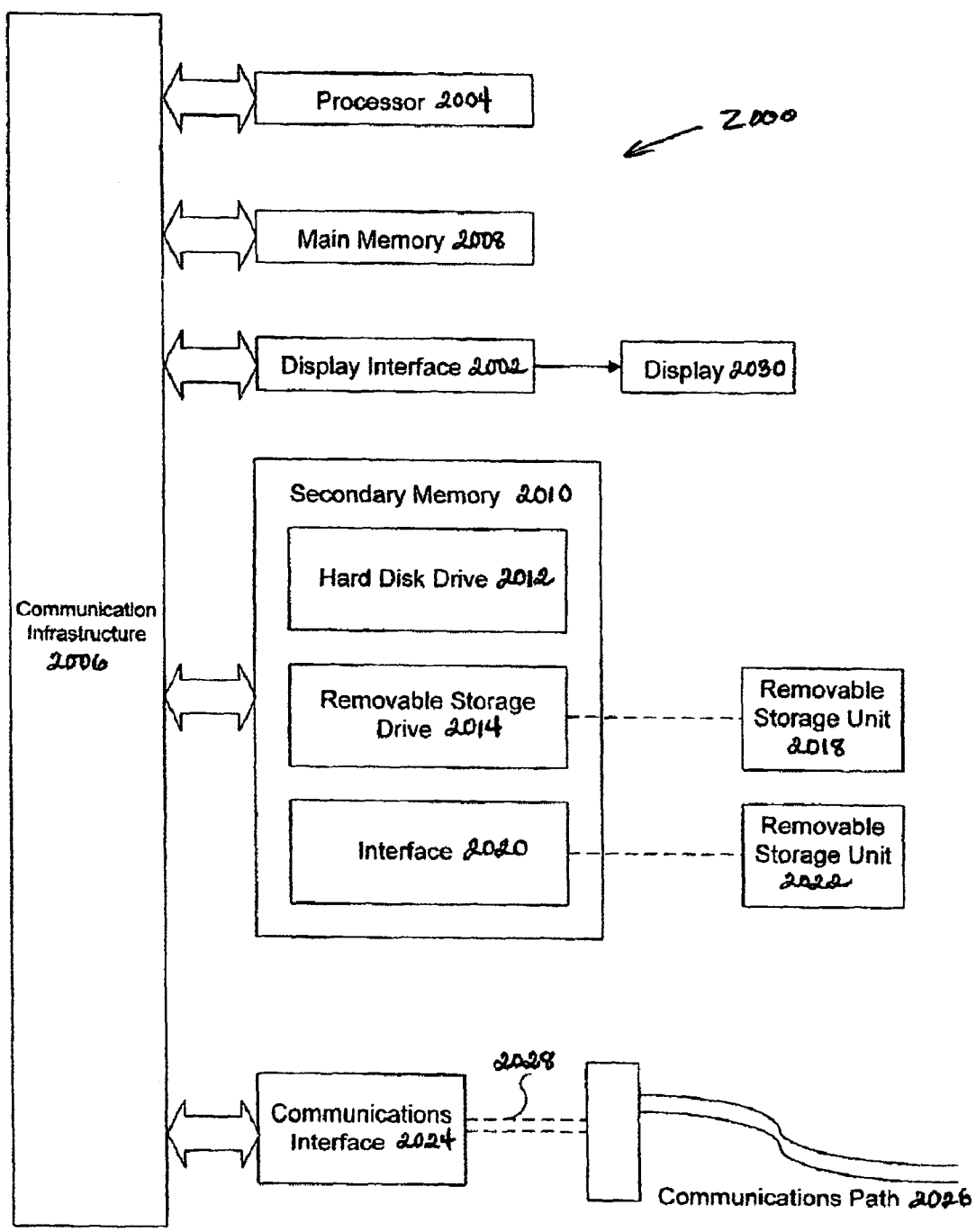
FIG. 20 illustrates an example of a computer system capable of carrying out the functionality described herein, in accordance with the present invention.

The Zenu™ UDI of the present invention can be implemented using hardware, software or a combination thereof and may be implemented in one or more computer systems or other processing systems. In fact, in one embodiment, the invention is directed toward one or more computer systems capable of carrying out the functionality described herein. An example of a computer system 2000 is shown in FIG. 20. The computer system 2000 includes one or more processors, such as processor 2004. Processor 2004 can support various operating systems such as Microsoft® Windows, Unix, Lixux, or the like. The processor 2004 is connected to a communication infrastructure 2006 (e.g., a communications bus, cross-over bar, or network). Various software embodiments are described in terms of this exemplary computer system. After reading this description, it will become apparent to a person skilled in the relevant art(s) how to implement the invention using other computer systems and/or computer architectures.

Computer system 2000 can include a display interface 2005 that forwards graphics, text, and other data from the communication infrastructure 2002 (or from a frame buffer not shown) for display on the display device 2030.

Computer system 2000 also includes a main memory 2008, preferably random access memory (RAM), and can also include a secondary memory 2010. The secondary memory 2010 can include, for example, a hard disk drive 2012 and/or a removable storage drive 2014, representing a floppy disk drive, a magnetic tape drive, an optical disk drive, or the like. The removable storage drive 2014 reads from and/or writes to a removable storage unit 2018 in a well known manner. Removable storage unit 2018, represents a floppy disk, magnetic tape, optical disk, of the like, which is read by and written to by removable storage drive 2014. As will be appreciated, the removable storage unit 2018 includes a computer usable storage medium having stored therein computer software and/or data.

In alternative embodiments, secondary memory 2010 can include other similar means for allowing computer programs or other instructions to be loaded into computer system 2000. Such means can include, for example, a removable storage unit 2022 and an interface 2020. Examples of such can include a program cartridge and cartridge interface (such as that found in video game devices), a removable memory chip (such as an EPROM, or PROM) and associated socket, and other removable storage units 2022 and interfaces 2020 which allow software and data to be transferred from the removable storage unit 2022 to computer system 2000.

Computer system 2000 can also include a communications interface 2024. Communications interface 2024 allows software and data to be transferred between computer system 2000 and external devices. Examples of communications interface 2024 can include a modem, a network interface (such as an Ethernet card), a communications port, a PCM-CIA slot and card, infrared, radio frequency (RF), or the like. Software and data transferred via communications interface 2024 are in the form of signals 2028 which can be electronic, electromagnetic, optical or other signals capable of being received by communications interface 2024. These signals 2028 are provided to communications interface 2024 via a communications path (i.e., channel) 2026. This channel 2026 carries signals 2028 and can be implemented using wire or cable, fiber optics, a phone line, a cellular phone link, an RF link and other communications channels.

In this document, the terms "computer program medium" and "computer usable medium" are used to generally refer to media such as removable storage drive 2014, a hard disk installed in hard disk drive 2012, and signals 2028. These computer program products are means for providing software to computer system 2000. The invention is directed to such computer program products.

Computer programs (also called computer control logic) are stored in main memory 2008 and/or secondary memory 2010. Computer programs can also be received via communications interface 2024. Such computer programs, when executed, enable the computer system 2000 to perform the features of the present invention as discussed herein. In particular, the computer programs, when executed, enable the processor 2004 to perform the features of the present invention. Accordingly, such computer programs represent controllers or modules of the computer system 2000.

In an embodiment where the invention is implemented using software, the software can be stored in a computer program product and loaded into computer system 2000 using removable storage drive 2014, hard drive 2012 or communications interface 2024. The control logic or modules (software), when executed by the processor 2004, causes the processor 2004 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

Figure 21:
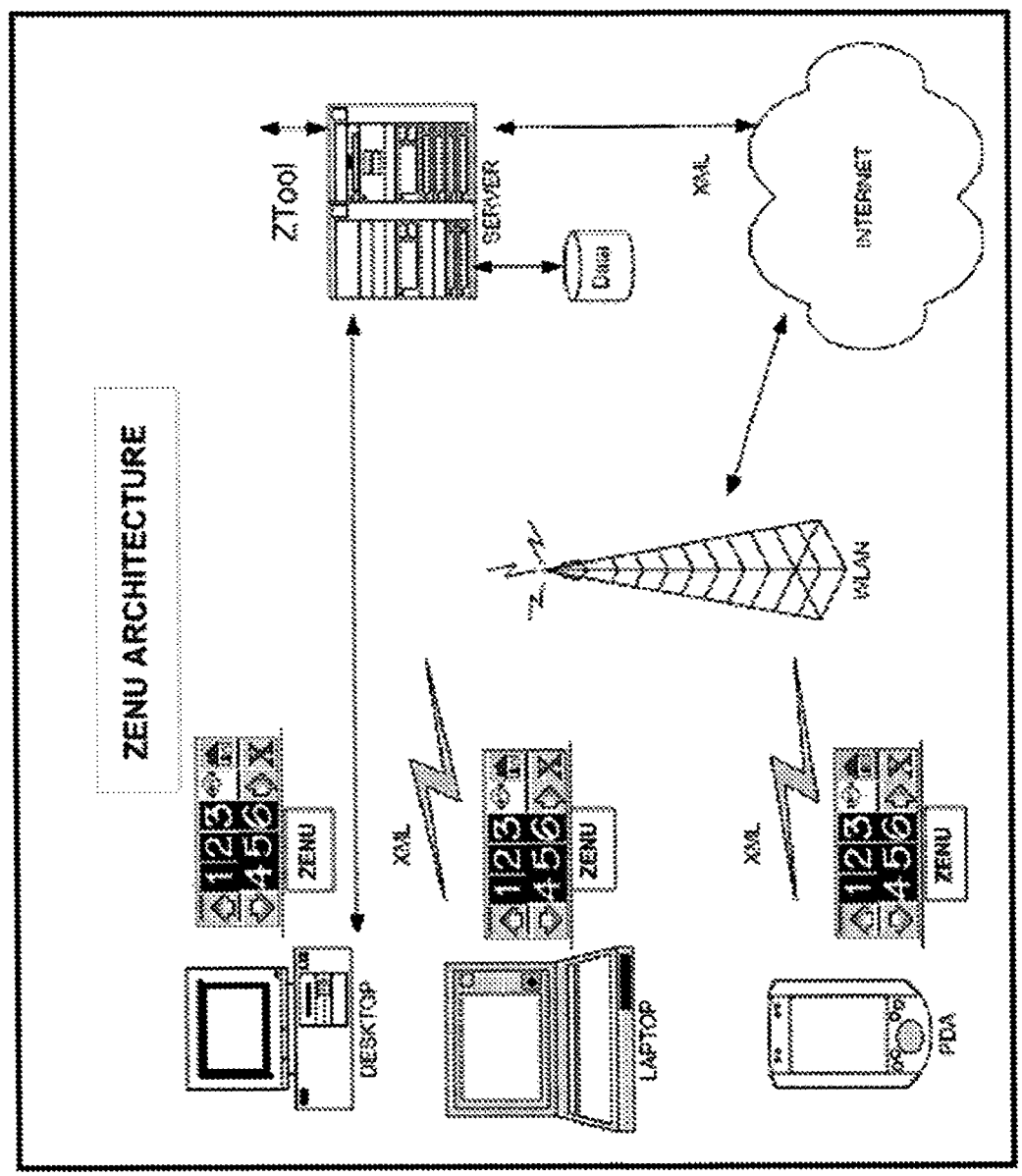
FIG. 21 illustrates an embodiment of an architecture using Zenu™.

As noted earlier, the power and flexibility of a Zenu interface architecture can be extended to meet needs for providing data from a central server to a user of a device remote from a server location and connected via wired or wireless connections. FIG. 21 illustrates an architecture for one embodiment of the instant invention wherein Zenu universal interface techniques may be employed.

In this embodiment, a ZENU architecture includes three principal parts: The Universal ZENU Interface, a TCP/IP enabled platform/application and a defined XML Schema. Desktop computers, PDAs and Web-enabled phones all use the same ZENU interface to manage and access all local data and applications. Internet data is accessed via a TCP/IP socket connection. Server-side applications and script files communicate with the ZENU application using XML. Tagged data "sets" the properties for embedded graphic objects on the ZENU platform. These objects are positioned, assigned the appropriate data and made visible. Selections or data input are made with the ZENU buttons. The updated or new data is sent back to the server with the associated script and data ID. All screen and data from the server is saved in a database on the platform. This data can be "replayed" one screen at a time as a history file or to review past transactions.

Figure 22:
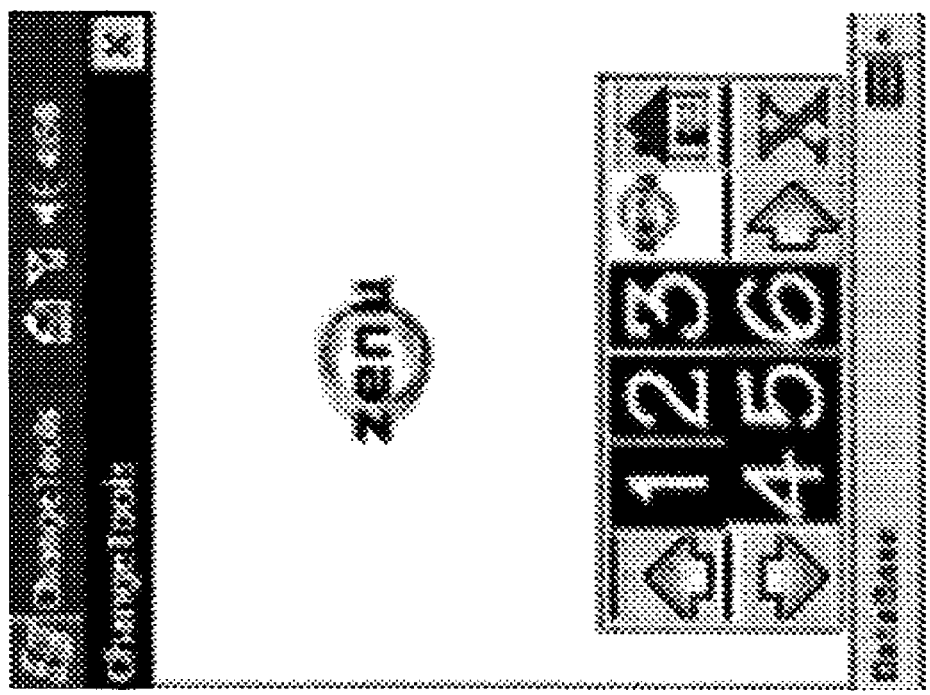
FIG. 22 is a screen shot of a PDA using one embodiment of Zenu™.
Figure 23B:
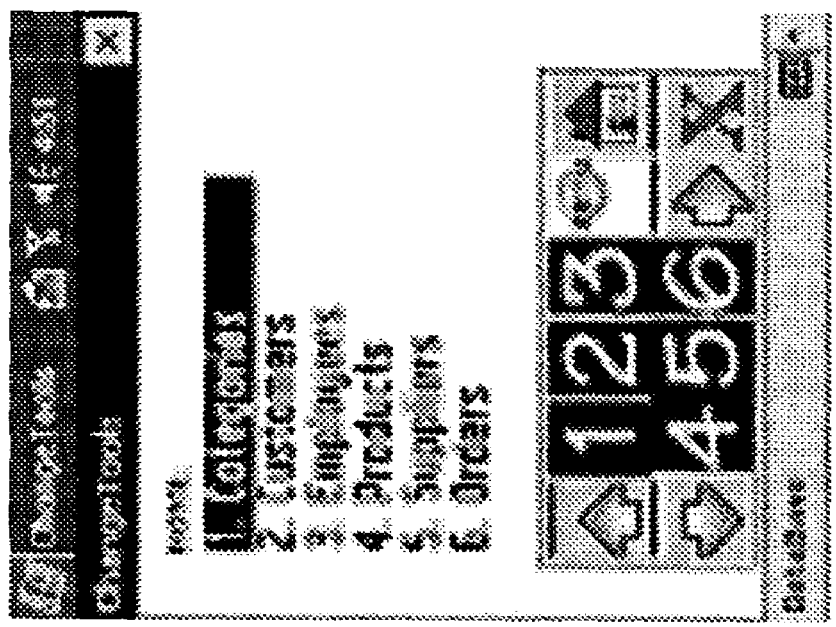
FIGS. 23a and 23b are PDA screen shots showing login and database access functions.
Figure 23A:
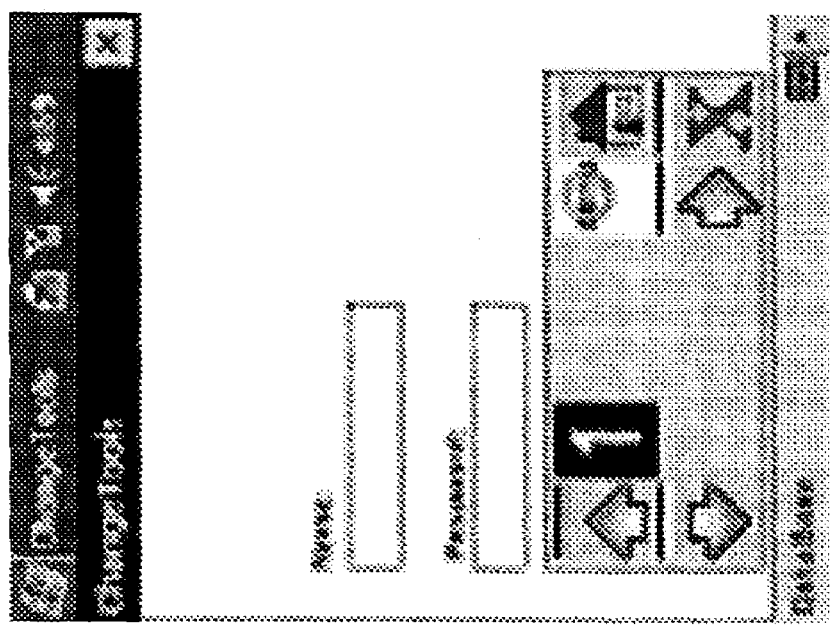

A PDA platform version of ZENU is shown in FIG. 22. In this embodiment, the ZENU logo is an entry point for Internet access. Touching the logo will bring up the log-in screen (see FIG. 23*a*). All navigation and selection activity is carried out by means of the ZENU interface. Only "active" buttons are displayed. The button numbers match the numbers displayed next to the data.

A typical application is the use of a PDA to access data or applications on a remote server. To do this the log-in will retrieve the user's list of approved server-side options. For example, a sales rep could be limited to a single database with multiple tables. He may have access to only some of these tables. This access control is defined by the log-in list and the script files made available through transactions with the server. This puts control of data access on the server side. By means of the ZENU XML definitions and interactions, the screen display and layout are managed from the server. The following screen shots outline a typical scenario.

Figure 24:
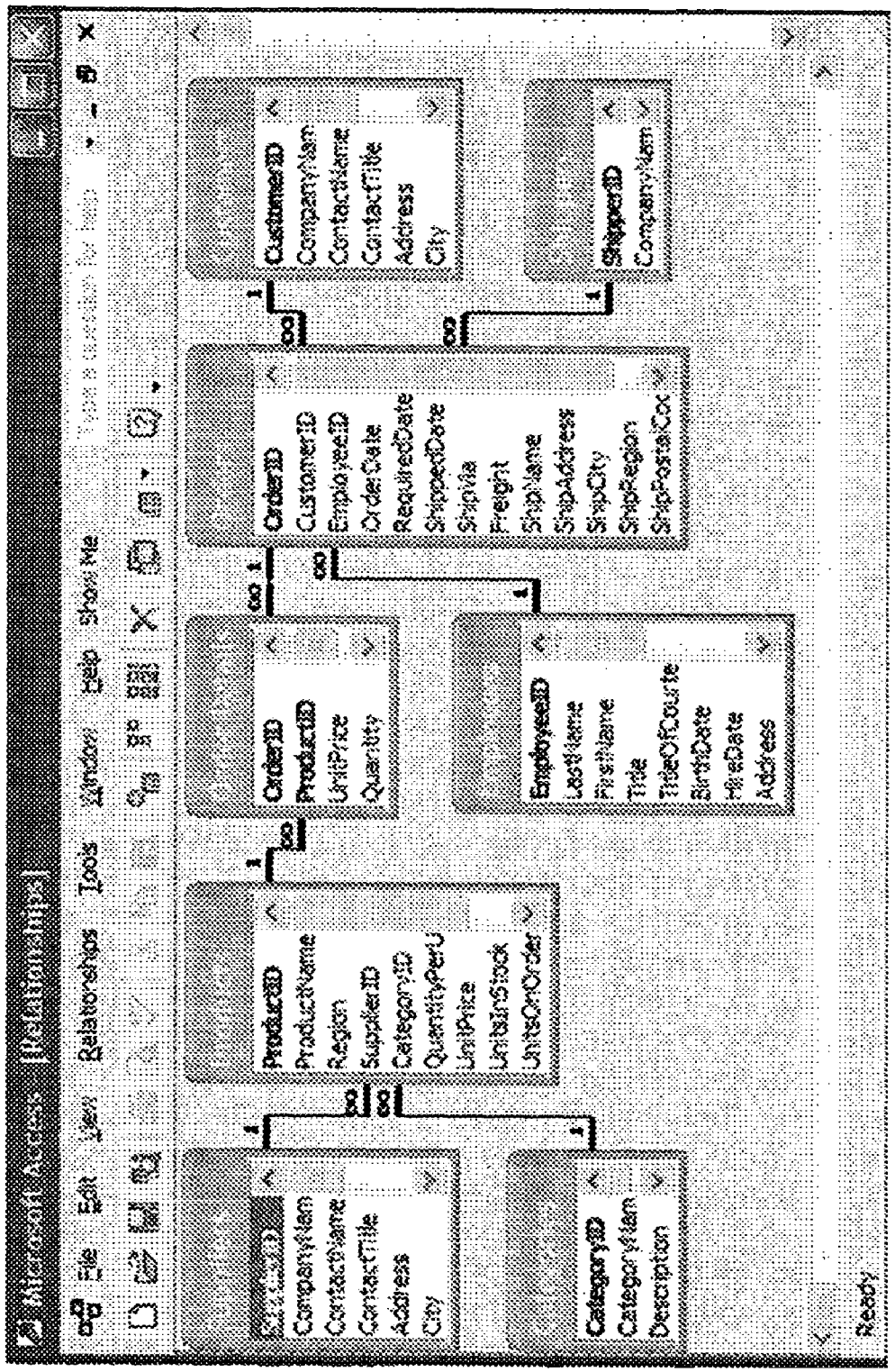
FIG. 24 is a screen shot of a representative database.
Figure 27:
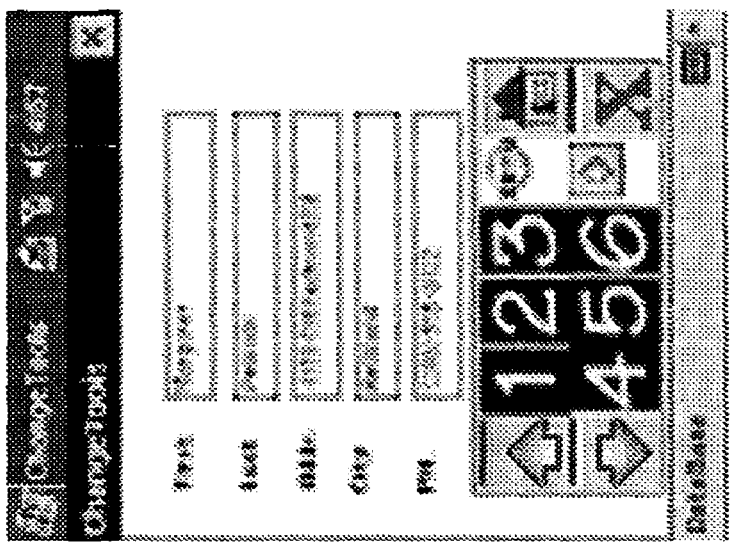
FIGS. 25, 26, and 27 are PDA screen shot illustrating various data access functionalities.
Figure 26:
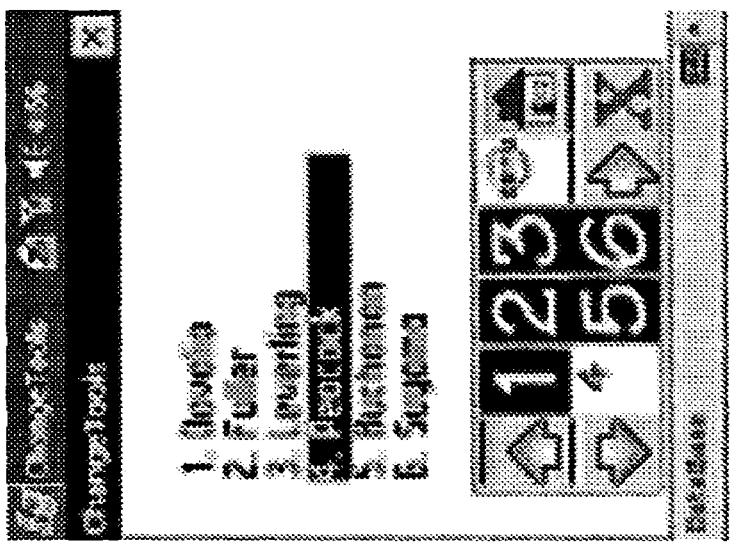
Figure 25:
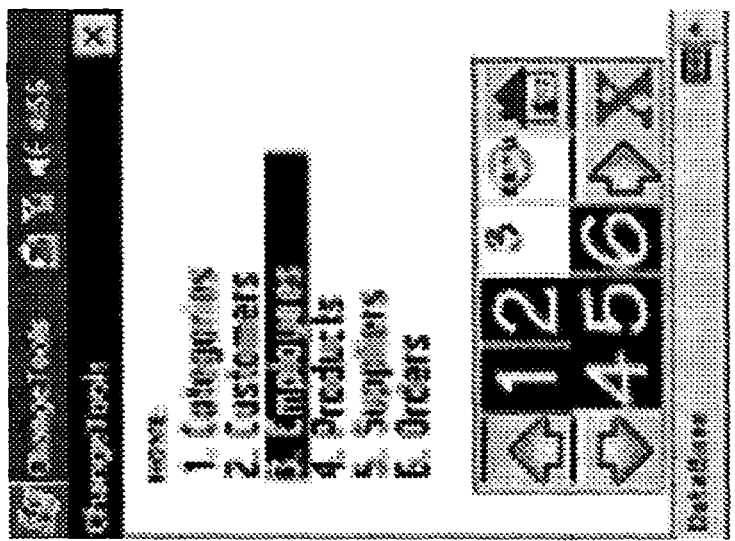

FIG. 24 shows the sample NorthWind database from Microsoft. There are eight tables in the database. A sales rep has access to six of theses tables (see FIG. 23*b*). When he logs in he will see the list in FIG. 25. Touching button 3 on the menu will highlight the Employees item in the list. Touching the Next Page arrow button (see FIG. 23*a*) will send a request to the server for the employee list. The employee list is delivered, the properties of the necessary objects are "set," and the page is displayed. Button numbers and selection numbers are matched. An employee name is selected (see FIG. 26) and the Next Page button will retrieve the employee data, set the properties and display the screen (FIG. 27). All of the data for the pages, including the content, is saved in a database. (See the section on database and playback.) The layout and display objects are selected by the server-side scripts via XML. Other screen layouts can be made or custom screens can be created for each approved user.

With the standardized ZENU user interface, changing screen layouts requires no training, PDA service calls or user software updates. Whoever manages the server manages the PDAs.

The ZENU's simple, intuitive interface can be scaled and configured to work in any environment or medium. It works within the very limited screen real estate afforded not only by mobile devices such as PDAs and cell phones but also by emerging pervasive computing technologies. ZENU eliminates the need for a keypad or stylus, enabling data input with a single finger—or via voice command or eye movement. It is also platform and application agnostic, and can be personalized by the user to accommodate his or her individual needs and preferences with little or no training. Because ZENU is a standardized portal and interface, it is learned by users of all skill levels in a matter of minutes and, once mastered, can be applied to almost any situation.

Figure 28:
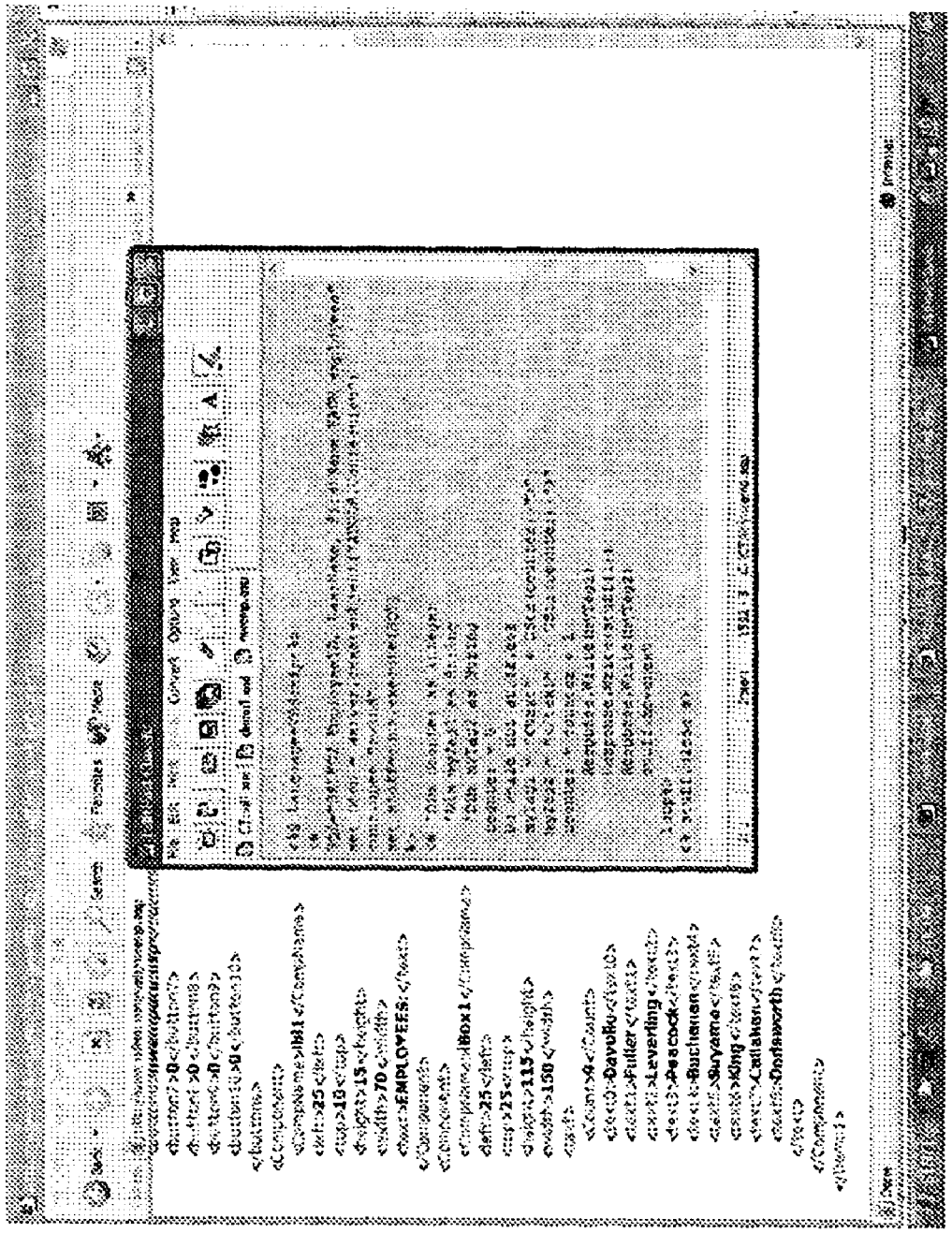
FIG. 28 is a representative screen shot illustrating XML display capabilities.

The scripting code on the server is shown in FIG. 28 in the EditPad editor. This is the integrated XML and ASP code. The output sent to the PDA is shown in the larger IE 6.0 parsed format. This info is parsed on the PDA to "set" the display objects and the stored in the PDA database.

Figure 29:
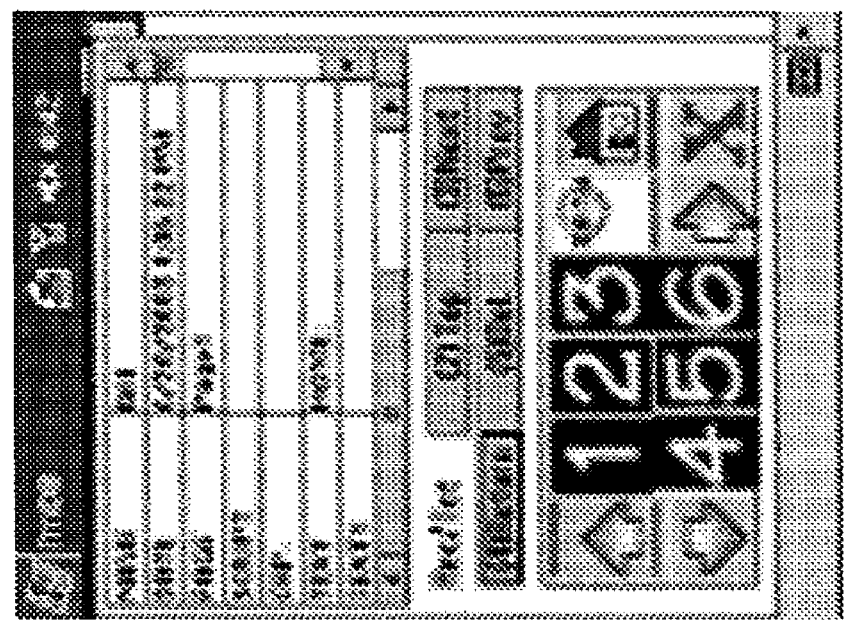
FIG. 29 is another PDA screen shot illustrating data access functionality.

FIG. 29 shows a screen shot of a database object. Each graphic object on a page has its own record. Each screen is referred to as a page. Each record is date/time stamped. To replay a page, a user simply selects the replay option from the database menu on the ZENU main page (see FIG. 22).

If the 'connection' is live when in a replay, making a button selection will retrieve live data from the server.

The ZENU interface is used to step through the records. Pressing button 2 (Del) will delete ALL records in the database. The ZENU Number Buttons and the labeled buttons on the active screen have matching numbers. Both sets of buttons perform the same actions for this screen.

Figure 30:
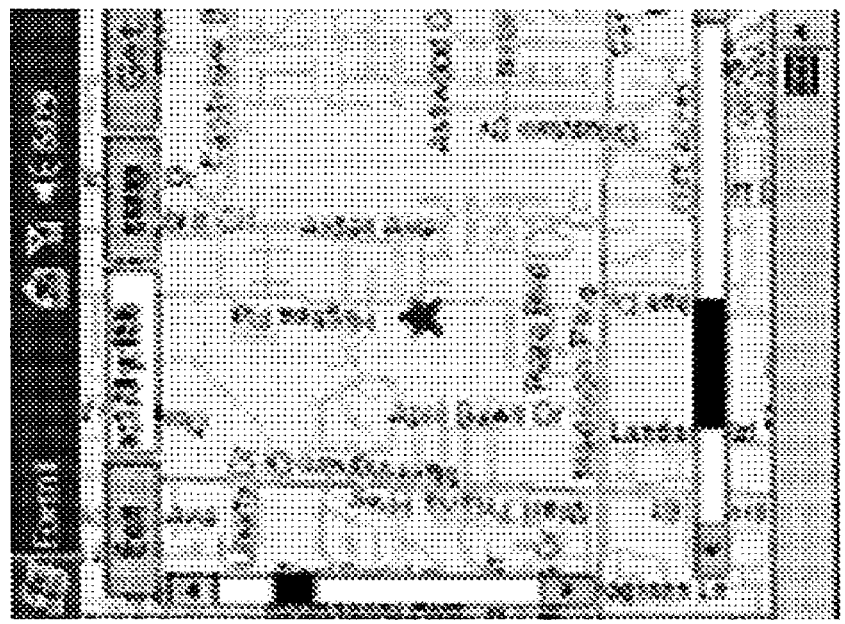
FIG. 30 is a PDA screen shot illustrating map display capability.

Maps or graphics in PNG format can be either stored or sent over the air. Displayed maps (Ref. FIG. 30) can be 'swapped' with the touch of a button. Maps larger then the screen may be used; scrolling is done by touch or by use of the scroll bars. When the screen is touched this point becomes the new screen center position of the map. Icons may be sent and positioned on maps to indicate locations of specific items. The icons will scroll with the map. Touch coordinates and map IDs can be sent to the server over the air.

Figure 31:
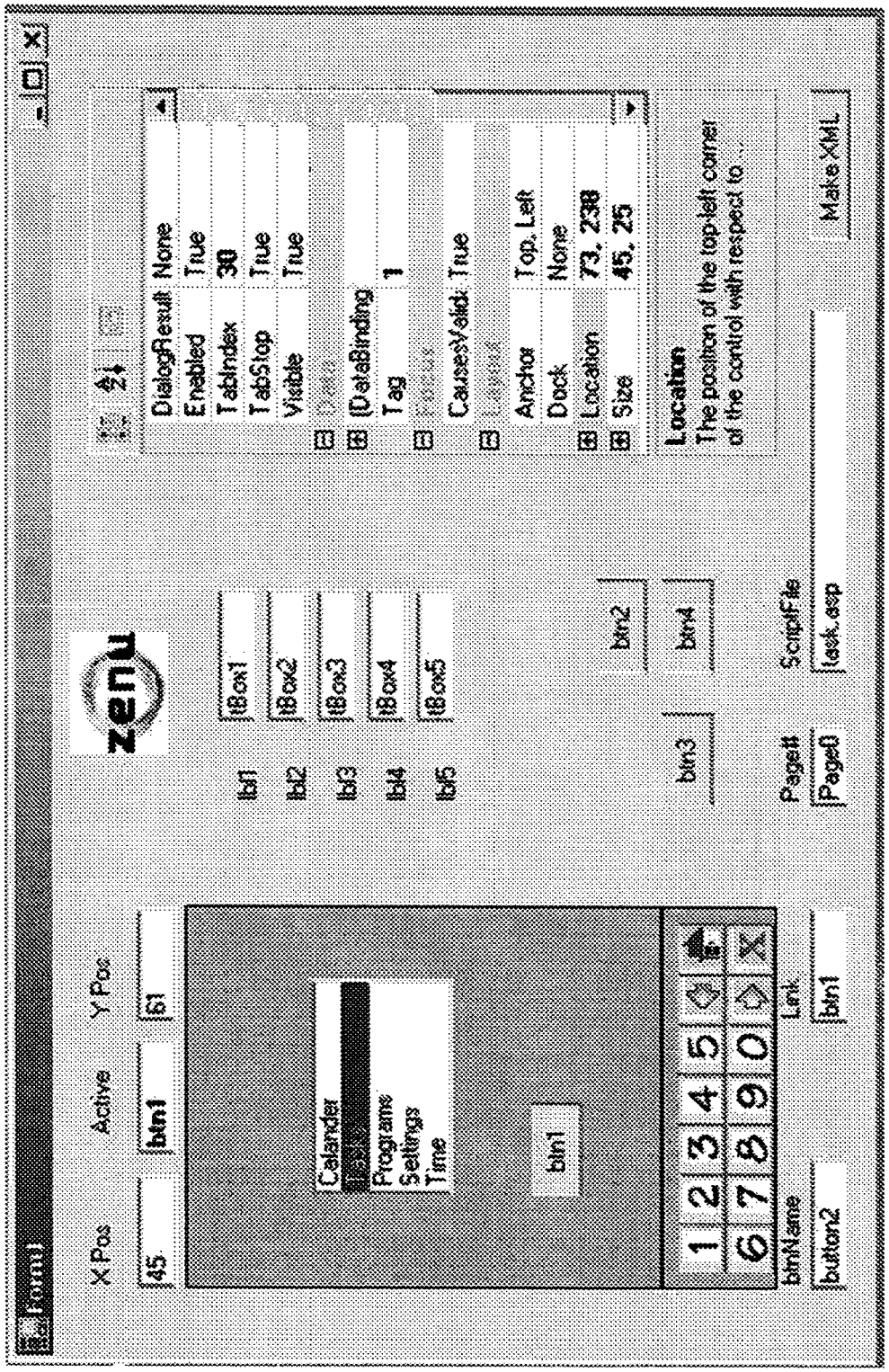
FIG. 31 is a screen shot of a setup screen of one possible embodiment of ZTool.

Creating and managing the XML screen and data logic is a complex and difficult task. In order to simplify the amount of work to create, change, and maintain these files, the instant invention includes a utility, ZTool, for producing the XML files. (See FIG. 31.)

In one embodiment, the ZTool has a 'virtual' PDA screen on the left side. Graphic components are selected from the Object Palette and placed at the desired location on the screen. The component properties (text, tab order, start visibility, etc.) are set with the property manager on the right side. A unique page number is assigned and a target script file is identified. Pressing the button at the extreme lower right side will produce a valid XML file describing the layout and properties of the screen and of the selected graphic objects. Use of the ZTool guarantees that a component appears only once on a page, that properties are accurately set, and that the XML file is valid (i.e., one that will properly parse with the IE 6 built-in parser).

Scripting integration with ASP, JavaScript, Python, etc. is needed only where the graphic object is being populated with data from the database. No layout tags (HTML) are required, only XML. The ZENU parser only scans for the XML data.

Since bandwidth is a serious issue for wireless applications, elimination of unnecessary code/tags saves bandwidth, provides faster delivery of data, and lowers the airtime cost.

Security is a significant concern with mobile devices, which can be lost, putting data at risk. The applications that access server-side data can also be exploited to gain access to additional data or processes. There are a number of security options available for PDAs; WinCE™ devices and Java™ platforms all have a range of tools available. The ones listed below are common to both technologies for PDAs and can be supported by various embodiments of Zenu™ and ZTools.

User authentication: The PDA can be password-protected. This requires a log-in in order to gain access to the PDA. However, this is a weak mode of security and is not considered more than a nuisance to someone trying to access a PDA.

VPNs: Virtual Private Networks, which involve encryption and tunneling, are considered a reasonable level of security for data transactions.

SSL: Secure-Socket Layer and 128-bit encryption. An excellent security technique, this can be combined with a certificate. If the server is dedicated, an individual or agency can issue their own certificates.

Certificates are used to positively identify a server to a client. They can be combined with the options listed above to enhance overall security.

PKI: PKI is a combination of hardware, software, policies and procedures. It provides the basic security required to carry out electronic business so that users who do not know each other, or are widely distributed, can communicate securely using a chain of trust.

Situations where data is unavailable due to lack of a wired connection include:

ERP: location and need based on user access/log-in definitions

CRM: Remote access to customer info dynamically rendered

Military: Data and Maps with Icons delivered and placed

Medical: Patient data on demand, flexible display management

Manufacturing: Point of use customized data and layout

Versatility: The ZENU™ and ZTool provide:

Customized screens for each user

Dynamic creation of page layout

Roaming and playback

Distributed devices and server-side screen management (no hardware updates).

ZENU™ and Ztool make one-touch navigation the most efficient means for accessing applications and data on your PDA. The Ztool server-side XML utility and the embedded graphic objects directly address the wireless data problems outlined at the beginning of this paper. Ztool XML provides the following benefits:

Unreliable wireless connections—fewer bits means less processor time

Unknown actual Bandwidth availability—fewer bits means faster transmission

Out of coverage issues (roaming)—database storage and replay

Wireless and device security—encryption of packets, SSL, and VPN

Limited device processing power—the server side does the heavy lifting

Limited device battery power—limited processing required by PDA

Limited device display capability—screens can be (re)arranged as needed

Limited user device interfaces, buttons—ZENU™ interface

Differing device software (micro-browsers)—standard ZENU™ with ZTool

In addition by using ZTool, embedded graphic objects and XML, the total number of bits sent is lower then using a browser and HTML/XML. Only XML data needs to be sent. This yields far fewer total bits sent and hence a lower cost for air time.

As may be seen from the above and following descriptions, various embodiments of the instant invention support an elegant interface design. The instant invention includes a new class of graphic interface products called ZENU™ and ZTool. ZENU™ is a robust graphic interface that functions exactly the same way on all mobile devices including laptops, PDAs and cell phones. ZTool enables access to and delivery of applications; while ZENU™ offers a simple, easy-to-use method of navigating and accessing information across all platforms and devices.

"With today's technology, today's tools and our motivation to create really effective and usable interfaces and screens, why do we continue to produce so many that are inefficient and confusing or, at worst, just plain unusable? A well-designed screen is terribly important to our users. It is their window to view the capabilities of the system. To many, it is the system, being one of the few visible components of the product we developers create. It is also the vehicle through which many critical tasks are presented. These tasks often have a direct impact on an organization's relations with its customers, and its profitability." (Galitz, Wilbert, O. (1997). *Essential Guide to user interface design: an introduction to GUI design principles and techniques*. Wiley Computer Publishing. p. 5).

Various embodiments of the instant invention provide a capability to Train Once and then use that training on everything, thus enabling the Next Generation of Mobile Devices. The instant invention establishes what makes for a well-designed interface. Alternative embodiments of the instant invention provide a new class of graphic interface products called ZENU™ and ZTOOL. ZENU™ is a robust graphic interface that functions exactly the same way on all mobile devices including laptops, PDA's and cell phones. ZTOOL enables access to and the delivery of applications; while ZENU™ offers a simple, easy-to-use method of navigating and accessing your information across all platforms and devices With the phenomenal growth of wireless communications, the computer and telephone industries are converging. Existing systems and devices have limitations that need to be addressed in order for superior next generation solutions to evolve.

The mobile wireless challenge includes bandwidth, power consumption, cost restraints, synchronization, and limited real estate.

Bandwidth. A primary impediment to the transmission of data across wireless communication networks is the limited bandwidth available to users (bits per second—bps).

Power Consumption. Wireless devices have a limited power supply. The transmission time of data is an important parameter. The user does not want to spend all his/her recharging or "talk-time" receiving or sending data.

Cost Restraints. This one is pretty simple . . . the larger the transmission time, the more it costs you. The more complex the menus and choices, the more time and the more it costs for content. Efficiency is what the marketplace wants.

Synchronization. Mobile workers need to be able to access the right information at the right time to make the best decisions, or provide the best service. It is important to ensure that data and content are efficiently and accurately synchronized with corporate networks. This information is fundamental to the success of the business.

Limited Real-Estate. Again, the mobile user does not have access to the larger screens that desktop and laptops offer. The PDA and cell phone offer web/content based applications but are difficult to use. The smaller screen means web based content must be designed to fit . . . which usually means a lot of scrolling. Building user friendly and user accepted web experiences has proven difficult.

Traditional Approaches

Today, programmers struggle with a host of incompatible platforms and protocols, and end-users struggle to manage data across multiple devices that are not integrated.

"Java™ is the main platform chosen by the largest wireless manufacturers. [Motorola™], Ericsson™ and Nokia™, the largest manufacturers, are going to ship tens of millions of Java™-enabled phones this year alone. Microsoft™ has only a tiny share of this market, and they don't have any better prospects of gaining ground. This is due to the PC-centric view of the world which [phone companies] recently decided to do without. The programming on wireless devices is also based on the Java™ language but is restricted by limited by memory and [screen] space." Mincinoiu, Dragos/iEntry Staff Editor, javaProNews. "Phone Applets: MIDlets." Apr. 23, 2002.

The about to be released WIN CE .NET™ and other Windows™ Applications are offering an excellent solution to the convergence problem. These devices will use common MS applications and the MS interface. WIN CE™ will be available in the Fall of 2003.

The current wireless challenges of bandwidth, power consumption, cost restraints, synchronization, and limited real-estate in the traditional approaches are slowly being met. Win CE™ .NET will converge, however, both the phone and the windows interfaces are still a problem and are difficult to use.

The ZENU™ Solution

All applications are file managers. ZENU™ provides a uniform way of accessing applications and files. We believe this to be the perfect answer. The ZENU™ solution is twofold.

First, ZENU™'s simple, intuitive interface can be scaled and configured to work in any environment or medium. It works within the very limited screen real estate afforded not only by mobile devices such as PDA's and cell phones but also by emerging pervasive computing technologies. ZENU eliminates the need for a keypad or stylus, enabling data input with a single finger—or via voice command or eye movement. It is also platform and application agnostic, and can be personalized by the user to accommodate his or her individual needs and preferences with little or no training. Because ZENU™ is a standardized portal and interface, it is learned by users of all skill levels in a matter of minutes and, once mastered, can be applied to almost any situation.

Secondly, ZENU™ offers ZTOOL as the means for automatically (no programming for the system administrator!) creating a desired PDA screen to display data or select options for server side processes. Available components are positioned 'on' a virtual PDA workspace using the ZTOOL and a mouse. Data may be attached to components or properties set using the Property Manager. Components may be linked to the ZENU™ buttons by selecting the PDA component with the left mouse button and then right-clicking on the desired ZENU™ button. An XML file is created. It can then be integrated into server-side script files. When all of the needed components are placed and linked, the server side information is added and users have access to immediate, up-to-date information on any platform.

We can now restate the wireless challenges as addressed by the ZENU™/ZTOOL solution.

Bandwidth is significantly reduced by automating web based XML to transmit data to any platform. We use an XML file containing the attributes of all Virtual PDA components. It will also include the Page# and the target server side Script file name. This Script file will process the data and/or the request embedded in the return POST or GET. The Server side Script file will integrate these Tags and 'connect' the Property Tags to actual data such as list info in a list box or the text on a button.

Power Consumption and Cost Restraints are made more efficient by our method of wireless communication. This reduces time sending/receiving information; saving the user time, which is money.

Synchronization is not a problem because the system administrator has an automated tool for updating and publishing all the current information from his/her server so the user always has access to the latest information and interface no matter where the location.

Limited Real-Estate is also solved because ZENU™ uses a simple standardized menu structure for all platforms. This menu structure looks and navigates exactly the same on all platforms big and small.

Summary

ZENU™/ZTOOL server-side control eliminates the need to recall PDA's and phones for software updates. Screens are generated and controlled at the server.

ZENU™ technologies with its universal portal and server-side management will solve your system device training and integration problems by allowing universal access on every communication device; whether it is a laptop, tablet, desktop, PDA, cell phone or something new.

1. Intellitasking/Workflow Innovations a. Business Related Workflow Methodology for Transactions and Training These innovations concern using a question/answer flow to interface a hand held or other device using a Zenu™ interface. Applications can be: insurance check lists for medical personnel or insurance agents, bill paying, training tools for new workers or for new technology, inventory, field sales, monitoring packages for package services, etc. The system would also learn preferences and allow for quicker flow through the questions a second, third, etc. time through the workflow methodology.

b. Bill Paying Workflow Methodology

Another use for this aspect of the invention is intelligent bill paying. Once set up, the Zenu™ could be customized to allow for bill notification and reminders and store all your personal information, as well as learn you preferences. Each month, a notification can appear asking whether you would like to pay a bill as normal (e.g., in full, a set amount, etc.) and just by hitting a single button on the Zenu™ interface, the bill can be paid. Otherwise, the workflow aspect can easily guide a user through the Zenu™ interface to pay their bills electronically.

2. Handheld Wireless Devices a. General Uses

These innovations concern using any handheld wireless device (e.g., a remote type, a PDA type, or the like) to control any apparatus in any location. The handheld device can either learn the signals needed to control the device through known methods or they will be preprogrammed to use apparatus owned by the handheld device owner. This allows for a single handheld wireless device with a Zenu™ interface to be used by an owner to reduce learning time and frustration when dealing with a new or uncommon apparatus.

Examples of apparatus that can be controlled by these handheld wireless devices are: home electronics (TVs, VCRs, DVDs, stereos, etc.) household appliances (refrigerators, dishwashers, washer/dryers, etc), factory machines, ATMs, vending machines, office machines, and the like.

b. Interactive Homes

Another use for the handheld wireless devices is to enable a smart house. A single device can have a panel large enough to watch TV, surf the Internet, monitor babies, control all the appliances in a house, activate an alarm system, and the like. This allows for a completely interactive experience and full control of everything in a home from a single device with a Zenu™ interface. Through use of the Zenu™'s layers, multiple portals would appear on the panel allowing the user to see everything on the panel.

c. Interactive Entertainment

Another use for the handheld device could be for accessing a menu at a restaurant, ordering a meal, and paying for the meal. This can easily be carried to movies, theater, travel, etc. You could access schedules, purchase a ticket or voucher, and then just attend the event or board the mass transit vehicle. Another use can be general Internet surfing and purchases.

3. Server Based Innovations

These innovations concern a central server storing all of a person's Zenu preferences. Then, wherever that person logs on, their personal Zenu appears on the screen. This can be on a computer or any kiosk that uses some sort of personal identification to log on. For example, an ATM machine or a vending device. This is also helpful when purchasing new items or computers, where the personal Zenu™ can be uploaded or downloaded to allow a person to immediately know how to use and start using the new item.

4. Input Innovations

These innovations concern input portals that appear through the use of one or more layers of the Zenu™. These input portals can resemble normal alphanumeric keyboards or can resemble a set of keys with any characters defined by the user. This is to enable easy entry of text into a PDA through use of a couple fingers and a normal touch screen by the keyboard portal. This can be modified to display customized characters (e.g., made up or slang symbols or characters) for the young or physically challenged or a foreign language characters. Although primarily designed to make using a PDA easier, it can be carried out on any device that uses a touch screen.

5. Automotive Innovations

Figure 32:
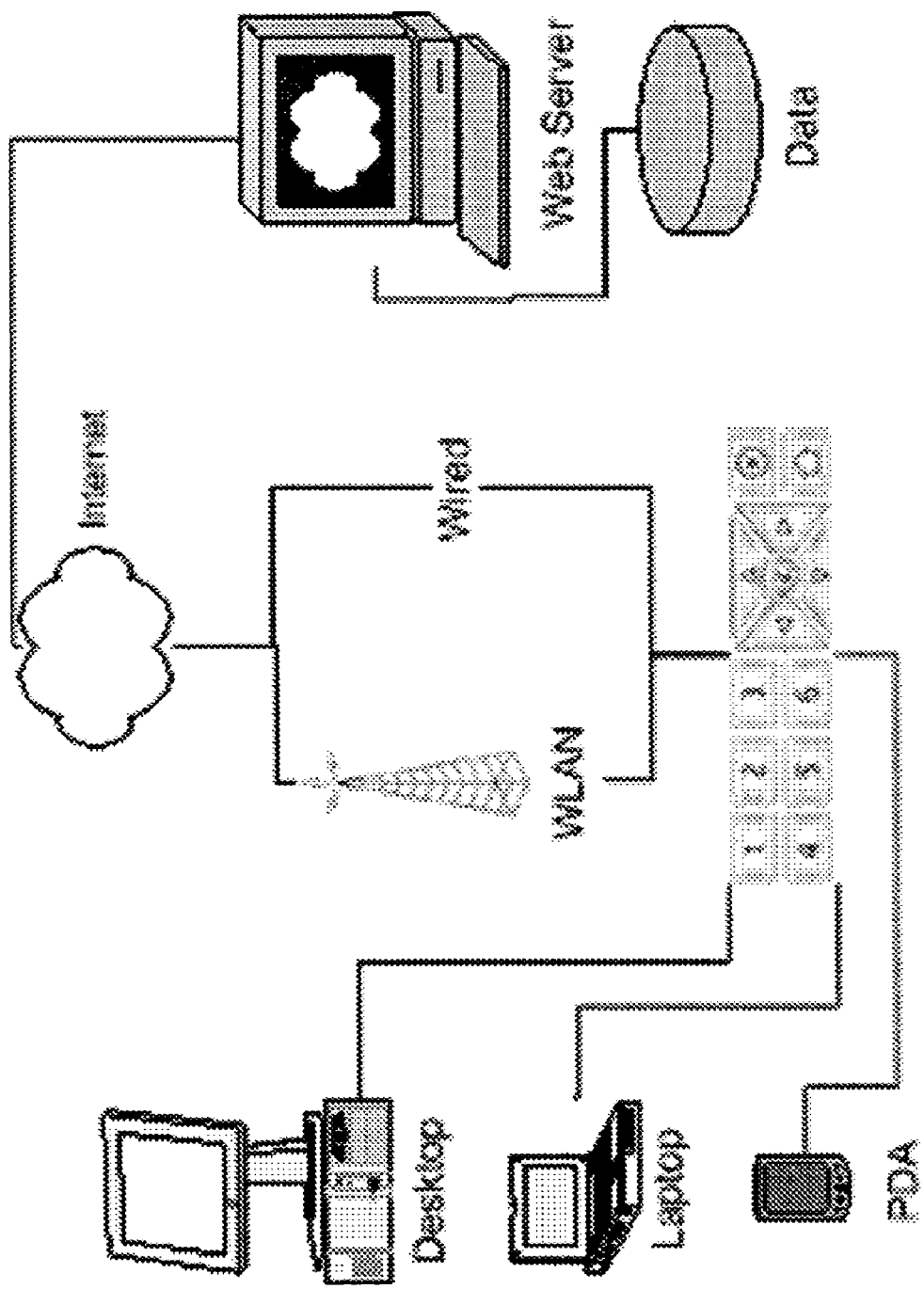
FIG. 32 illustrates an alternate embodiment of a Zenu™ architecture.

Theses innovations concern using the Zenu™ interface and a single (or more) screen on a steering wheel, such as in or near the center of the steering wheel. Then, all the functions of the automobile and its electrical and mechanical devices can be controlled by a driver with one or two fingers right on the steering wheel. Other screens can be placed around the car for passengers as well. In another embodiment, the ZENU™ application architecture may include four parts, as shown in FIG. 32: The Universal ZENU™ Interface, the server-side ZTool utility, a defined ZML schema, and a TCP/IP enabled platform/application.

The ZENU application can be used on desktop computers, PDAs, and Web-enabled phones to manage and access all local data and applications. Internet data is accessed via a TCP/IP socket connection. Server-side applications and script files communicate with the ZENU™ application using ZML. The ZML tagged data "sets" the properties for embedded graphic objects on the ZENU™ application platform. The ZTool utility enables the systems manager to position objects and then assign the appropriate data for display on the ZENU™ application interface. After selections or data input are made with the ZENU™ application buttons, the updated or new data is sent back to the server with the associated script and data ID. The server can then process the data.

The ZENU™ application interface can be used across platforms and applications and can be customized to satisfy individual needs and preferences with little or no training. As a standardized portal and interface, ZENU™ can be quickly learned by users of all skill levels and adapted for most application areas. Users navigate through specific server databases by simply touching the numbers buttons and arrow buttons for navigation.

Figure 34:
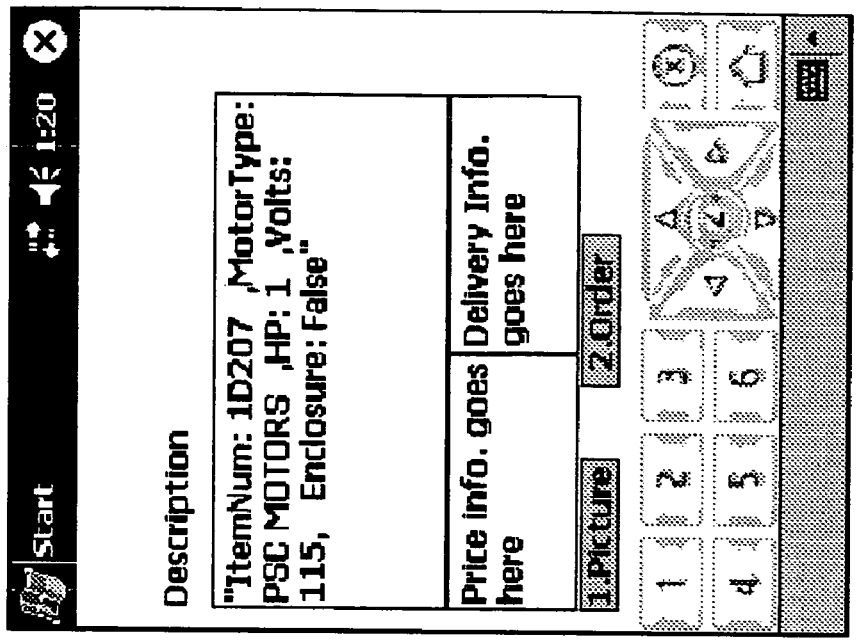
FIGS. 33 and 34 are PDA screen shots showing representative data retrieval functionality.
Figure 33:
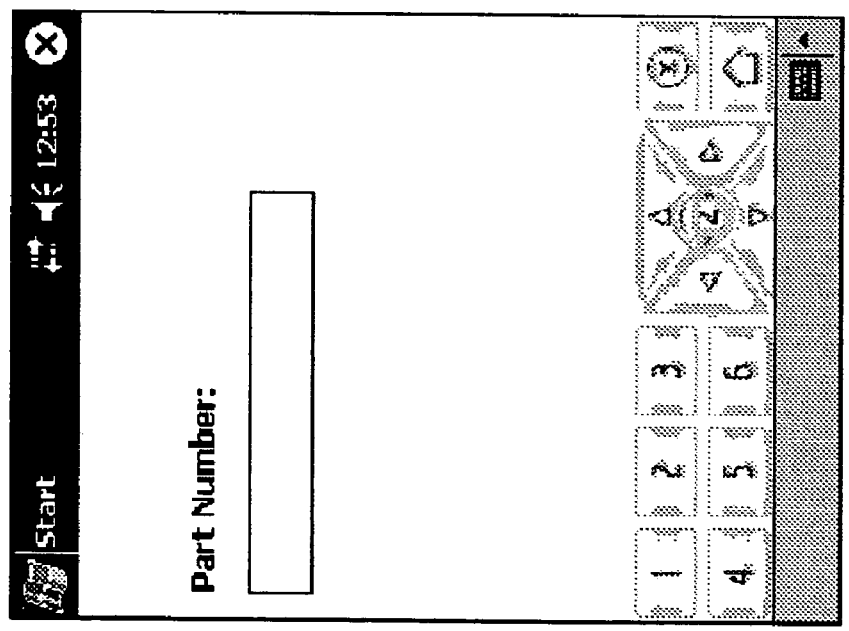

FIGS. 33 and 34 show the first two screens of a sample ZENU™ interface in an alternative embodiment. When a user enters a part number shown in FIG. 33, for example, and then presses the right arrow button, the request for data is sent to the server script (consisting of ZML with embedded ASP script) through http or https. Once the ZML is processed, the ZENU™ interface displays, as shown in FIG. 34. The screen in FIG. 34 displays the numbers buttons that will display specific information. For example, the user can press button 1 to show a picture of the item and 2 to show ordering information.

Figure 35:
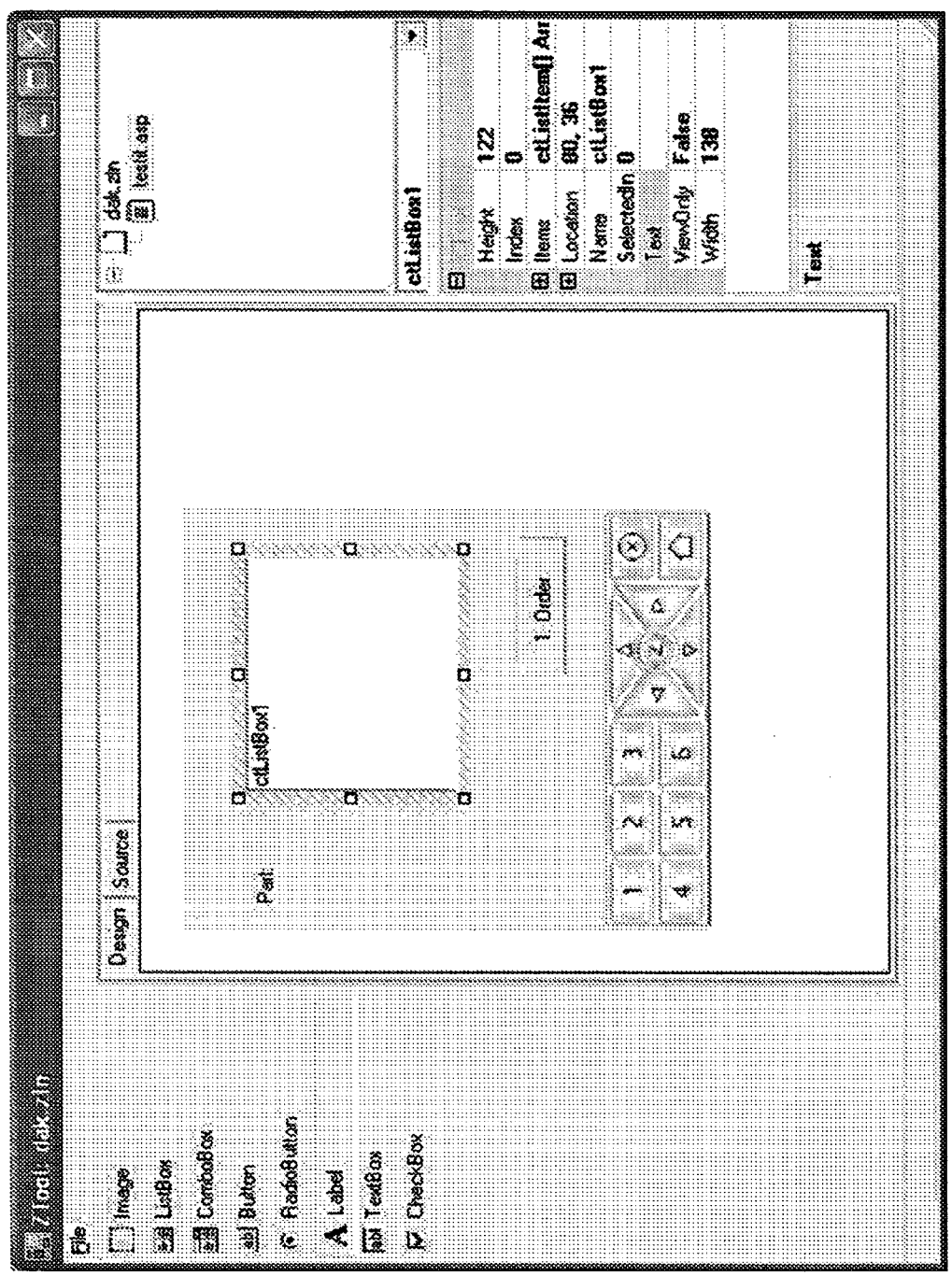
FIG. 35 is a ZTool screen shot illustrating representative placement of a control for a Zenu™ screen.

The ZTool utility has simplified the process of producing ZML files. The ZTool utility interface provides a virtual PDA screen in the middle of the screen, shown in FIG. 35. The systems manager begins by selecting the form control (checkbox, for example) from the Form Control Palette and dragging them to the desired location on the screen, then sets the component properties from the ZTool panel on the right side of the screen. After the design is complete, the systems manager presses Save from the File menu to save all the files in the project. This file describes the layout and properties of the screen and of the selected graphic objects, as shown in the sample in FIG. 36. The ZTool utility ensures the screen is laid out exactly how the user should see it and that the ZML is valid.

Figure 37:
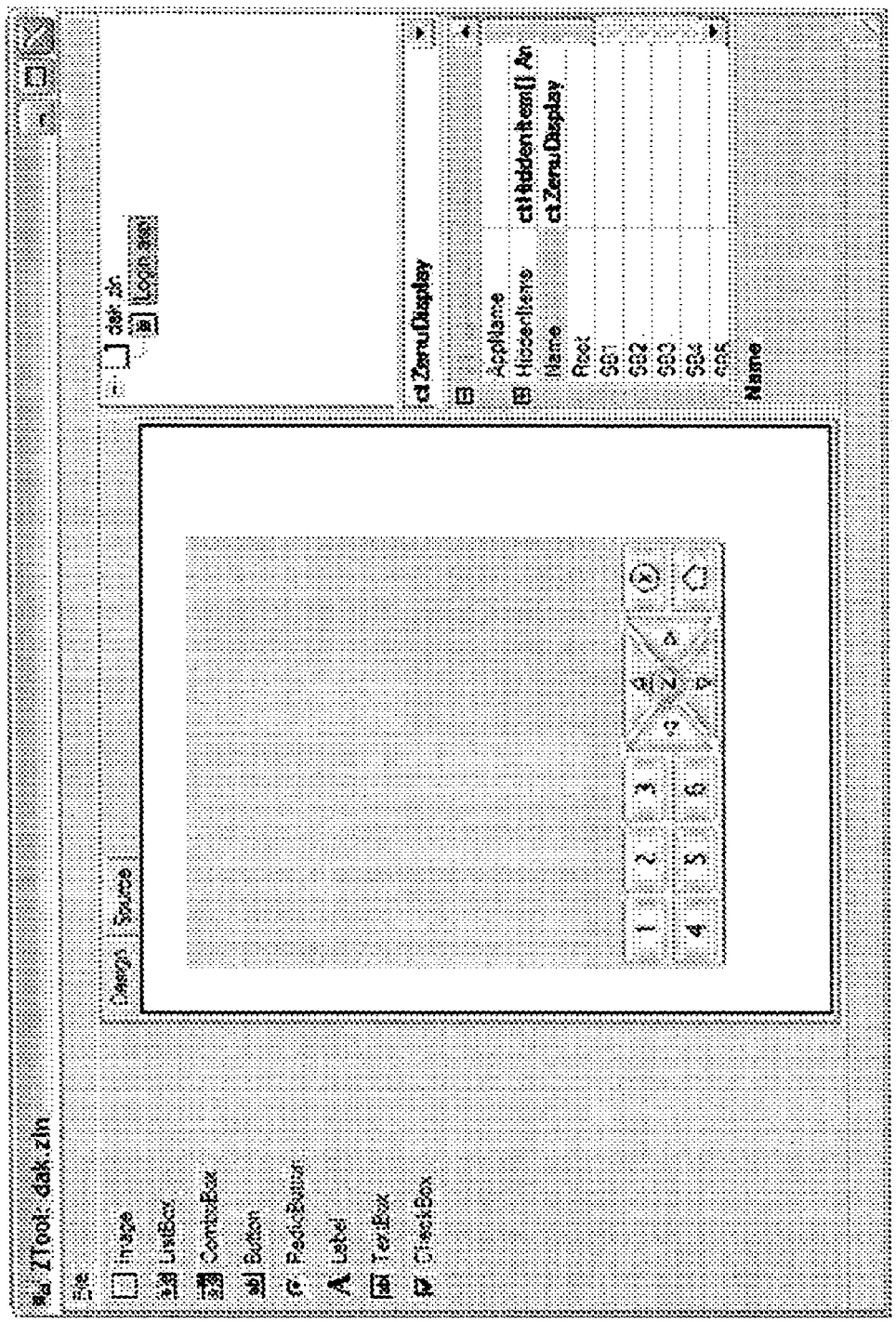
FIG. 37 is a screen shot of a representative ZTool startup screen.

FIG. 37 is a screen shot of a ZTool startup screen showing, down the left side, representative controls that are available to be used in construction of a Zenu™ screen for a PDA or other device.

Figure 38:
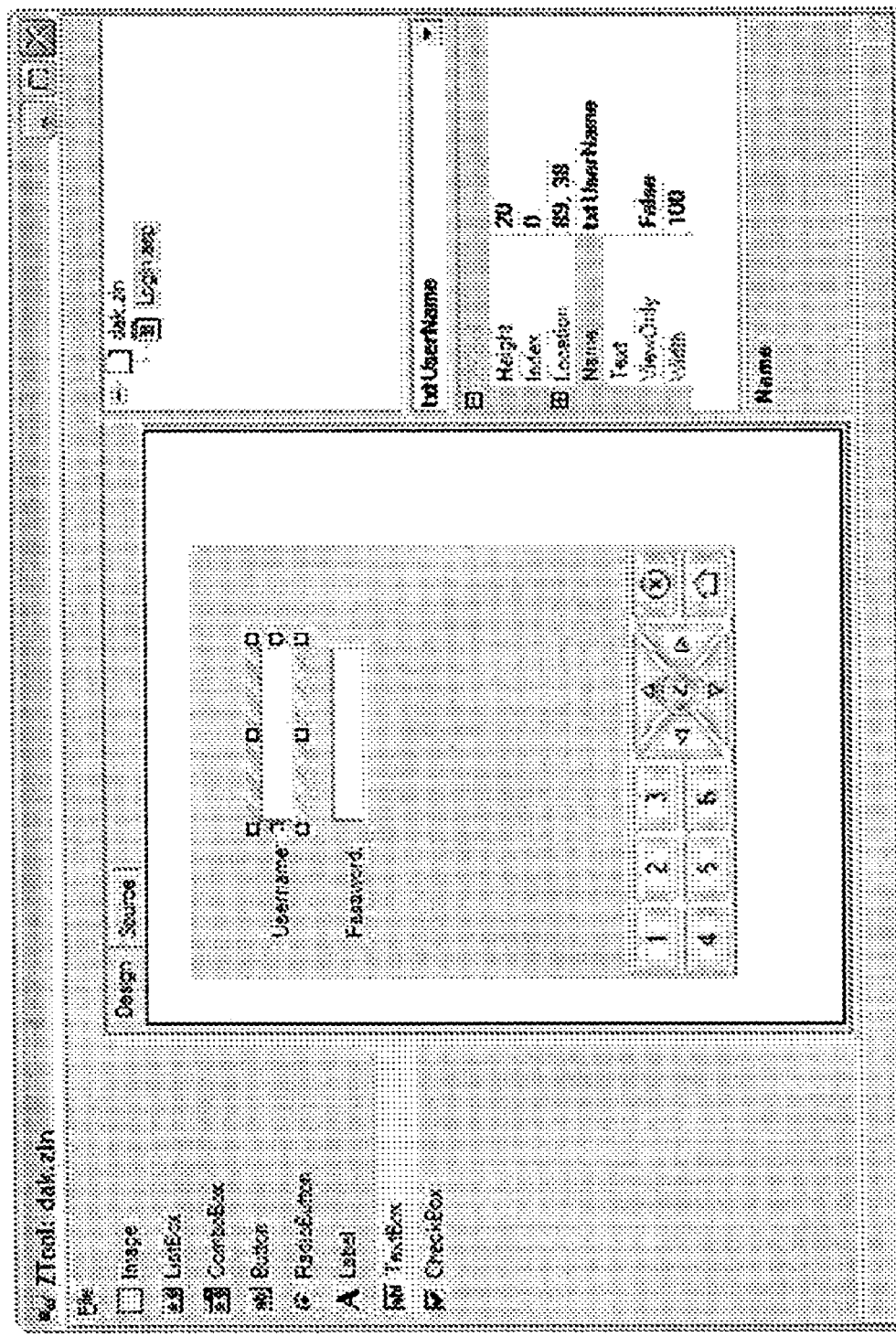
FIG. 38 is a representative ZTool screen shot showing placement of components of a Zenu™ display screen.

FIG. 38 is a ZTool screen shot illustrating representative placement of controls for a Zenu™ display being developed in ZTool.

Figure 39:
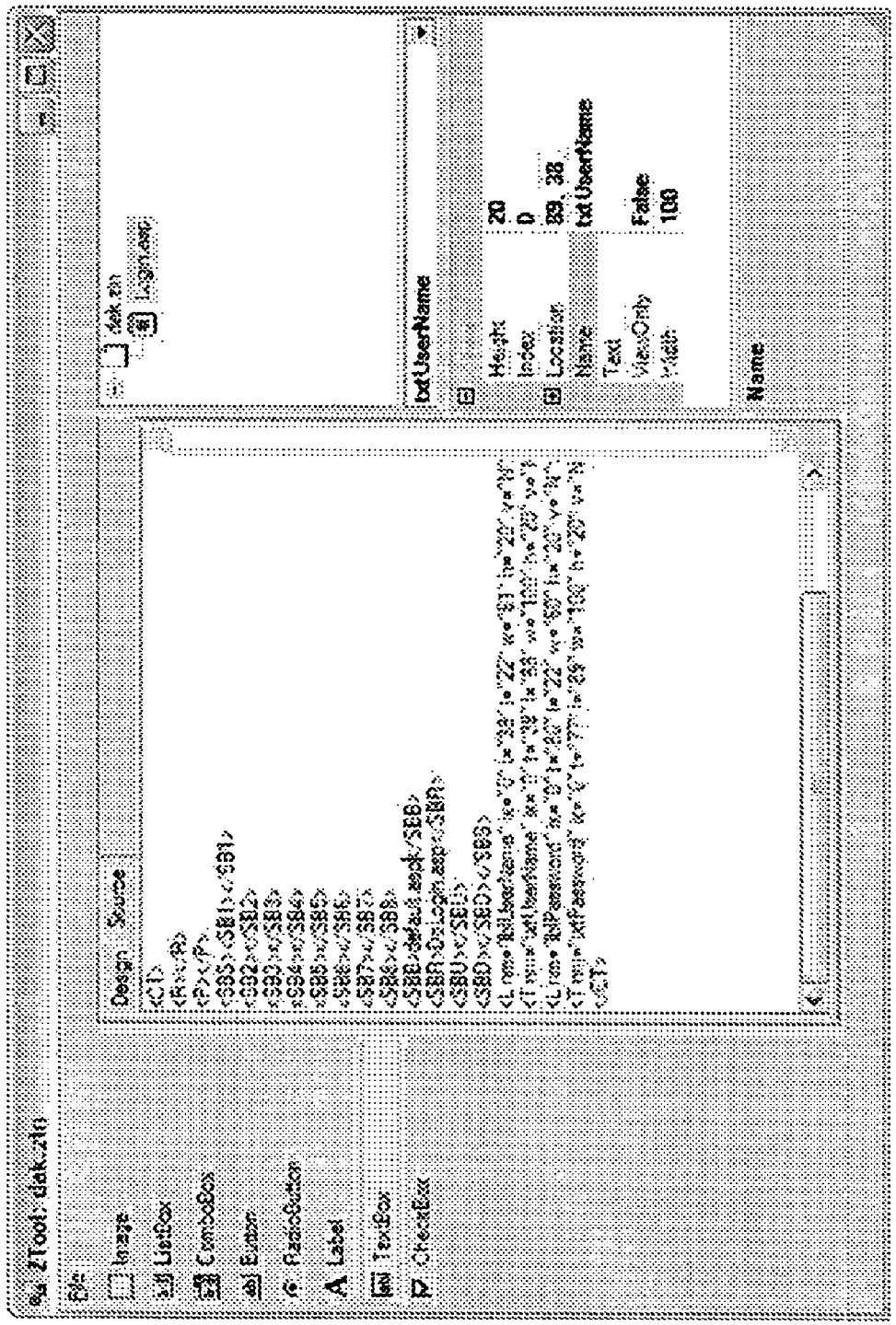
FIG. 39 is a ZTool screen shot illustrating ZML data generated by ZTool.

FIG. 39 is a ZTool screen shot illustrating ZTool's capability to display ZML code generated automatically by ZTool for a particular Zenu display.

Figure 40:
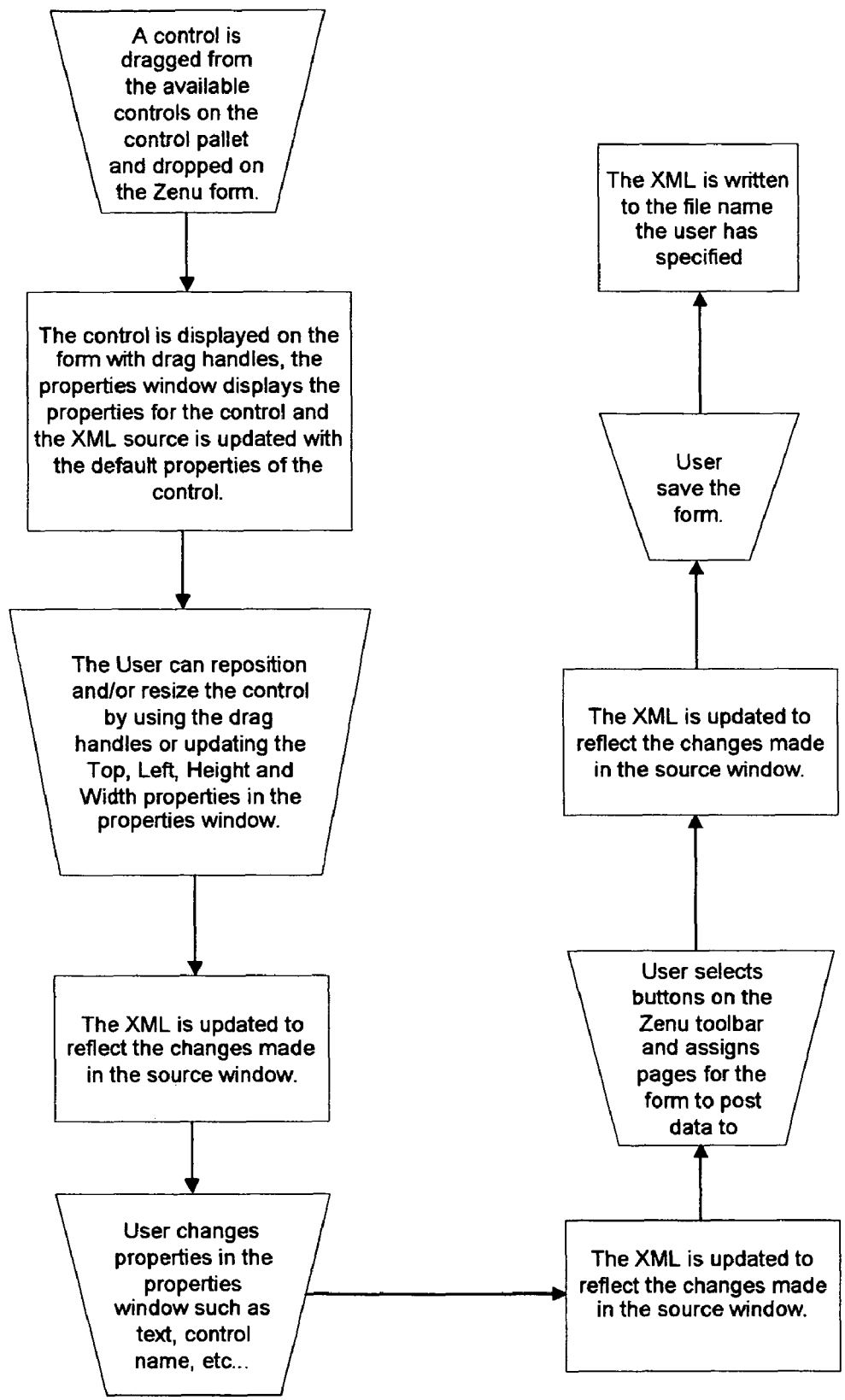
FIG. 40 is an illustration of a typical workflow showing user interaction with ZTool functions to generate a ZENU™ display.

FIG. 40 illustrates a representative workflow for a work session involving interaction between a ZTool user and ZTool software functions to create ZML code for a Zenu display for a PDA or other device.

FIG. 41 illustrates the data structure for Zenu™ Markup Language (ZML).

FIG. 42 illustrates contents of a representative ZML file that may be transmitted to a PDA or other device to control generation of a specific Zenu™ screen.

Is some embodiments, a PDA or other remote device may be capable of transmitting data back to an application on a server to allow a user to control or select Zenu™ display characteristics as well as data presented in a Zenu™ display. Data transmitted back may be in a ZML or XML format, or in some other data format.

Scripting integration with ASP, JavaScript, Python, etc. is needed only when the graphic object is being populated with data from the database. No layout tags (HTML) are required, only ZML. The ZENU™ parser only scans for the ZML data.

The ZML schema used on the server, shown as a sample in FIG. 36, integrates ZML with ASP code. This example shows the ASP code, but any script can be used including JSP, Websphere, ASP.NET, and others. Using the ZTool utility, the systems manager designs the ZENU™ application interface page layout using the ZML schema. This information is parsed on the PDA to "set" the display objects and populate them with the correct data.

The ZENU™ application interface enables maps or graphics to be sent using wireless technology. Preloaded maps are displayed by the ZENU™ application and can be replaced or updated as needed by touching a button. A user can scroll maps larger than the available screen by touch or through the use of the scroll bars. The point touched by the user becomes the new center position of the map. Icons can be sent and positioned on maps to indicate locations of specific items, in addition to touch coordinates and map IDs.

As stated, the ZENU™ Application and ZTool utility provide customized screens for groups of users in specific application areas, enabling dynamic creation of page layouts and features and roaming. Server-side screen management makes software updates unnecessary. In addition, the simple, intuitive ZENU™ application interface can be scaled and configured to work in any environment or medium and is designed to work within the limited screen real estate afforded not only by mobile devices such as PDAs and cell phones but also by emerging computing technologies.

Minimal Training Requirement: With the standardized ZENU™ application user interface, changing screen layouts requires minimal training, PDA service calls, or updates for the user software. Whoever manages the server manages the PDAs.

Efficiency: The ZENU™ application interface and the ZTool utility make one-touch navigation the most efficient means for accessing applications and data on a PDA.

Bandwidth Efficiency: Since bandwidth is a serious issue for wireless applications, elimination of unnecessary code/tags saves bandwidth, provides faster delivery of data, and lowers the airtime cost.

In addition, by using ZTool, embedded graphic objects, and ZML, the total number of bits sent is less than using a browser and HTML. Only ZML data needs to be sent. This yields far fewer total bits sent and therefore a lower cost for airtime.

The instant invention offers an easy-to-use method of navigating and accessing information across all platforms and mobile devices, including laptops, PDAs and cell phones.

ZENU™/ZTOOL server-side control eliminates the need to recall PDA's and phones for software updates. Screens are generated and controlled at the server.

ZENU™ technologies with its universal portal and server-side management will solve your system device training and integration problems by allowing universal access on every communication device; whether it is a laptop, tablet, desktop, PDA, cell phone or something new.

V. CONCLUSION

While various embodiments of the present invention have been described above, it should be understood that they have been presented by way of example, and not limitation. It will be apparent to persons skilled in the relevant art that various changes in form and detail can be made therein without departing from the spirit and scope of the invention. This is especially true in light of technology and terms within the relevant art(s) that may be later developed.

The present invention has been described above with the aid of functional building blocks or modules (see FIGS. 11 and 20, for example) illustrating the performance of specified functions and relationships thereof. The boundaries of these functional building blocks have been defined herein for the convenience of the description. Alternate boundaries can be defined so long as the specified functions and relationships thereof are appropriately performed. Any such alternate boundaries should thus be considered within the scope of the following appended claims. One skilled in the art will recognize that these functional building blocks can be implemented by discrete components, application specific integrated circuits, processors executing appropriate software and the like or any combination thereof. Thus, the breadth and scope of the present invention should not be limited by any of the above-described exemplary embodiments, but should be defined only in accordance with the following claims and their equivalents.

We claim:

1. A method that provides a menu on a handheld mobile device, which includes a display, comprising the acts of:
    the mobile device receiving the menu from a remote server, via wireless communication, wherein the menu includes graphical elements and user-definable command regions, the number and shape of the command regions being selected by a user, wherein at least one of the user-definable command regions is associated with a user-definable command;
    storing the menu into a memory; and
    displaying the received menu on substantially less than all of the display area and over other information shown on the display such that at least some information on a portion of the display other than where the menu is displayed remains shown and still readable on the display of the mobile device;
        wherein the menu includes a first level and a second level;
        wherein the second level substantially replaces the first level upon selection of a command region on the first level;
        and wherein a command and a user definable graphical element or text associated with a command region of the second level are dependent on the previously executed command of the first level, the command region of the second level appearing in place of and in substantially the same area of the display as the command region of the first level.

2. The method of claim 1 wherein at least a portion of the menu is received from the remote server in response to a request from a user of the mobile device.

3. The method of claim 1 wherein at least a portion of the menu is received at the mobile device more than once and where at least two of the received portions of the menus are different.

4. The method of claim 1 wherein the menu includes command regions that correspond to commands to be carried out remotely.

5. The method of claim 1 wherein at least a portion of the menu is opaque.

6. The method of claim 1 wherein the received menu is chosen by a user from a plurality of available menus stored at the remote server.

7. The method of claim 1 wherein the mobile device comprises a cellular phone.

8. The method of claim 1 further comprising changing the size of at least a portion of the graphical elements.

9. A method that manages a menu of a handheld mobile device, which includes a display, comprising the acts of:
    configuring the menu so that it includes graphical elements and user-definable command regions, the number and shape of the command regions being selected by a user, wherein at least one of the user-definable command regions is associated with a user-definable command and the user menu is displayed on substantially less than all of the display area and over other information shown on the display such that at least some information remains shown and still visible on the display of the mobile device;
    storing the menu on a remote server; and
    transmitting the menu from the remote server, via wireless communication, to the mobile device;
        wherein the menu includes a first level and a second level;
        wherein the second level substantially replaces the first level upon selection of a command region on the first level; and
        wherein a command and a user definable graphical element or text associated with a command region of the second level are dependent on the previously executed command of the first level, the command region of the second level appearing in place of and in substantially the same area of the display as the command region of the first level.

10. The method of claim 9 further comprising configuring the menu to include command regions corresponding to commands operable on the mobile device and on the server.

11. The method of claim 9 further comprising configuring the menu to be alterable by a user of the mobile device via wireless communication with the server.

12. The method of claim 9 further comprising changing the menu stored on the server by customizing graphical representations of command regions using a software application of the server.

13. The method of claim 9 wherein the act of configuring the menu includes dragging and dropping at least a one of the graphical elements of the menu.

14. A handheld wireless mobile device comprising:
    a display having a user menu that includes graphical elements and user-definable command regions, the number, and shape of the command regions being selected by a user, wherein at least one of the user-definable command regions is associated with a user-definable command and the user menu is displayed on substantially less than all of the display area and over other information shown on the display such that at least some information remains shown and still visible on the display of the mobile device;
        wherein the user menu is received from a remote server via wireless communication;
        wherein the menu includes a first level and a second level;
        wherein the second level substantially replaces the first level upon selection of a command region on the first level; and
        wherein a command and a user definable graphical element or text associated with a command region of the second level are dependent on the previously executed command of the first level, the command region of the second level appearing in place of and in substantially the same area of the display as the command region of the first level.

15. The handheld wireless mobile device of claim 14 wherein the user menu includes user-alterable graphical elements.

16. The handheld wireless mobile device of claim 14 further comprising a transmitter configured to send changes to the user menu to the remote server.

17. The handheld wireless mobile device of claim 14 wherein the menu includes command regions corresponding to commands operable on the mobile device and on the remote server.

* * * * *